(12) United States Patent
Furukawa et al.

(10) Patent No.: US 7,486,598 B2
(45) Date of Patent: Feb. 3, 2009

(54) PLAYBACK APPARATUS, PLAYBACK METHOD, AND PROGRAM

(75) Inventors: Takashi Furukawa, Kanagawa (JP); Ryo Abiko, Kanagawa (JP)

(73) Assignee: Sony Corporation, Tokyo (JP)

( * ) Notice: Subject to any disclaimer, the term of this patent is extended or adjusted under 35 U.S.C. 154(b) by 673 days.

(21) Appl. No.: 11/208,984

(22) Filed: Aug. 22, 2005

(65) Prior Publication Data

US 2006/0051056 A1 Mar. 9, 2006

(30) Foreign Application Priority Data

Aug. 24, 2004 (JP) ............................. 2004-244398

(51) Int. Cl.
*G11B 7/00* (2006.01)
(52) U.S. Cl. .................... 369/47.1; 369/47.13
(58) Field of Classification Search ............... 369/47.1, 369/53.22, 59.25, 59.23, 47.13, 47.22, 4.721, 369/47.27, 53.21, 53.32
See application file for complete search history.

(56) References Cited

U.S. PATENT DOCUMENTS 6,434,323 B1 * 8/2002 Hayashi ..................... 386/104

* cited by examiner

*Primary Examiner*—Nabil Z Hindi
(74) *Attorney, Agent, or Firm*—Frommer Lawrence & Haug LLP; William S. Frommer

(57) ABSTRACT

A playback apparatus plays back data from a recording medium having recorded thereon a file system representing association between identification information for identifying a file and a position where the file is recorded, pieces of segment data constituting the file, and markers for the respective pieces of segment data, each marker that is recorded after a key marker specified in certain cases including location information of the key marker. The playback apparatus includes a detector that detects a last marker in a recording area where data has been recorded on the recording medium but has not been reflected on the file system, and a restoration processor that executes a restoration process of reflecting on the file system segment data that has been recorded on the recording medium but has not been reflected on the file system, based on the location information of the key marker and the location information of segment data.

12 Claims, 36 Drawing Sheets

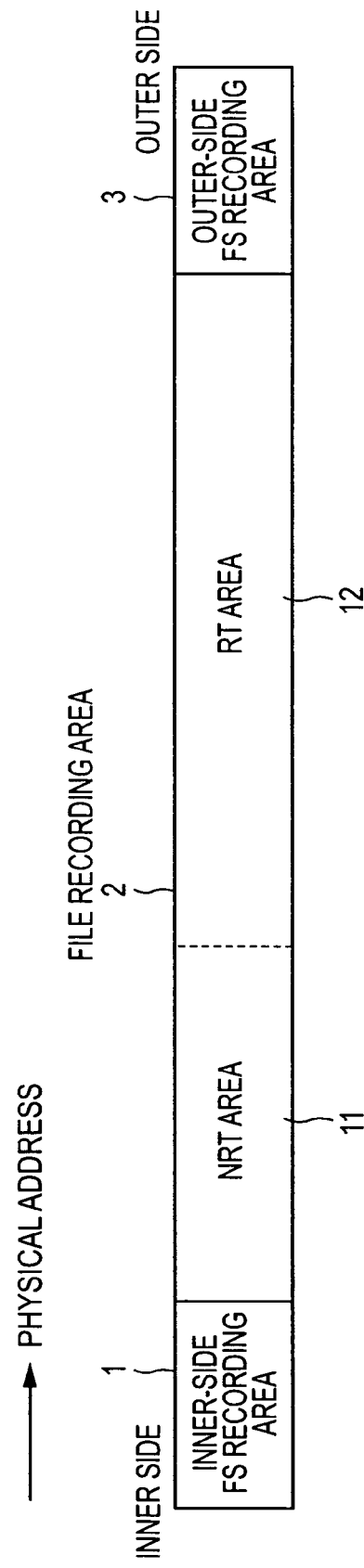

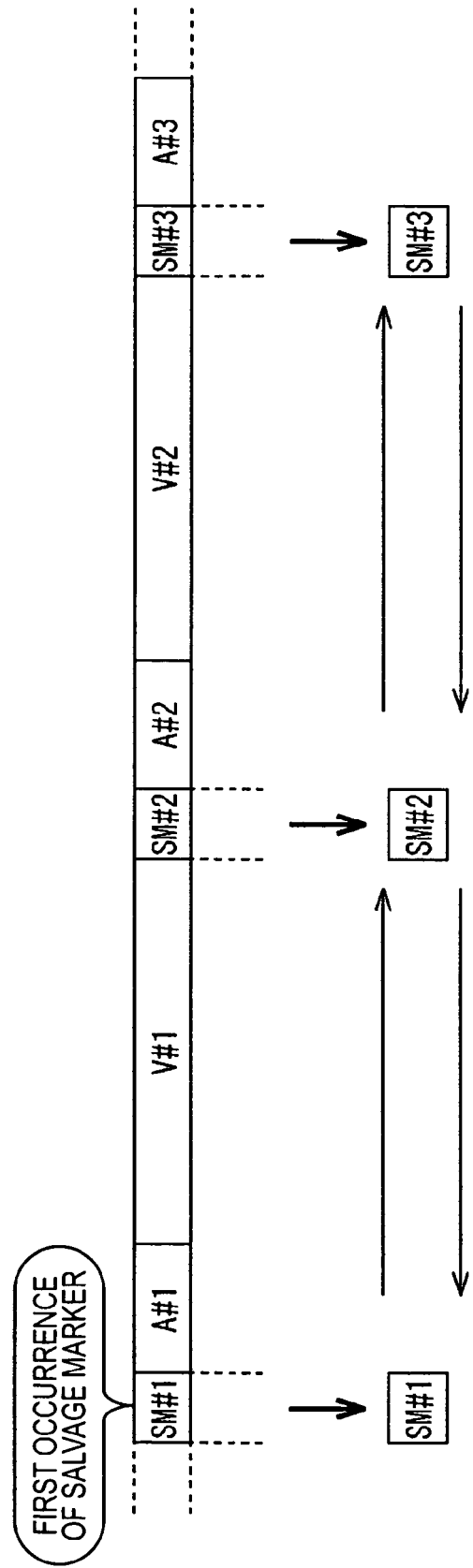

FIG. 8

| SALVAGE MARKER #n | MANAGEMENT DATA | SALVAGE MARKER ID |
| | | INCREMENT NUMBER |
| | | RECORDING DATE AND TIME |
| | | NUMBER OF TIMES OF CIRCULATING RECORDING |
| | | KEY-SALVAGE-MARKER POINTER |
| | | KEY-SALVAGE-MARKER POINTER |
| | | ⋮ |
| | | UMID |
| | | STORED-DATA HEADER |
| | STORED DATA / FILE DATA #(n+1) | PROGRAM METADATA |
| | | ADDED PART OF INDEX FILE |
| | | CLIP INFORMATION |
| | | NRT METADATA |
| | FS MANAGEMENT DATA | FILE ENTRY |
| | | LOCATION INFORMATION OF ANNULUS #(n-2) |
| | | LOCATION INFORMATION OF ANNULUS #(n-3) |
| | | ⋮ |
| | | DEFECT LIST |

FIG. 9

| NON-VOLATILE-MEMORY INFORMATION | MANAGEMENT DATA | RECORDING DATE AND TIME |
| --- | --- | --- |
| | | INDEX ID |
| | | STORED-DATA HEADER |
| | STORED DATA | CURRENT-SALVAGE-MARKER POINTER |
| | | KEY-SALVAGE-MARKER POINTER |
| | | ⋮ |
| | | KEY-SALVAGE-MARKER POINTER |
| | | ANNULUS LOCATION INFORMATION NOT YET RECORDED IN SM ON DISK |
| | | RECORDED ANNULUS INFORMATION |

PLAYBACK APPARATUS, PLAYBACK METHOD, AND PROGRAM

CROSS REFERENCES TO RELATED APPLICATIONS

The present invention contains subject matter related to Japanese Patent Application JP 2004-244398 filed in the Japanese Patent Office on Aug. 24, 2004, the entire contents of which are incorporated herein by reference.

BACKGROUND OF THE INVENTION

1. Field of the Invention

The present invention relates to playback apparatuses, playback methods, and programs. More specifically, the present invention relates to a playback apparatus, a playback method, and a program with which data recorded on a recording medium can be read even when a process of recording data on the recording medium was not completed normally.

2. Description of the Related Art

As recording media for recording video data captured by digital video cameras, for example, magnetic tapes or optical discs are used. When video data captured (and audio data collected) (hereinafter, video data and audio data will be collectively referred to as AV data) is recorded on a recording medium on which AV data is managed using a file system, such as an optical disc, compared with a case where the AV data is recorded on a magnetic tape, advantageously, it is possible to start playing back the AV data from a desired point more quickly.

The file system is recorded on the optical disc after the recording of the AV data on the optical disc has been completed, and it includes file names of the AV data, information representing positions where the AV data is recorded on the optical disc, and so forth.

The files of AV data or the like recorded on the optical disc are managed based on the file system. For example, when the data is played back from the optical disc by a playback apparatus, the playback apparatus, with reference to the file system, obtains the file names of one or more files recorded on the optical disc, the positions where the respective files are recorded on the optical disc, and so forth. When a user instructs playback of a file of interest, the position where the file is recorded is identified based on the file system, and AV data and the like constituting the file is read from the recording position and is then played back.

The AV data or the like is not necessarily recorded at a single recording position, and is in some cases distributed to a plurality of recording positions on the optical disc. In such cases, all the plurality of distributed recording positions associated with the single file is recorded in the file system. Thus, even when a file of AV data or the like is recorded in a plurality of recording areas in a distributed manner, the entire AV data or the like that is recorded in a distributed manner can be read based on the file system. This is described, for example, in Japanese Unexamined Patent Application Publication No. 11-88821.

SUMMARY OF THE INVENTION

However, in recording apparatuses that have been available, such as digital video cameras, when power supply is interrupted while AV data is being captured and recorded on an optical disc or immediately after the AV data has been captured, for example, due to the battery being detached by mistake, it could occur that a file system corresponding to the data that has been recorded ends up unrecorded. In this case, even when an attempt is made to play back the data from the optical disc after the power is recovered, the recorded AV data is not recognized and is not played back.

A possible approach for avoiding this situation would be to update the file system each time a predetermined amount of AV data is recorded on an optical disc. Usually, however, the file system and AV data or the like are recorded at remote positions on an optical disc. Thus, when the file system is updated frequently, the pickup for writing on the optical disc is considerably moved frequently. This causes seeking sound, and increases the ratio of seeking time in a series of recording periods so that the efficiency of recording is decreased.

The problem described above is also anticipated in cases where data other than AV data is recorded on optical discs.

It is desired that it is possible to read data recorded on a recording medium even when a process of recording data on the recording medium was not completed normally.

According to an embodiment of the present invention, there is provided a playback apparatus for playing back data from a recording medium having recorded thereon a file system representing association between identification information for identifying a file and a position where the file is recorded, a plurality of pieces of segment data constituting the file, and markers for the respective pieces of segment data, each marker that is recorded after a key marker specified in certain cases including location information of the key marker. The playback apparatus includes detecting means for detecting a last marker in a recording area where data has been recorded on the recording medium but has not been reflected on the file system, the last marker being a marker that is recorded at an end of the recording medium in a recording process; and restoration processing means for executing, for each of the pieces of segment data constituting the file, a restoration process of reflecting on the file system segment data that has been recorded on the recording medium but has not been reflected on the file system, based on the location information of the key marker and the location information of segment data, these pieces of location information being included in the last marker detected by the detecting means.

The key marker is specified, for example, when the size of a marker has reached a predetermined upper limit.

The restoration processing means may read a marker specified as the key marker from the recording medium based on the location information of the key marker on the recording medium, and execute the restoration process based on the location information of the segment data, included in the marker read, and based on the location information of the segment data, included in the last marker.

The detecting means may detect the last marker by executing binary search in the recording area where data has been recorded on the recording medium but has not been reflected on the file system.

Each of the markers may include a first number of times representing the number of times of rewriting in a recording area where the marker is recorded on the recording medium, and when a marker is detected in the recording area where data has been recorded on the recording medium but has not been reflected on the file system, and the detecting means may determine whether the marker is the last marker based on the first number of times included in the marker and a second number of times representing the number of times of rewriting in the recording area where the marker is recorded on the recording medium, the second number of times having been reflected on the file system.

Each of the markers may include first date and time information corresponding to a date and time of recording of the marker on the recording medium, and when a marker is detected in the recording area where data has been recorded on the recording medium but has not been reflected on the file system, the detecting means may determine whether the marker is the last marker based on the first date and time information included in the marker and second date and time information corresponding to a date and time of updating of the file system.

Each of the markers may include location information of the associated segment data recorded on the recording medium.

According to another embodiment of the present invention, there is provided a playback method for playing back data from a recording medium having recorded thereon a file system representing association between identification information for identifying a file and a position where the file is recorded, a plurality of pieces of segment data constituting the file, and markers for the respective pieces of segment data, each marker that is recorded after a key marker specified in certain cases including location information of the key marker. The playback method includes the steps of detecting a last marker in a recording area where data has been recorded on the recording medium but has not been reflected on the file system, the last marker being a marker that is recorded at an end of the recording medium in a recording process; and executing, for each of the pieces of segment data constituting the file, a restoration process of reflecting on the file system segment data that has been recorded on the recording medium but has not been reflected on the file system, based on the location information of the key marker and the location information of segment data, these pieces of location information being included in the last marker detected.

According to another embodiment of the present invention, there is provided a program for allowing a computer to execute a process of playing back data from a recording medium having recorded thereon a file system representing association between identification information for identifying a file and a position where the file is recorded, a plurality of pieces of segment data constituting the file, and markers for the respective pieces of segment data, each marker that is recorded after a key marker specified in certain cases including location information of the key marker. The process includes the steps of detecting a last marker in a recording area where data has been recorded on the recording medium but has not been reflected on the file system, the last marker being a marker that is recorded at an end of the recording medium in a recording process; and executing, for each of the pieces of segment data constituting the file, a restoration process of reflecting on the file system segment data that has been recorded on the recording medium but has not been reflected on the file system, based on the location information of the key marker and the location information of segment data, these pieces of location information being included in the last marker detected.

According to these embodiments of the present invention, a last marker, i.e., a marker that is recorded at an end of a recording medium in a recording process, is detected in a recording area where data has been recorded on the recording medium but has not been reflected on the file system, and for each of a plurality of pieces of segment data constituting a file, segment data that has been recorded on the recording medium but has not been reflected on the file system is reflected on the file system based on key-marker location information and segment-data location information included in the last marker detected.

According to another embodiment of the present invention, there is provided a playback apparatus for playing back data from a recording medium having recorded thereon a file system representing association between identification information for identifying a file and a recording position of the file on the recording medium, a plurality of pieces of segment data constituting the file, and markers for the respective pieces of segment data, each of the markers at least including location information of the associated segment data recorded on the recording medium, each of the markers being specified as a key marker when the size of the marker has reached a predetermined upper limit, and each marker that is recorded after the marker specified as the key marker further including location information of the key marker on the recording medium. The playback apparatus includes detecting means for detecting a last marker in a recording area where data has been recorded on the recording medium but has not been reflected on the file system, the last marker being a marker recorded last on the recording medium in a recording process; storage means for storing the location information of the key marker on the recording medium and the location information of segment data recorded on the recording medium, these pieces of location information being included in the last marker detected by the detecting means; and salvage means for executing, for each of the pieces of segment data constituting the file, a salvage process of reflecting on the file system segment data that has been recorded on the recording medium but has not been reflected on the file system, based on the location information of the key marker on the recording medium and the location information of the segment data recorded on the recording medium, these pieces of location information having been stored in the storage means.

According to this embodiment of the present invention, a last marker, i.e., a marker that is recorded at an end of a recording medium in a recording process, is detected in a recording area where data has been recorded on the recording medium but has not been reflected on the file system, and for each of a plurality of pieces of segment data constituting a file, segment data that has been recorded on the recording medium but has not been reflected on the file system is reflected on the file system based on key-marker location information and segment-data location information included in the last marker detected.

According to these embodiments of the present invention, even when a process of recording data on a recording medium was not completed normally, it is possible to read data that has been recorded on the recording medium.

BRIEF DESCRIPTION OF THE DRAWINGS

FIG. 1 is a diagram showing an example of area segmentation on an optical disc on which audio data and video data is recorded by a recording and playback apparatus according to an embodiment of the present invention;

FIG. 3 is a diagram for explaining relationship between annulus data and salvage markers;

FIG. 8 is a diagram showing an example of information included in a salvage marker;

FIG. 9 is a diagram showing an example of information included in non-volatile-memory information;

DESCRIPTION OF THE PREFERRED EMBODIMENTS

Now, embodiments of the present invention will be described. The correspondence between the aspects of the present invention described in this specification and embodiments of the present invention is, for example, as follows. This description is intended to assure that embodiments supporting the aspects of the present invention described in this specification are described in this specification. Thus, even if an embodiment in the following description is not described as relating to a certain aspect of the present invention, that does not necessarily mean that the embodiment does not relate to that aspect of the present invention. Conversely, even if an embodiment is described herein as relating to a certain aspect of the present invention, that does not necessarily mean that the embodiment does not relate to other aspects of the present invention.

Furthermore, this description should not be construed as covering all the aspects of the present invention described in this specification. That is, the description does not deny the existence of aspects of the present invention that are described in this specification but not claimed in this application, i.e., the existence of aspects of the present invention that in future may be claimed by a divisional application, or that may be additionally claimed through amendments.

Figure 28:
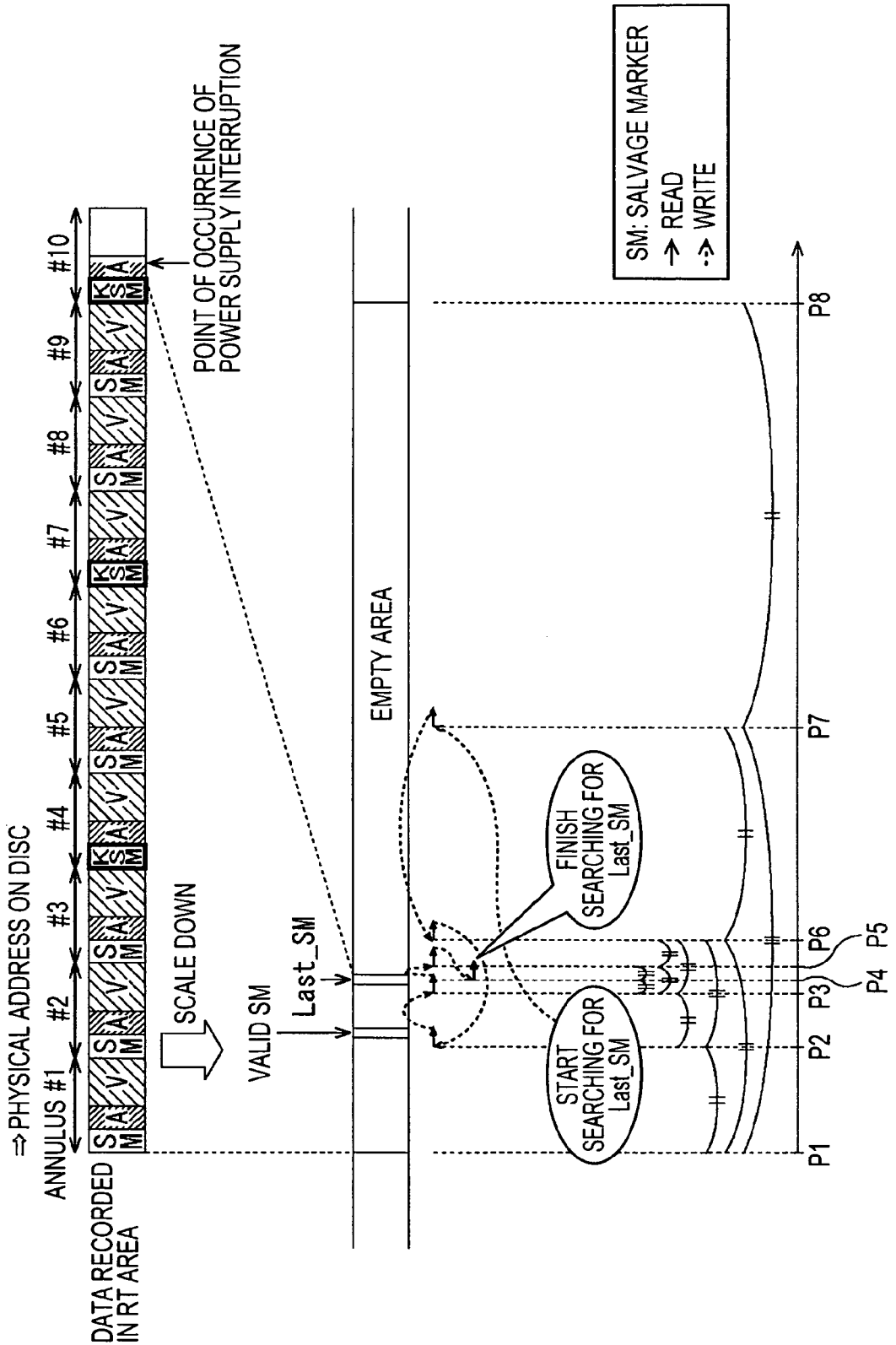
FIG. 28 is a diagram for specifically explaining the last-salvage-marker detecting process.
Figure 29:
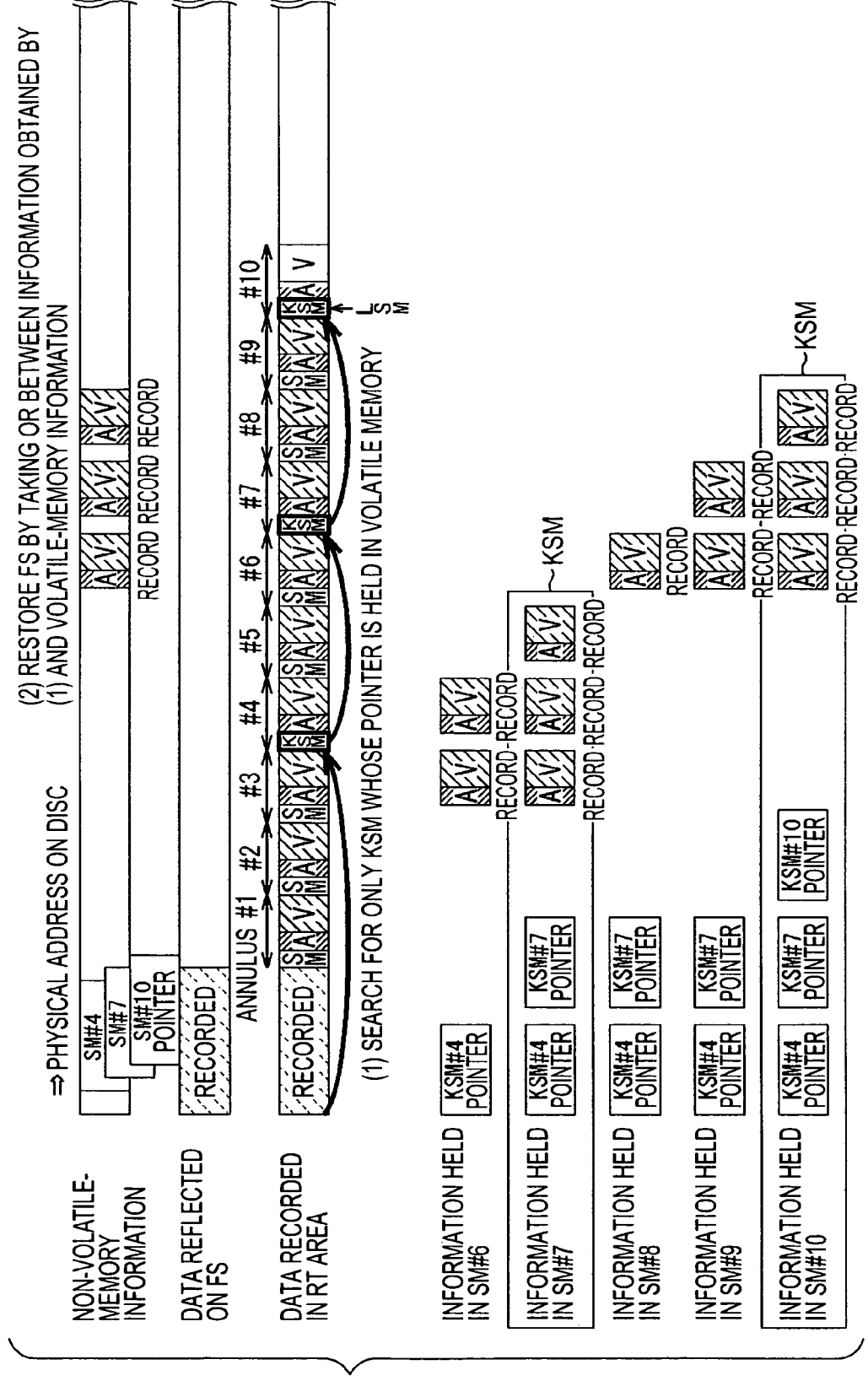
FIG. 29 is a diagram for specifically explaining the full salvage process.

A playback apparatus according to an embodiment of the present invention is a playback apparatus for playing back data from a recording medium having recorded thereon a file system representing association between identification information for identifying a file and a position where the file is recorded, a plurality of pieces of segment data (e.g., AV data #n of annuli #n) constituting the file, and markers (e.g., salvage markers) for the respective pieces of segment data, each marker that is recorded after a key marker specified in certain cases including location information (e.g., a key-salvage-marker pointer) of the key marker, the playback apparatus including detecting means (e.g., a salvage-marker detector 133, shown in FIG. 7) for detecting a last marker (e.g., a last salvage marker SM#10, shown in FIG. 28) in a recording area where data has been recorded on the recording medium but has not been reflected on the file system, the last marker being a marker that is recorded at an end of the recording medium in a recording process; and restoration processing means (e.g., a salvage processor 134, shown in FIG. 7) for executing, for each of the pieces of segment data constituting the file, a restoration process of reflecting on the file system segment data that has been recorded on the recording medium but has not been reflected on the file system, based on the location information of the key marker (e.g., pointers to key salvage markers KSM#4, KSM#7, and KSM#10, shown in FIG. 29) and the location information of segment data (e.g., location information of annuli #6 to #8, shown in FIG. 29), these pieces of location information being included in the last marker detected by the detecting means.

In the playback apparatus according to the embodiment of the present invention, the key marker is specified, for example, when the size of a marker has reached a predetermined upper limit.

In the playback apparatus according to the embodiment of the present invention, the restoration processing means may read a marker specified as the key marker (e.g., salvage markers SM#4, SM#7, and SM#10, shown in FIG. 29) from the recording medium based on the location information of the key marker on the recording medium, and execute the restoration process based on the location information of the segment data, included in the marker read (e.g., location information of annuli #1 and #2, included in the salvage marker SM#4, location information of annuli #3 to #5, included in the salvage marker SM#7, and location information of annuli #6 to #8, included in the salvage marker SM#10, shown in FIG. 29), and based on the location information of the segment data, included in the last marker (e.g., location information of the annuli #6 to #8, included in the last salvage marker SM#10, shown in FIG. 29).

In the playback apparatus according to the embodiment of the present invention, the detecting means may detect the last marker by executing binary search (e.g., a process shown in FIG. 27) in the recording area where data has been recorded on the recording medium but has not been reflected on the file system.

Figure 27:
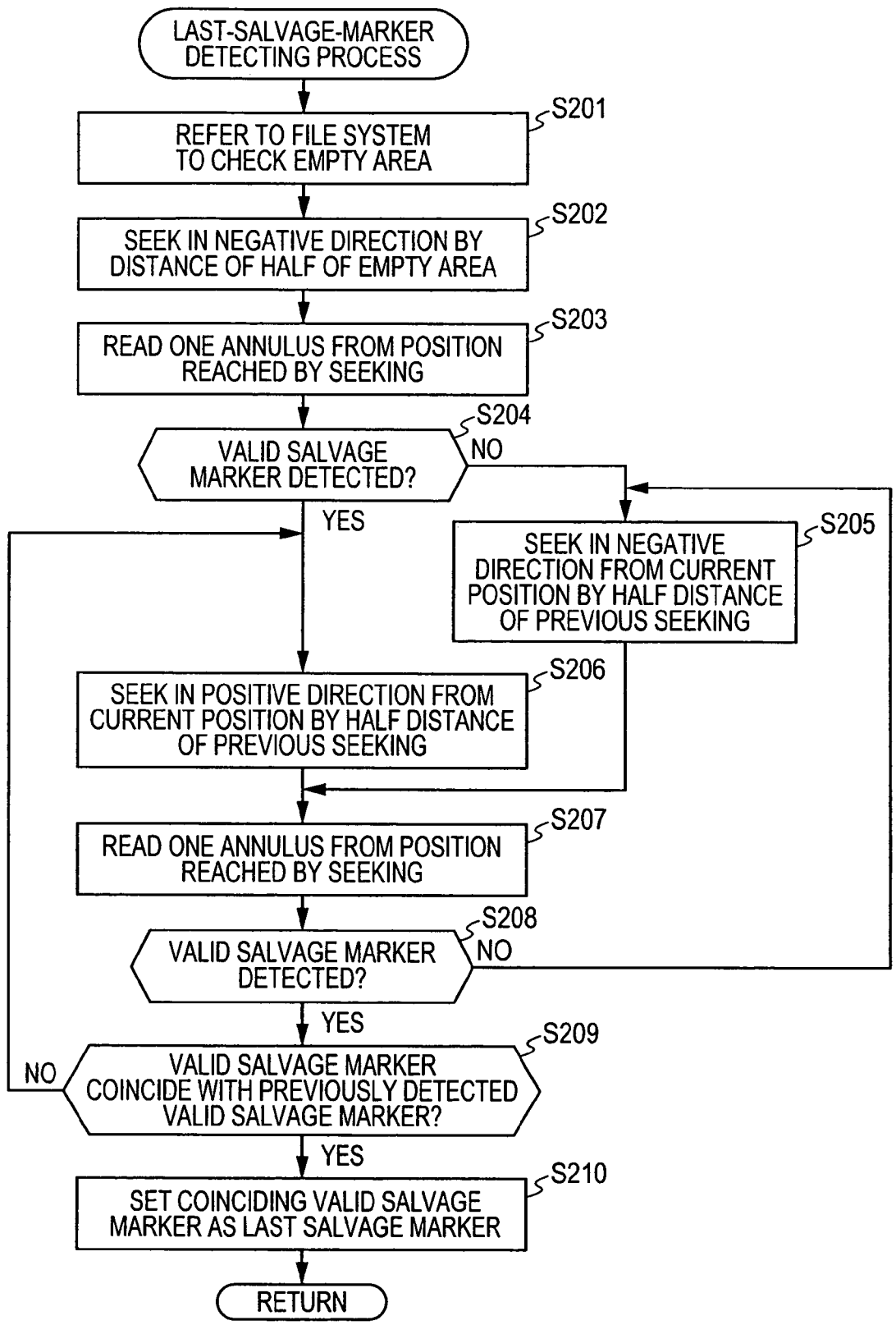
FIG. 27 is a flowchart of a last-salvage-marker detecting process.

In the playback apparatus according to the embodiment of the present invention, each of the markers may include a first number of times (e.g., the number of times of circulating recording, shown in FIG. 8) representing the number of times of rewriting in a recording area where the marker is recorded on the recording medium, and when a marker is detected in the recording area where data has been recorded on the recording medium but has not been reflected on the file system, and the detecting means may determine whether the marker is the last marker based on the first number of times included in the marker and a second number of times representing the number of times of rewriting in the recording area where the marker is recorded on the recording medium, the second number of times having been reflected on the file system (e.g., steps S204 and S208, shown in FIG. 27).

In the playback apparatus according to the embodiment of the present invention, each of the markers may include first date and time information (e.g., a recording date and time, shown in FIG. 8) corresponding to a date and time of recording of the marker on the recording medium, and when a marker is detected in the recording area where data has been recorded on the recording medium but has not been reflected on the file system, the detecting means may determine whether the marker is the last marker based on the first date and time information included in the marker and second date and time information corresponding to a date and time of updating of the file system (e.g., steps S204 and S208, shown in FIG. 27).

In the playback apparatus according to the embodiment of the present invention, each of the markers may include location information of the associated segment data recorded on the recording medium (e.g., the location information of the annuli #6 to #8, included in the salvage marker SM#10, shown in FIG. 29).

Figure 26:
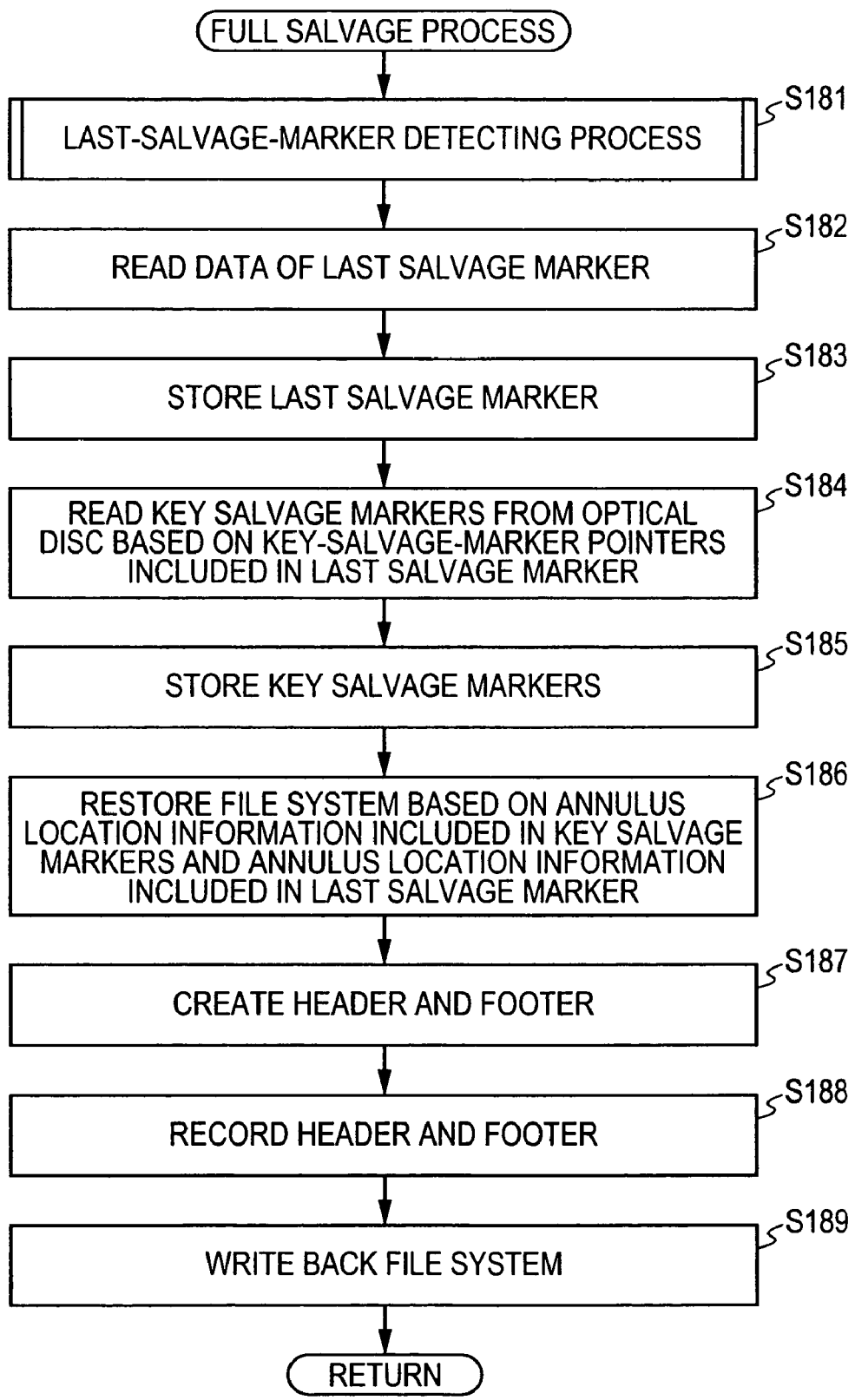
FIG. 26 is a flowchart of a full salvage process.

A playback method according to another embodiment of the present invention is a playback method for playing back data from a recording medium having recorded thereon a file system representing association between identification information for identifying a file and a position where the file is recorded, a plurality of pieces of segment data (e.g., AV data #n of annuli #n) constituting the file, and markers (e.g., salvage markers) for the respective pieces of segment data, each marker that is recorded after a key marker specified in certain cases including location information of the key marker (e.g., a key-salvage-marker pointer), the playback method including the steps of detecting a last marker (e.g., a last salvage marker SM#10, shown in FIG. 28) in a recording area where data has been recorded on the recording medium but has not been reflected on the file system, the last marker being a marker that is recorded at an end of the recording medium in a recording process (e.g., step S181, shown in FIG. 26); and executing, for each of the pieces of segment data constituting the file, a restoration process of reflecting on the file system segment data that has been recorded on the recording medium but has not been reflected on the file system, based on the location information of the key marker (e.g., pointers to key salvage markers KSM#4, KSM#7, and KSM#10, shown in FIG. 29) and the location information of segment data (e.g., location information of annuli #6 to #8, shown in FIG. 29), these pieces of location information being included in the last marker detected (e.g., step S186, shown in FIG. 26).

A program according to an embodiment of the present invention is a program for allowing a computer to execute a process of playing back data from a recording medium having recorded thereon a file system representing association between identification information for identifying a file and a position where the file is recorded, a plurality of pieces of segment data constituting the file, and markers for the respective pieces of segment data, each marker that is recorded after a key marker specified in certain cases including location information of the key marker, the process including the steps of detecting a last marker (e.g., a last salvage marker SM#10, shown in FIG. 28) in a recording area where data has been recorded on the recording medium but has not been reflected on the file system, the last marker being a marker that is recorded at an end of the recording medium in a recording process (e.g., step S181, shown in FIG. 26); and executing, for each of the pieces of segment data constituting the file, a restoration process of reflecting on the file system segment data that has been recorded on the recording medium but has not been reflected on the file system, based on the location information of the key marker (e.g., pointers to key salvage markers KSM#4, KSM#7, and KSM#10, shown in FIG. 29) and the location information of segment data (e.g., location information of annuli #6 to #8, shown in FIG. 29), these pieces of location information being included in the last marker detected (e.g., step S186, shown in FIG. 26).

A playback apparatus according to an embodiment of the present invention is a playback apparatus for playing back data from a recording medium having recorded thereon a file system representing association between identification information for identifying a file and a recording position of the file on the recording medium, a plurality of pieces of segment data (e.g., AV data #n of annuli #n) constituting the file, and markers (e.g., salvage markers) for the respective pieces of segment data, each of the markers at least including location information of the associated segment data recorded on the recording medium, each of the markers being specified as a key marker when the size of the marker has reached a predetermined upper limit, and each marker that is recorded after the marker specified as the key marker further including location information of the key marker on the recording medium (e.g., a key-salvage-marker pointer), the playback apparatus including detecting means (e.g., a salvage-marker detector 133, shown in FIG. 7) for detecting a last marker (e.g., a last salvage marker SM#10, shown in FIG. 28) in a recording area where data has been recorded on the recording medium but has not been reflected on the file system, the last marker being a marker recorded last on the recording medium in a recording process; storage means (e.g., a volatile memory 121, shown in FIG. 7) for storing the location information of the key marker on the recording medium (e.g., pointers to key salvage markers KSM#4, KSM#7, and KSM#10, shown in FIG. 29) and the location information of segment data recorded on the recording medium (e.g., location information of annuli #6 to #8, shown in FIG. 29), these pieces of location information being included in the last marker detected by the detecting means; and salvage means (e.g., a salvage processor 134, shown in FIG. 7) for executing, for each of the pieces of segment data constituting the file, a salvage process of reflecting on the file system segment data that has been recorded on the recording medium but has not been reflected on the file system, based on the location information of the key marker on the recording medium and the location information of the segment data recorded on the recording medium, these pieces of location information having been stored in the storage means.

Now, embodiments of the present invention will be described. A recording and playback apparatus records on an optical disc audio data and video data that are managed as files based on a predetermined file system (e.g., UDF (Universal Disc Format)), and records information referred to as salvage markers between pieces of the data recorded. When power supply was interrupted and a recording process was not completed normally, for example, due to detachment of the battery, i.e., when data recorded on the optical disc was not registered as a file in the file system, after the electric power is recovered, the recording position of the data that had been recorded on the optical disc before the interruption of the recording process is identified with reference to the salvage markers, and a file including the data that had been recorded before the interruption of the recording process is registered in the file system based on the recording position. Thus, even when the recording process was not completed normally, it is possible to play back the data that had been recorded on the optical disc before the interruption of the recording process. The series of processes described above will hereinafter be referred to as a salvage.

In order to check whether a file system has been recorded normally on an optical disc, for example, when UDF (Universal Disc Format) is employed as the file system, an LVID (logical volume integrity descriptor) of UDF recorded on the optical disc is referred to. The LVID is a flag indicating whether a file recorded on the optical disc has been closed normally. When the file has been closed normally and the file system has been recorded normally, a close flag is set to the LVID. On the other hand, when the file has not been closed normally and the file system has not been recorded normally, an open flag is set to the LVID.

FIG. 1 shows an example of area segmentation of an optical disc on which audio data and video data is recorded by a recording and playback apparatus according to an embodiment of the present invention.

In the example shown in FIG. 1, an inner-side FS recording area 1, a file recording area 2, and an outer-side FS recording area 3 are provided on the optical disc, in that order from the inner side.

In the inner-side FS recording area 1, management information representing what files are recorded on which parts of the file recording area 2 is recorded. The management information is referred to when a file is read from the optical disc. The management information is sometimes referred to as a file system (FS). The management information is updated when a file is recorded in the file recording area 2, a file recorded in the file recording area 2 is updated, or a file recorded in the file recording area 2 is deleted.

The file recording area 2 is divided into a non-real-time (NRT) area 11 and a real-time (RT) area 12.

In the non-real-time area 11, data of files that do not require real-time property at the time of playback, such as index files, disc information files, clip information files, and non-real-time metadata files (described later with reference to FIGS. 3 and 4), is recorded.

In the real-time area 12, data of files that require real-time property, such as audio data constituting audio files and video data constituting video files, is recorded.

In the outer-side FS recording area 3, management information that is the same as the management information recorded in the inner-side FS recording area 1 is recorded. By recording the same management information in the inner-side FS recording area 1 and the outer-side FS recording area 3, even if it is not possible to read management information recorded in one of the inner-side FS recording area 1 and the outer-side FS recording area 3 due to a scar, dirt, or the like on the optical disc, the possibility remains that the management information in the other can be read. This serves to avoid situations where it is not possible to read various files recorded in the file recording area 2.

Next, an overview of how audio data and video data are recorded in the real-time area 12 of the optical disc will be described with reference to FIGS. 2A to 2C.

Figure 2A:
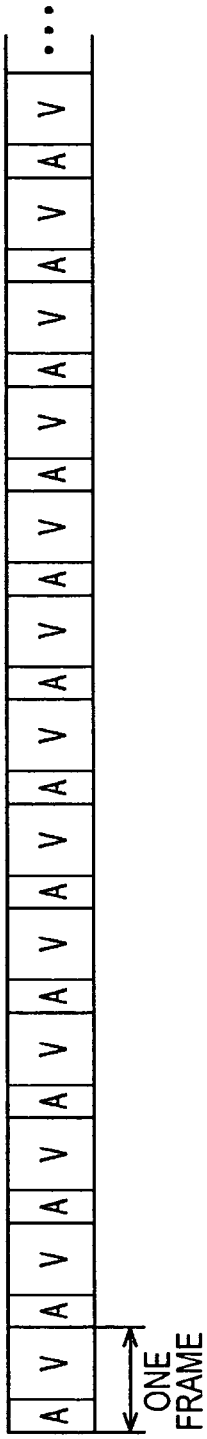
FIGS. 2A to 2C are diagrams for explaining annulus data.

In FIG. 2A, pieces of video data V and pieces of audio data A accompanying the pieces video data V are alternately arranged on a frame-by-frame basis. Hereinafter, this type of recording will be referred to as frame-based interleaved recording.

Figure 2B:
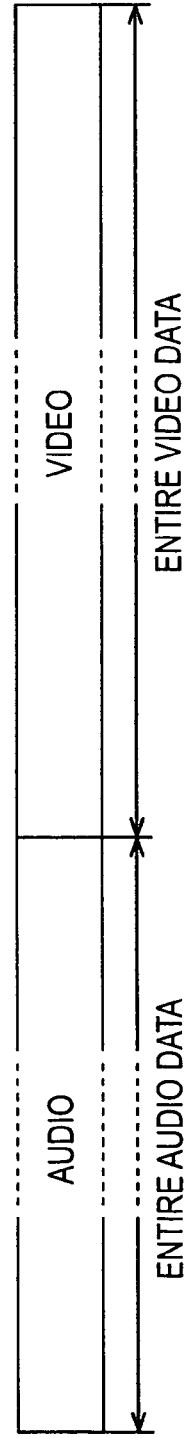

In FIG. 2B, the entire series of video data and the entire series of audio data are arranged separately each as a single file. Hereinafter, this type of recording will be referred to as non-interleaved recording.

Figure 2C:
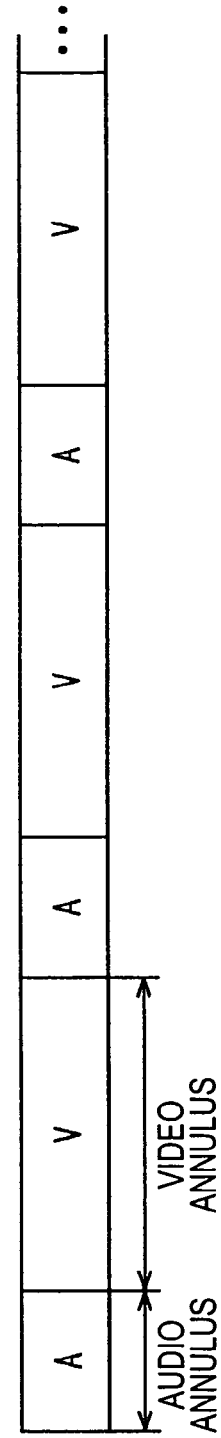

In FIG. 2C, pieces of video data V that are each longer than one frame but do not cover the entire series of video data and pieces of audio data A that are each longer than one frame but do not cover the entire series of audio data are alternately arranged.

When pieces of video data V and audio data A that are each longer than one frame but do not cover the entire series of data are alternately recorded from the inner side to the outer side of the optical disc (or vice versa), if different shades, different colors, or the like were assigned to parts where pieces of video data V are recorded and parts where pieces of audio data A are recorded, the parts where pieces of video data V are recorded and the parts where pieces of audio data A are recorded look like annuli that are formed on a cross section of a tree trunk.

Hereinafter, pieces of video data V and audio data A or the like that are each longer than one frame but do not cover the entire series of data will be referred to as annulus data. In FIG. 2C, parts of a data sequence of video data V and parts of a data sequence of audio data A are arranged periodically on an annulus-data basis. Hereinafter, this type of recording, in which parts of a plurality of data sequences is arranged periodically on an annulus-data basis, will be referred to as annulus-based interleaved recording.

In the case of frame-based interleaved recording shown in FIG. 2A, video data V and accompanying audio data A are written to the optical disc alternately on a frame-by-frame basis. This type of recording is allowed with a buffer that is capable of buffering video data V or audio data A of at least one frame. Since the buffer suffices to store video data V or audio data A of one frame, delay due to the buffering of video data V or audio data A (recording delay) is small.

In the case of frame-based interleaved recording, however, since video data V and audio data A are recorded on the optical disc alternately on a frame-by-frame basis, even when either video data or audio is edited, i.e., even when AV (audio-video) split editing is performed, both the video data V and the audio data A are read. This inhibits efficient reading of data from the optical disc.

For example, when only video data is edited, it suffices to read only video data V. When only video data V is read from an optical disc on which data has been recorded by frame-based interleaved recording, video data V of one frame is read, and seeking to the recording position of video data V of a next one frame is performed, and the video data V of the next frame is read. This operation is repeated. However, in the case of frame-based interleaved recording, what is recorded between the recording position of video data V of a frame and the recording position of video data V of a next frame is audio data A of one frame, whose amount is small. Usually, the time for reading the small audio data A is shorter than the time for performing seeking to skip the audio data A. Thus, the overall reading time is shorter when both the video data V and the audio data A are read than when only the video data V is read. However, it is not efficient to read the audio data A as well, which will not be edited.

In the case of non-interleaved recording shown in FIG. 2B, the entire sequence of video data and the entire sequence of audio data are separately arranged and recorded on the optical disc. Thus, when AV split editing is performed, it is possible to read only video data V or audio data A that is to be edited.

In the case of non-interleaved recording, the entire sequence of video data and the entire sequence of audio data are separately arranged and recorded on the optical disc; for example, the recording area of the optical disc is divided into a video area and an audio area, and video data is recorded in the video area and audio data is recorded in the audio area. Thus, when data is written to the optical disc from the inner side to the outer side continuously, a buffer having such an enormous size sufficient to store the entire sequence of video data or the entire sequence of audio data is used. With such a buffer of an enormous size, recording delay due to the buffering of video data or audio data is quite long.

In view of the above, in one type of non-interleaved recording, the writing of video data to the video area and the writing of audio data to the audio data are performed alternately by time division.

In this case, however, seeking that moves a pickup (not shown) of a disc drive (not shown) from the video area to the audio area of the optical disc and vice versa frequently occurs. This considerably reduces the effective recording rate. Furthermore, when the recording and playback apparatus is a digital video camera, occurrence of seeking should be minimized from the viewpoint of mechanical impact.

In the case of annulus-based interleaved recording shown in FIG. 2C, pieces of video data and audio data are alternately arranged and recorded on an annulus-data basis. The size of annulus data is longer than one frame but do not cover the entire sequence of data. In practice, however, it is desired that the following first and second conditions be further satisfied.

The first condition is that the seek time for performing seeking to skip a recording area of annulus data is shorter than the time for reading the annulus data from the optical disc. That is, since it does not differ from the framed-based interleaved recording (FIG. 2A) when it is quicker to read annulus data than to skip the annulus data, the first condition is that it is quicker to skip annulus data than to read the annulus data. Preferably, the seek time is sufficiently shorter than the read time.

The second condition is that the size of annulus data is such that a buffer of a practical size that allows buffering the annulus data exists. That is, in the case of annulus-based interleaved recording, since pieces of video data V and audio data A are alternately arranged and recorded on an annulus-data basis, a buffer for buffering at least video data V or audio data A on an annulus-data basis is used to record the pieces of video data V and the pieces of audio data A. Thus, without a buffer that is capable of buffering video data V or audio data A on an annulus-data basis, it is not possible to record data by the annulus-based interleaved recording. Thus, the second condition is the existence of a buffer of a practical size that allows buffering annulus data.

While annulus data is buffered in a buffer, it is not possible to record the annulus data on the optical disc, so that a recording delay occurs due to the buffering of the annulus data in the buffer. The delay time corresponds to the size of the annulus data buffered in the buffer, i.e., the size of the buffer. Thus, for example, when the delay time due to the buffering of the annulus data in the buffer is restricted by system design, the delay time due to the buffering of the annulus data should be within the restricted time.

According to the first condition, the size of annulus data should be maximized. On the other hand, according to the second condition, the size of annulus data should be minimized. Thus, the two conditions conflict with each other.

In order to satisfy the first condition that the seek time for performing seeking to skip annulus data is shorter than the read time for reading the annulus data, usually, annulus data must be located in a plurality of tracks of the optical disc, i.e., the size of annulus data must be larger than one track of the optical disc. In order that the seek time for annulus data be sufficiently shorter than the read time for the annulus data, usually, the size of annulus data should correspond approximately to some tracks of the optical disc. The size of one track is on the order of several hundred kilobytes (KB), although it depends on the radial position of the track.

As for the second condition that a buffer of a practical size that allows buffering annulus data exists, the upper limit of the practical size of the buffer is currently on the order of several ten megabytes (MB).

Thus, the size of annulus data should be in a range of roughly several MB to several ten MB. This size roughly corresponds to several ten tracks of the optical disc. As described earlier, since video data V and audio data A alternately arranged and recorded on the optical disc by units of this size look like annuli of a tree trunk, data of this size will be referred to as annulus data. The annulus data may include data other than AV data.

Next, the relationship between annulus data and salvage markers will be described with reference to FIGS. 3 and 4.

FIG. 3 shows an example order of recording data. In FIG. 3, "SM#1", "SM#2", and "SM#3" denote salvage markers. "A#1", "A#2", and "A#3" denote audio data. "V#1" and "V#2" denote video data. #1, #2, and so forth are numerals for identifying annuli.

In FIG. 3, a salvage marker SM#1, audio data A#1, video data V#1, a salvage marker SM#2, audio data A#2, video data V#2, a salvage marker SM#3, and audio data A#3 are recorded, in that order from the left. That is, one salvage marker is recorded in association with each piece of annulus data.

A salvage marker includes a recognition pattern representing that the data is a salvage marker (this recognition pattern will hereinafter be referred to as a salvage ID), and identification information for identifying a file to which the data belongs (e.g., a file name). The recording and playback apparatus can detect the salvage marker by searching for the salvage ID in data read from the real-time area 12. Information included in the salvage marker will be described later in detail with reference to FIG. 8.

Upon detecting loading of an optical disc on which a recording process was interrupted in the middle without completion, the recording and playback apparatus searches for a salvage ID on the optical disc. For example, when the salvage ID included in the salvage marker SM#1 is detected, the recording and playback apparatus reads the salvage marker SM#1 recorded at the position of the salvage ID. Then, based on the identification information for identifying a file (e.g., a file name X), included in the salvage marker SM#1, the recording and playback apparatus determines that the audio data A#1 and the video data V#1, recorded subsequently to the salvage marker SM#1, are data constituting the file X.

Then, searching for a salvage ID is continued. When the salvage ID included in the salvage marker SM#2 is detected, based on the identification information for identifying a file (e.g., also the file name X), included in the salvage marker SM#2, the recording and playback apparatus determines that the audio data A#2 and the video data V#2, recorded subsequently to the salvage marker SM#2, are data constituting the file X.

Similarly, further salvage markers are read and data included in the file X is identified. By sequentially tracking salvage markers in the manner described above, audio data and video data that have been recorded but not yet reflected on the file system as files are searched for, and the file X including the audio data and video data found by the searching is registered in the file system as a single file.

Figure 4:
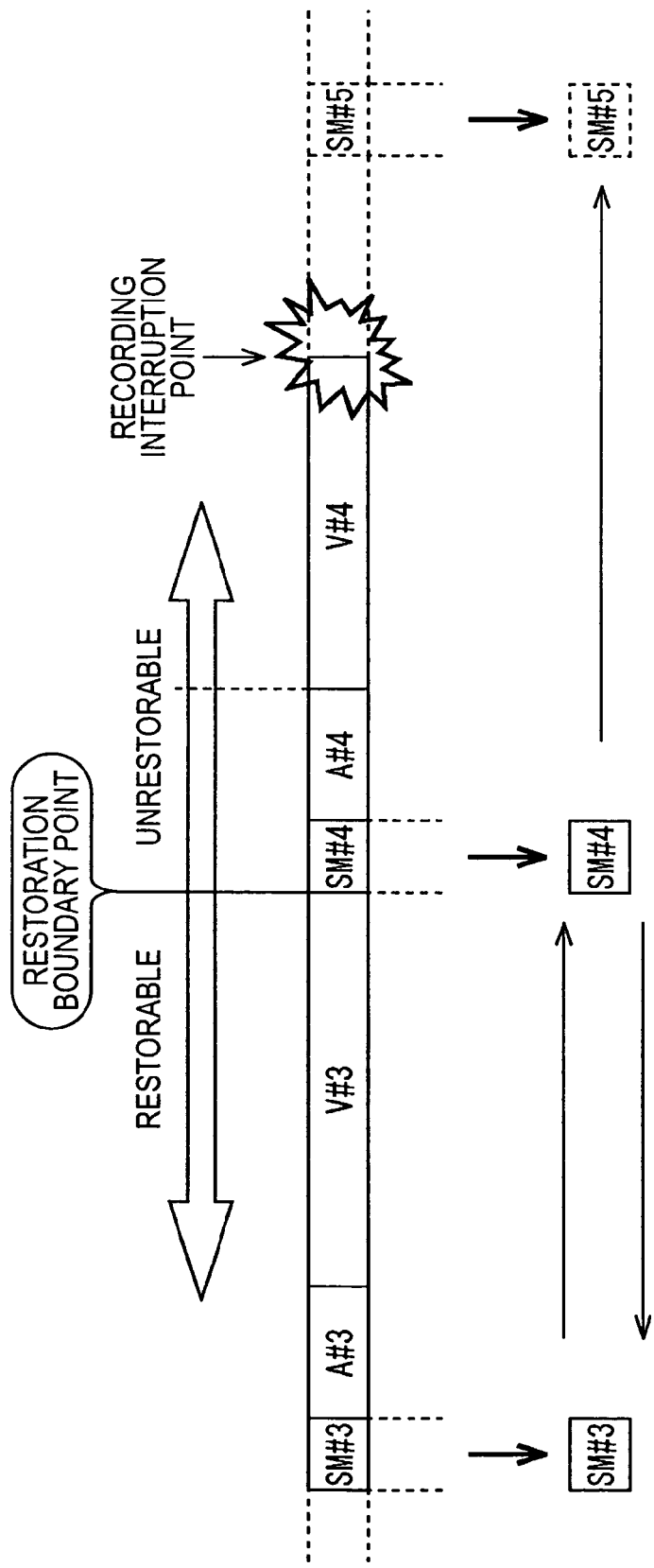
FIG. 4 is a diagram for explaining relationship between annulus data and salvage markers.

FIG. 4 shows the state of recording position at the time when a recording process was interrupted. Also in FIG. 4, a salvage marker SM#3, audio data A#3, video data V#3, a salvage marker SM#4, and audio data A#4 are recorded, in that order from the left similarly to FIG. 3. At the position indicated by an arrow as "recording interruption point" in the middle of video data V#4 on the right, recording of the video data V#4 was interrupted. Obviously, a salvage marker SM#5 that is to be recorded subsequently is not recorded on the recording medium.

In the vicinity of the recording interruption point, the audio data A#3 and the video data V#3 recorded between the salvage markers SM#3 and SM#4 can be used as parts of data contained in the file. However, data subsequent to the salvage marker SM#4 will not be used. Thus, a single file is created using data before the salvage marker SM#4.

Alternatively, the audio data A#4 and the fragment of the video data V#5 subsequent to the salvage marker SM#4 may be used. In this case, however, when a salvaged file is played back, video could be disrupted or missing in the vicinity of the end of the file. In that case, by editing the data by cutting the data at a point immediately before the data becomes disrupted or missing, a file including all the data recorded before the recording interruption point can be created.

Although audio data and video data are included in the same file in the examples shown in FIGS. 3 and 4, audio data and video data may be included in separate files. In that case, audio data and video data detected by tracking salvage markers after the recording was interrupted as shown in FIG. 4 are registered as separate files in the file system. In the following description, it is assumed that audio data and video data are managed as separate files.

FIGS. 3 and 4 show directory structures that are employed when data recorded on the file recording area 2 of the optical disc are managed as files.

Figure 5:
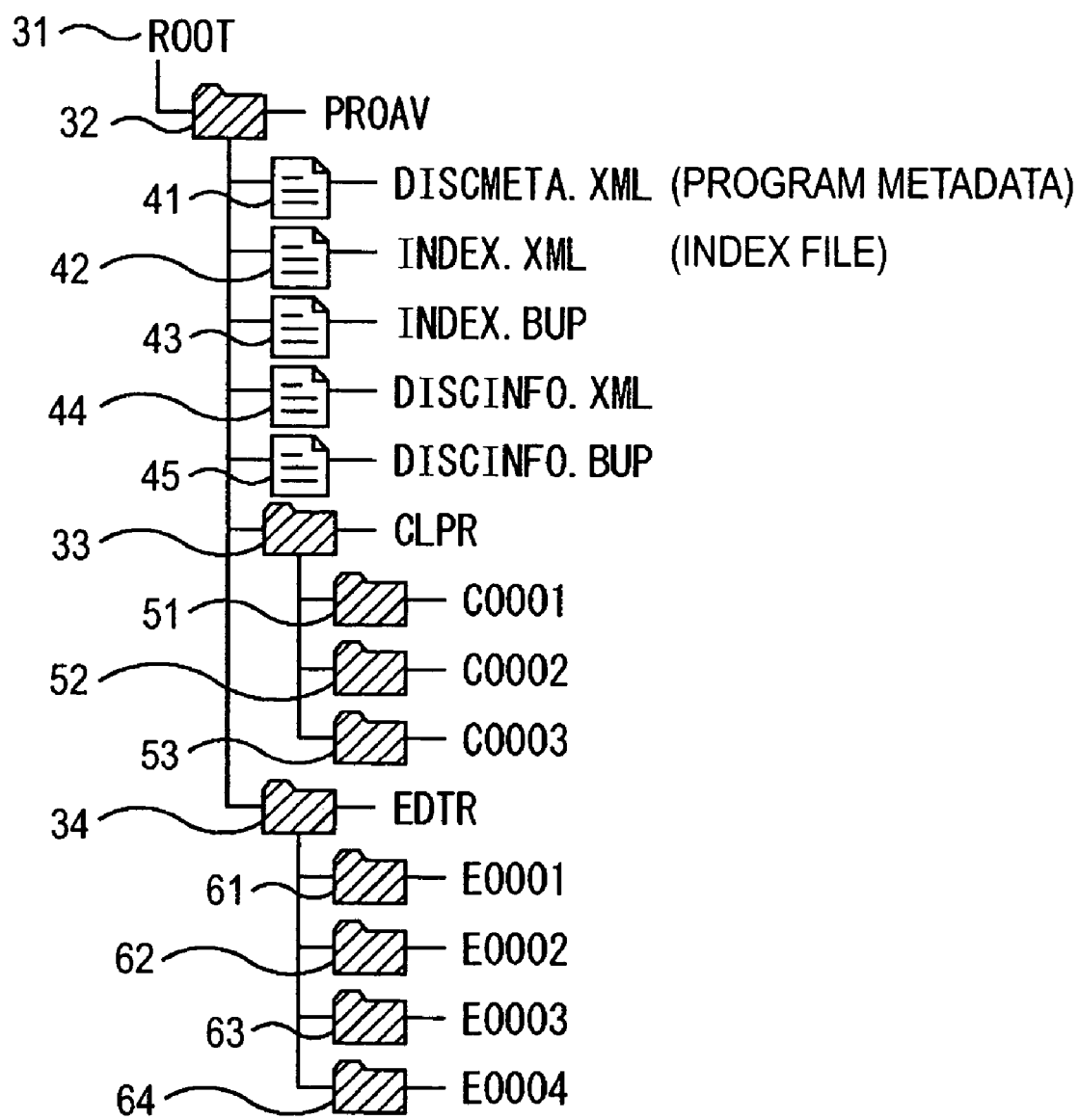
FIG. 5 is a diagram showing a directory structure that is used to manage files of data recorded on an optical disc.

As shown in FIG. 5, a PROAV directory 32 is provided immediately under a root directory (ROOT) 31. Under the PROAV directory 32, video data, audio data, edited video data and audio data, and other data are stored directly or in subdirectories.

In the PROAV directory 32, a disc metafile (DISC-META.XML) 41, which is a file including titles and comments for all the data recorded on the optical disc, an index file (INDEX.XML) 42 including management information and the like for managing all the clips and editing lists recorded on the optical disc, and index file (INDEX.BUP) 43, which is a copy of the index file 42, are provided. Reliability is enhanced by providing two files of the same content.

Furthermore, under the PROAV directory 32, a disc information file (DISCINFO.XML) 44 and a disc information file (DISCINFO.BUP) 45 are provided. The disc information file 44 includes metadata relating to the entire data recorded on the optical disc, such as disc property, playback start position, and information indicating prohibition of recording on the disc. The disc information file 45 is a copy of the disc information file 44. Reliability is enhanced by providing two files of the same content.

Furthermore, under the PROAV directory 32, a clip root directory (CLPR) 33 where clip data is provided in subdirectories, and an edit list root directory (EDTR) 34 where data of edit lists are provided in subdirectories, are provided.

In the clip root directory 33, data of clips recorded on the optical disc is managed in separate directories for the respective clips. In the example shown in FIG. 5, three clips of data are managed separately in a clip directory (C0001) 51, a clip directory (C0002) 52, and a clip directory (C0003) 53, respectively.

A clip is a unit of the number of times of an imaging process executed. Also, a clip serves as a unit of time taken from the start to the end of the imaging process, a unit of the length of various types of data obtained through the imaging process, or a unit of the data volume of various types of data obtained through the imaging process. Furthermore, a clip sometimes refers to a piece of the various types of data.

In the edit list root directory 34, edit lists (editing information indicating how clips have been edited in editing processes) recorded on the optical disc are managed in separate directories for respective editing processes. In the example shown in FIG. 5, four edit lists are managed in an edit list directory (E0001) 61, an edit list directory (E0002) 62, an edit list directory (E0003) 63, and an edit list directory (E0004) 64, respectively.

Figure 6:
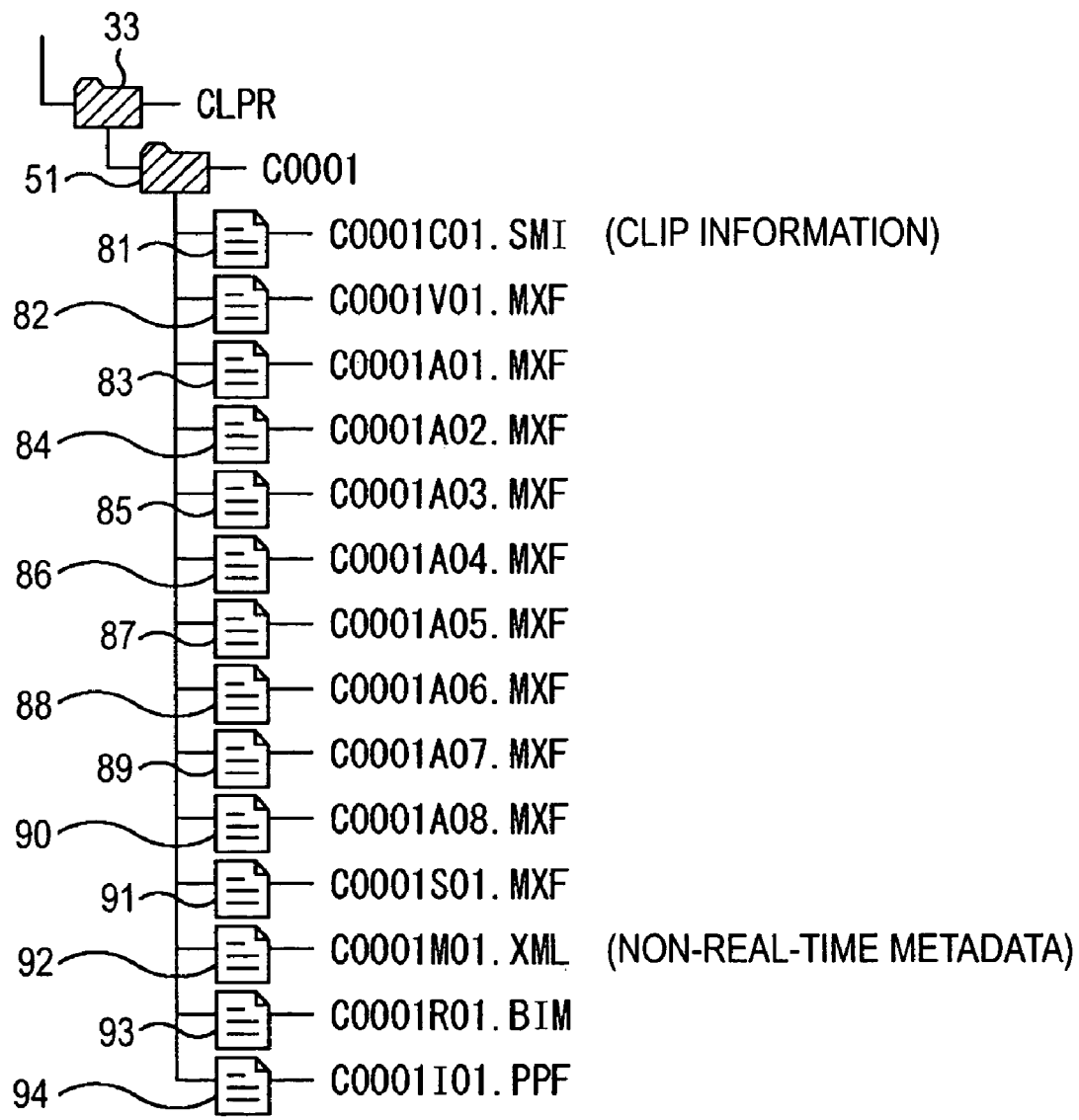
FIG. 6 is a diagram showing a directory structure that is used to manage files of data recorded on an optical disc.

In subdirectories of the clip directory 51 under the clip root directory 33, the data of clips recorded on the optical disc are managed as files as shown in FIG. 6.

In the example shown in FIG. 6, the clip directory 51 includes a clip information file (C0001C01.SMI) 81 for managing this clip, a video data file (C0001V01.MXF) 82 composed of video data of this clip, eight audio data files (C0001A01.MXF to C0001A08.MXF) 83 to 90 composed of audio data of the respective channels of this clip, a low-resolution data file (C0001S01.MXF) 91 composed of low-resolution data corresponding to the video data of this clip (video data composed of the same material as the video data, and having a lower resolution and a smaller data volume than the video data), and a non-real-time metadata file (C0001M01.XML) 92 composed of clip metadata not requiring real-time property, such as a conversion table for associating a linear time code (LTC) of essence data of this clip with a frame number.

The clip directory 51 also includes a frame metadata file (C0001R01.BIM) 93 composed of frame metadata requiring real-time property, such as an LTC for essence data of this clip, and a picture pointer file (C0001I01.PPF) 94 describing a frame structure of the video data file 82 (e.g., information regarding compression method of each picture in MPEG, and information such as an offset address from the head of the file).

Of the files shown in FIGS. 5 and 6, data of files not requiring real-time property, such as the disc metafile 41, the index files 42 and 43, the disc information files 44 and 45 in the PROAV directory 32, and the clip information file 81 and the non-real-time metadata file 92 in the clip directory 51, is recorded in the non-real-time area 11 of the optical disc.

Data of files requiring real-time property, such as the video data file 82, the audio data files 83 to 90, the frame metadata file 93, and the picture pointer file 94 in the clip directory 51, is recorded in the real-time area 12 of the optical disc.

Figure 7:
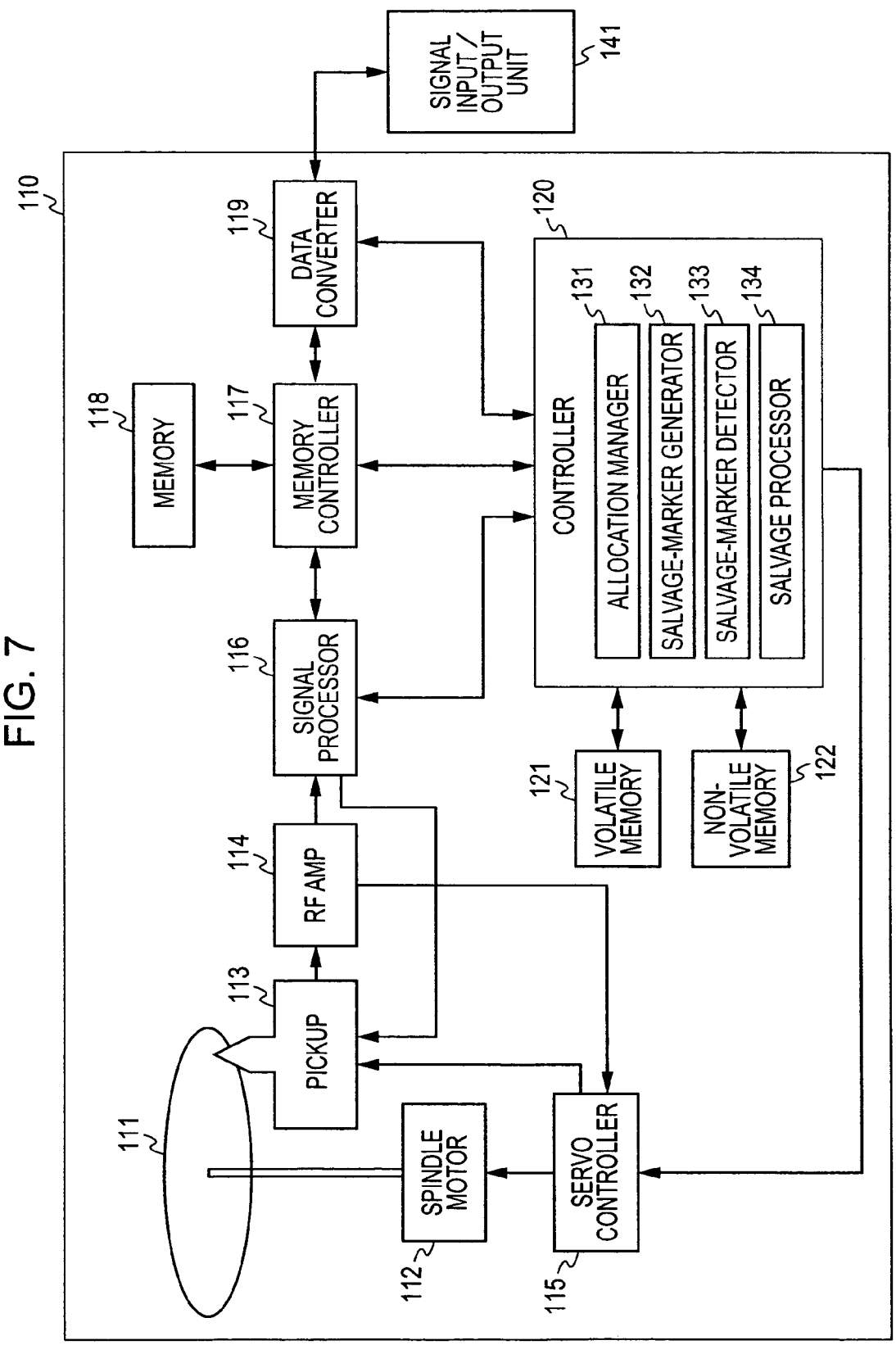
FIG. 7 is a block diagram showing the construction of a recording and playback apparatus according to an embodiment of the present invention.

FIG. 7 shows the construction of a recording and playback apparatus according to an embodiment of the present invention. In a recording and playback apparatus 110, a spindle motor 112 drives an optical disc 111 based on a spindle-motor driving signal fed from a servo controller 115, for example, at a constant linear velocity (CLV) or a constant angular velocity (CAV).

During recording, a pickup 113 controls output of laser light based on a recording signal fed from a signal processor 116, thereby recording the recording signal on the optical disc 111. During playback, the pickup 113 irradiates the optical disc 111 with laser light, converts laser light reflected from the optical disc 111 into a current signal, and supplies the current signal to a radio-frequency (RF) amplifier 114. The point irradiated with laser light is controlled according to a servo signal fed from the servo controller 115 to the pickup 113.

The RF amplifier 114 generates a focus error signal, a tracking error signal, and a playback signal based on the current signal fed from the pickup 113. The RF amplifier 114 supplies the tracking error signal and the focus error signal to the servo controller 115, and supplies the playback signal to the signal processor 116.

The servo controller 115 performs a focus servo operation and a tracking servo operation. More specifically, the servo controller 115 generates a focus servo signal and a tracking servo signal based on the focus error signal and the tracking error signal, respectively, and supplies the focus servo signal and the tracking servo signal to an actuator (not shown) of the pickup 113. Also, the servo controller 115 generates a spindle-motor driving signal for driving the spindle motor 112, thereby performing a spindle servo operation to control the speed of rotation of the optical disc 111 as desired.

The servo controller 115 also performs a sled control to move the pickup 113 in the radial direction of the optical disc 111 and thereby change the position of irradiation with laser light. The position for reading a signal from the optical disc 111 is set by a controller 120, and the position of the pickup 113 is controlled so that a signal is read from the signal reading position that has been set.

The signal processor 116 modulates audio data, video data, other data, and salvage markers to be recorded on the optical disc 111, input from a memory controller 117, thereby generating recording signals, and supplies the recording signals to the pickup 113. Also, the signal processor 116 demodulates playback signals input from the RF amplifier 114, thereby generating playback data. The playback data is fed to the memory controller 117.

The memory controller 117 causes the audio data, video data, and other data to be recorded on the optical disc 111, input from the data converter 119, and salvage markers generated by a salvage-marker generator 132, to be buffered in a memory 118, and reads these items and supplies the items to the signal processor 116 as needed. Also, the memory controller 117, as needed, extracts audio data, video data, and other data included in playback data fed from signal processor 116 and buffers these items in the memory 118, and reads these items and supply them to a data converter 119. Also, the memory controller 117 extracts salvage markers included in the playback data fed from the signal processor 116, and, as needed, stores the salvage markers in the memory 118, reads the salvage markers, and supplies the salvage markers to the controller 120.

The data converter 119 encodes, for example, video signals and audio signals acquired by a video camera (not shown), or video signals and audio signal played back from an arbitrary recording medium (not shown), according to the Moving Picture Experts Group (MPEG) standard, the Joint Photographic Experts Group (JPEG) standard, or the like, and supplies the resulting audio data and video data to the memory controller 117. The data converter 119 may be omitted.

The data converter 119 decodes audio data and video data included in the playback data fed from the memory controller 117, converts the resulting video signals and audio signals into output signals in a predetermined format, and outputs the resulting signals to a signal input/output unit 141.

The controller 120 controls the servo controller 115, the signal processor 116, the memory controller 117, the data converter 119, and a volatile memory 121, thereby performing a recording process a playback process, and so forth. Furthermore, the controller 120 generates information that is to be held in a non-volatile memory 122.

The controller 120 includes an allocation manager 131, a salvage-marker generator 132, a salvage marker detector 133, and a salvage processor 134.

The allocation manager 131 manages a recording position, a playback position, and so forth of data on the optical disc 111.

The salvage-marker generator 132 generates salvage markers. For example, the salvage marker 132 generates a salvage marker #n, which will be described later with reference to FIG. 8. The salvage-marker generator 132 supplies salvage markers generated to the memory controller 117. Furthermore, the salvage-marker generator 132 is capable of storing salvage markers generated in an internal memory.

The salvage-marker detector 133 detects a last salvage marker, which is a marker that has been recorded last in a recording process. More specifically, of a plurality of salvage markers recorded on the optical disc 111, the salvage-marker detector 133 detects a last salvage marker, i.e., a marker that is recorded last on the optical disc 111 in a recording process in a recording area that has not yet been reflected on the file system. That is, a last salvage marker is a latest salvage marker that was recorded at a time closest to the current time in a recording area that has been recorded on the optical disc 111 but has not yet been reflected on the file system.

The salvage processor 134 performs a salvage process. More specifically, the salvage processor 134, based on salvage markers, performs a process for reflecting on the file system audio data and video data that have been recorded on the optical disc 111 but have not been reflected on the file system. That is, a salvage process is a process for reflecting on the file system audio data and video data that have been recorded on the optical disc 111 but have not been reflected on the file system. Also, the salvage processor 134 stores data used in the salvage process in a volatile memory 121 as needed.

A non-volatile memory 122 stores non-volatile-memory information generated by the controller 120.

The salvage-marker generator 132, the salvage-marker detector 133, and the salvage processor 134 may be provided externally to the controller 120 (e.g., so as to be connected to the signal processor 116 and the memory controller 117).

Furthermore, although not shown, the recording and playback apparatus 110 may include a disc loading/unloading motor for loading and unloading the optical disc 111, a display for displaying operation status of the recording and playback apparatus 110 and various guidance information, and an operation unit for accepting input of operations by a user.

Next, information included in a salvage marker will be described with reference to FIG. 8. FIG. 8 shows an example of information that is included in a salvage marker SM#n associated with an annulus #n. The salvage marker SM#n is generated, for example, by the salvage-marker generator 132 shown in FIG. 7.

The information included in a salvage marker is divided into management data and stored data. The management data includes a salvage marker ID, an increment number, a recording date and time, the number of times of circulating recording, key-salvage-marker pointers, a unique material ID (UMID), and stored-data header.

The salvage marker ID serves to identify the data as a salvage marker and is used to detect the salvage marker. The increment number serves to represent continuity with other salvage markers across audio data and video data, such as a serial number. The increment number of the salvage marker shown in FIG. 8 will be denoted as #n.

The recording date and time represents the date and time when the salvage marker was recorded. The recording date and time serves to exclude data that has been deleted intentionally by the user from full salvage. Furthermore, for example, the recording date and time may be used for the salvage-marker detector 133 to detect a last salvage marker. Instead of the recording date and time, either the date and the time, or other data that allows identifying the timing of recording may be used.

The number of times of circulating recording is the number of times of rewriting at the position where the salvage marker is recorded on the optical disc 111. In the recording on the optical disc 111, circulating recording is performed so that the number of times of writing becomes uniformed over the recording area of the optical disc 111. In the salvage marker, the number of times of recording at the recording area where the salvage marker (associated annulus data) is recorded is included. Furthermore, in the file system, the number of times of writing to the recording area of the optical disc 111 is managed. That is, the management information of the file system includes the number of times of circulating recording in the recording area of the optical disc 111. The number of times of circulating recording is used, for example, for the salvage-marker detector 133 to detect a last salvage marker. That is, for example, the salvage-marker detector 133 detects a last salvage marker using the number of times of circulating recording. Without limitation to the number of times of circulating recording, simply, the number of times of recording in a certain recording area of the optical disc 111 may be used.

The key-salvage-marker pointer is location information (record) representing the position where a key salvage marker (described later in detail) that has been recorded on the optical disc 111 is recorded. It is possible to store a predetermined number (e.g., 100) of key-salvage marker pointers.

The UMID serves to uniquely identify audio data and video data of an associated annulus #n. The stored-data header indicates that subsequent data is stored data of the salvage marker.

The stored data of the salvage marker is divided into file data and file-system management data. The file data includes program metadata, added part of index file, clip information, and non-real-time metadata that are non-real-time files associated with audio data and video data of annuli #(n+1), #(n+2), . . . subsequent to the annulus #n associated with the salvage marker SM#n. Also for data other than the index file, only added part may be recorded in the stored data.

The stored data of the salvage marker corresponds to the program metadata file 41, the index file 42, the clip information 81, and the non-real-time metadata 92 described with reference to FIGS. 5 and 6.

The file-system management data includes a file entry, annulus location information, and a defect list.

The file entry serves to identify a file that is restored based on the salvage marker, such as a file name. The annulus location information represents the position where audio data and video data of annuli #(n−2), #(n−3) . . . up to two annuli before the annulus #n associated with the salvage marker SM#n. The defect list represents positions where defects have occurred during the recording of annulus data.

As long as the upper limit of size defined for the salvage marker (e.g., 64 kilobytes), it is possible to store the location information of the annulus data #(n−2) two annuli before in the location information of annulus data recorded in the salvage marker SM#(n−1) one annulus before. However, if the overall size of the salvage marker exceeds the upper limit when the location information of the annulus data #(n−2) two annuli before is stored, only the annulus data #(n−2) two annuli before is stored.

A salvage marker in which maximum location information of annulus data up to two annuli before is stored so that the overall size of the salvage marker does not exceed the upper limit is specified as a key salvage marker. Each salvage marker recorded after the key salvage marker includes a key-salvage-marker pointer corresponding to location information of the key salvage marker on the optical disc 111.

Next, non-volatile-memory information stored in the non-volatile memory 122 will be described with reference to FIG. 9. FIG. 9 shows an example of information included in non-volatile-memory information.

The non-volatile-memory information is divided into management data and stored data. The management data includes an update date and time, an index ID, and a stored-data header.

The update date and time indicates the latest date and time when the non-volatile-memory information was recorded or updated. The index ID is specific information that serves to uniquely identify the optical disc 111 loaded on the recording and playback apparatus 110 when the non-volatile-memory information was recorded. For example, information that is assigned when the non-real-time area 11 is formatted is used. The stored-data header indicates that subsequent data is stored data of the non-volatile-memory information.

The stored data of the non-volatile-memory information includes a current-salvage-marker pointer, key-salvage-marker pointers, annulus location information not yet recorded in salvage markers on the disc, and recorded annulus information.

The current-salvage-marker pointer indicates the position where the latest one of the salvage markers that have been recorded on the optical disc 111 is recorded. Each of the key-salvage-marker pointers represents the recording position of a key salvage marker that has been recorded on the optical disc 111. It is possible to store a predetermined number (e.g., 100) of key-salvage-marker pointers. The annulus location information not yet recorded in salvage marker on the disc includes annulus location information that have not yet been recorded on the optical disc 111 as included in salvage markers. The recorded annulus information serves to identify the latest annulus data that has been recorded on the optical disc 111.

Figure 10:
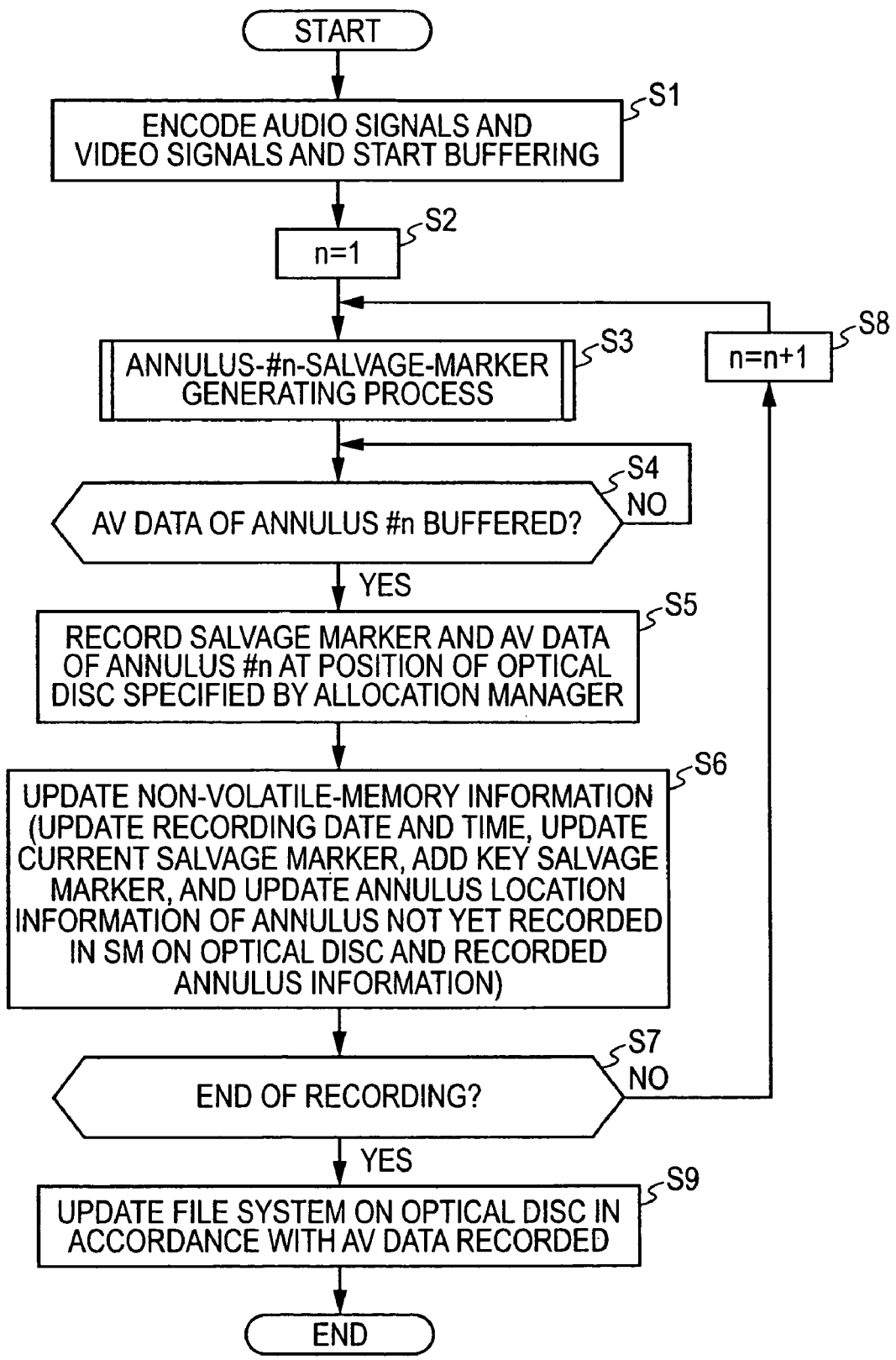
FIG. 10 is a flowchart of a recording process.

Next, a process for recording audio data and video data on the optical disc 111 by the recording and playback apparatus 110 (hereinafter simply referred to as a recording process) will be described with reference to a flowchart shown in FIG. 10. The recording process is started, for example, when audio signals and video signals are fed from the signal input/output unit 141 according to an instruction by the user.

In step S1, the data converter 119, under the control of the controller 120, starts compressing the audio signals and video signals fed from the signal input/output unit 141, and outputs the resulting audio data and video data to the memory controller 117. The memory controller 117, under the control of the controller 120, starts buffering the audio data and video data input from the data converter 119 in the memory 118.

Figure 11:
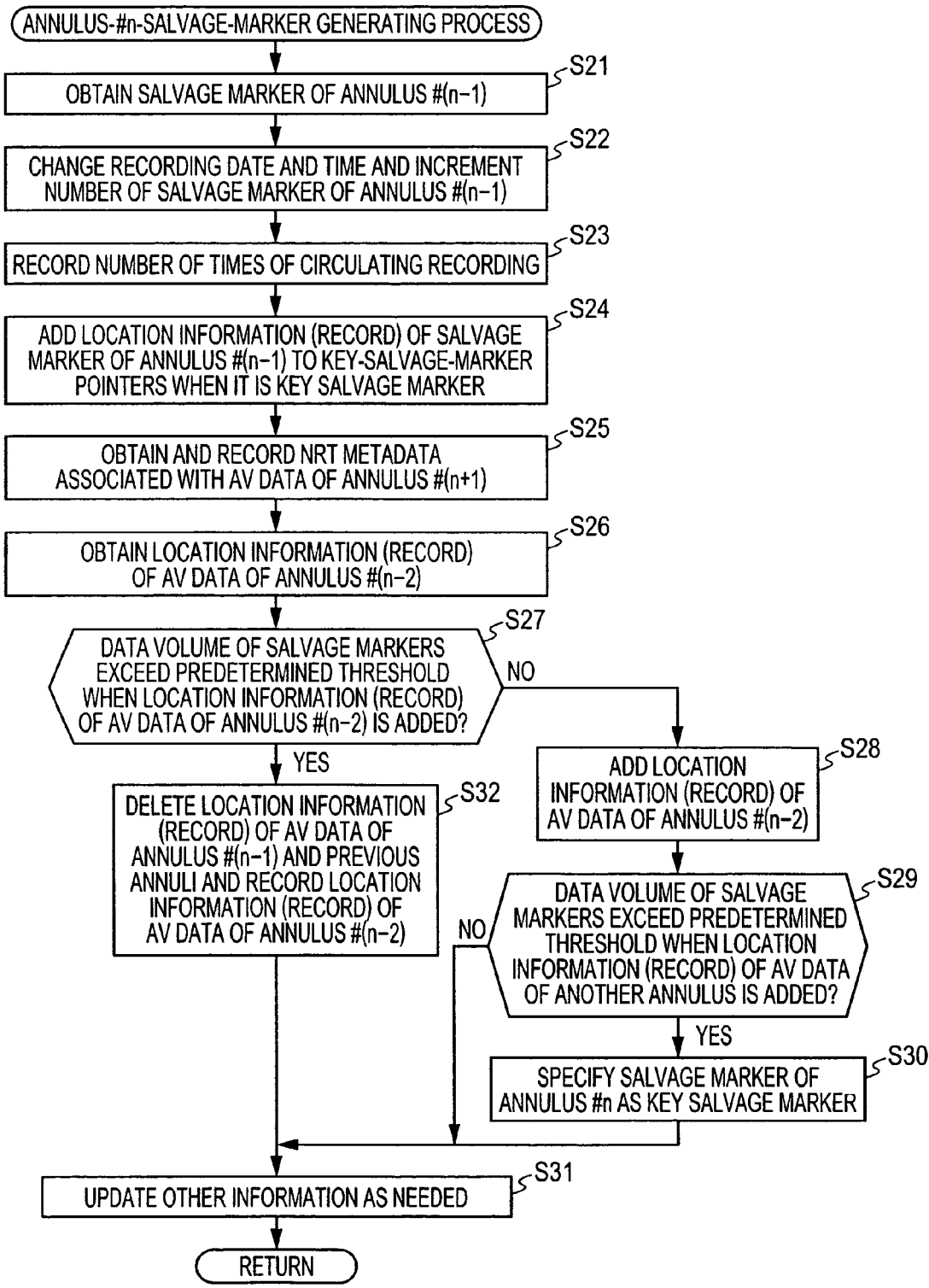
FIG. 11 is a flowchart of a salvage-marker generating process.

In step S2, the controller 120 initializes a parameter n that is used to identify an annulus to 1. In step S3, the salvage-marker generator 132 generates a salvage marker SM#n associated with the annulus #n. For example, when n is 1, the salvage-marker generator 132 generates a salvage marker SM#1 associated with the annulus #1. The process executed in step S3 will be described below with reference to FIG. 11.

In step S21, the salvage-marker generator 132 obtains a previously generated salvage marker SM#(n−1) from an internal memory as a template of salvage marker. The salvage-marker generator 132 subsequently generates salvage markers SM#n by updating information included in the template of salvage marker. When the previously generated salvage marker SM#(n−1) is absent, the salvage-marker generator 132 obtains a default template stored in the internal memory instead of the salvage marker SM#(n−1).

Alternatively, without executing step S21, the template in the internal memory of the salvage-marker generator 132 may be updated in step S22 and subsequent steps.

In step S22, the salvage-marker generator 132 updates the recording date and time of the template to the current time and date, and increments the increment number by 1.

In step S23, the salvage-marker generator 132 records the number of times of circulating recording of the annulus #n. In the optical disc 111 in this embodiment, the number of times of recording in any recording area is recorded. Thus, the salvage-marker generator 132 increments by 1 the number of times of recording in a specific recording area, read from the optical disc 111 via some components (the pickup 113, the RF amp 114, the signal processor 116, and so forth), and records the result as the number of times of circulating recording of the annulus #n.

In step S24, when the salvage marker SM#(n−1) was specified as a key salvage marker in a previous iteration of the process for generating the salvage marker SM#(n−1), the salvage-marker generator 132 obtains the location information (record) of the salvage marker SM#(n−1) from the allocation manager 131, and adds it to key salvage markers in the template. That is, in salvage markers after a specified key salvage marker, key-salvage-marker pointers are added (stored).

In step S25, the salvage-marker generator 132 obtains NRT metadata associated with the audio data and video data of a next annulus #(n+1) (e.g., from the controller 120), and overwrites the file data of the template with the NRT metadata.

In step S26, the salvage-marker generator 132 obtains from the allocation manager 131 the location information (record) of the audio data and the video data of the annulus #(n−2) two annuli before.

In step S27, the salvage-marker generator 132 determines whether the size of the salvage marker being generated exceeds a predetermined threshold (e.g., an upper limit of 64 kilobytes) when the location information (record) of the audio data and video data of the annulus #(n−2) obtained in step S26 is added to the location information of the template.

When it is determined that the size of the salvage marker being generated does not exceeds the predetermined threshold, the process proceeds to step S28. In step S28, the salvage-marker generator 132 adds the location information (record) of the audio data and video data of the annulus #(n−2), obtained in step S26, to the annulus location information of the template.

In step S29, the salvage-marker generator 132 determines whether the size of the salvage marker SM#n being generated exceeds the predetermined threshold when the location information (record) of the audio data and video data of another annulus is added to the annulus location information of the template. When it is determined that the size of the salvage marker SM#n being generated exceeds the predetermined threshold when the location information (record) of the audio data and video data of another annulus is added to the annulus location information of the template, the process proceeds to step S30.

In step S30, the salvage-marker generator 132 specifies the salvage marker SM#n being generated as a key salvage marker, and updates other information in the template as needed, thereby fully generating the salvage marker SM#n, and outputs the salvage marker SM#n generated to the memory controller 117. At this time, the salvage-marker generator 132 adds the own location information of the salvage marker SM#n as a key salvage marker. Thus, a salvage marker specified as a key salvage marker includes a key-salvage-marker pointer indicating its own location information. Alternatively, a salvage marker specified as a key salvage marker may be such that a key-salvage-marker pointer indicating its own location information is not included.

The file entry of the template are maintained the same form the start to the end of the recording process, and when the next recording process is started, a file entry different from that in the current iteration is generated. Thus, annuli constituting the same file are distinguished from each other.

When it is determined that the size of the salvage marker SM#n being generated exceeds the predetermined threshold even when the location information (record) of the audio data and video data of another annulus is added to the annulus location information of the template, i.e., when the location information of audio data and video data of annuli up to the annulus two annuli before is maximally stored, the salvage marker SM#n is specified as a key salvage marker. That is, when the data size of a salvage marker has reached a predetermined upper limit, the salvage marker is specified as a key salvage marker.

When it is determined in step S29 that the size of the salvage marker SM#n being generated does not exceed the predetermined threshold even when the location information (record) of the audio data and video data of another annulus is added to the annulus location information of the template, step S30 is skipped.

When it is determined in step S27 that the size of the salvage marker SM#n being generated exceeds the predetermined threshold, the process proceeds to step S32. In step S32, the salvage-marker generator 132 deletes the location information (record) of the audio data and video data of the annulus #(n−1) and previous annuli recorded in the template, and records (updates) only the location information (record) of the audio data and video data of the annulus #(n−2), obtained in step S26, in the annulus location information of the template. The process then proceeds to step S31.

When it is determined in step S29 that the size of the salvage marker SM#n being generated does not exceed the predetermined threshold even when the location information (record) of the audio data and video data of another annulus is added to the annulus location information of the template, after step S30 or step S32, the process proceeds to step S31, in which the salvage-marker generator 132 updates other information as needed. The process is then exited.

This concludes the description of the annulus-#n salvage-marker generating process. Through the process shown in FIG. 11, the salvage marker SM#n (FIG. 8) of the annulus #n can be generated. In the salvage marker of the annulus #n, "the location information (record) of the audio data and video data of the annulus #(n−2)", which is the location information of annulus data that is at least two annuli before, is recorded. Furthermore, a salvage marker SM#n of an annulus #n that stores maximum location information of annulus data up to annulus two annuli before without its overall size not exceeding the upper limit is specified as a key salvage marker. When the data size of a salvage marker SM#n of an annulus #n has reached a predetermined upper limit, the salvage marker SM#n is specified as a key salvage marker, and the location information of the key salvage marker on the optical disc 111 (a key-salvage-marker pointer) is stored in salvage markers that are recorded after the key salvage marker. The salvage marker SM#n generated is fed to the memory controller 117.

Referring back to FIG. 10, after the salvage marker SM#n is generated in step S3, in step S4, the memory controller 117 monitors the memory 118 under the control of the controller 120 to determine whether audio data and video data of one annulus have been buffered in the memory 118, and waits until it is determined that audio data and video data of one annulus have been buffered. When audio data and video data of one annulus have been buffered, the process proceeds to step S5. Steps S3 and S4 may be executed in parallel.

In step S5, the memory controller 117, under the control of the controller 120, supplies the salvage marker SM#n generated in step S3 and fed from the salvage-marker generator 132, and the audio data and video data of the annulus #n, having been buffered in the memory 118, to the signal processor 116. Hereinafter, the audio data and the video data of the annulus #n will be referred to as audio data A#n and video data V#n. Also, the audio data A#n and the video data V#n will be collectively denoted as AV data #n.

The signal processor 116 modulates the salvage marker SM#n, the audio data A#n, and the video data V#n fed thereto into recording signals, in that order, and supplies the recording signals to the pickup 113. The pickup 113 records the recording signals input from the signal processor 116 on the optical disc 111.

In step S6, the controller 120 updates the non-volatile-memory information in the non-volatile memory 122. When the non-volatile-memory information is absent in the non-volatile memory 122, non-volatile-memory information is newly generated similarly to the updating of the non-volatile-memory information described below.

More specifically, the recording date and time of the management data of the non-volatile-memory information is updated to the current date and time, and the current-salvage-marker pointer of the management data is updated with the location information (record) of the salvage marker SM#n recorded on the optical disc 111 in step S5. Furthermore, when the salvage marker SM#n generated in step S3 is specified as a key salvage marker in step S30, the location information (record) of the salvage marker SM#n as a key salvage marker is added to the key-salvage-marker pointers in the management data. Furthermore, the location information (record) of the AV data #n of the annulus #n and the location information (record) of the AV data #(n−1) of the annulus #(n−1) are recorded in "annulus location information not yet recorded in salvage markers on disc". Thus, the non-volatile-memory information shown in FIG. 9 is updated. Although a single piece of "annulus location information not yet recorded in salvage markers on disc" is included in the example shown in FIG. 9, after step S6, two pieces of location information, namely, the location information (record) of the AV data #n of the annulus #n and the location information (record) of the AV data #(n−1) of the annulus #(n−1), are recorded.

In step S7, the memory controller 117 checks whether audio data and video data that have not been output to the signal processor 116 are buffered in the memory 118, and notifies the controller 120 of the checking result. Based on the checking result fed from the memory controller 117, the controller 120 determines whether or not to exit the recording process. More specifically, when audio data and video data that have not been output to the signal processor 116 are buffered in the memory 118, it is determined that the recording process is not to be exited. Then, the process proceeds to step S8, in which the parameter n is incremented by 1. Then, the process returns to step S3, and subsequent steps are repeated.

When it is determined in step S7 that audio data that have not been output to the signal processor 116 are not buffered in the memory 118, it is determined that the recording process is to be exited. Then, the process proceeds to step S9.

In step S9, the controller 120 creates a file system (management information) for managing, as a file, the salvage marker, audio data, and video data recording on the optical disc 111 in step S5, supplies the file system (management information) to the signal processor 116, updates the file system (management information) recorded in at least one of the inner-side FS recording area 1 and the outer-side FS recording area 3, and records information indicating that the file system has been normally closed. For example, when the file system is UDF, a close flag is set in a logical volume integrity descriptor (LVID) of UDF. Furthermore, the controller 120 deletes the non-volatile-memory information in the non-volatile memory 122. This concludes description of the recording process.

The above description applies to cases where the recording process was completed normally. This embodiment is directed to dealing with cases where the recording process was interrupted without normally completing.

Next, the recording process described above will be described in more detail. FIGS. 12 to 20 show temporal changes in main parts of non-volatile-memory information stored in the non-volatile memory 122, recorded data that has been reflected on the file system (management information), the status of recording of data in the real-time area 12 of the optical disc 111, and main information included in salvage markers.

Figure 12:
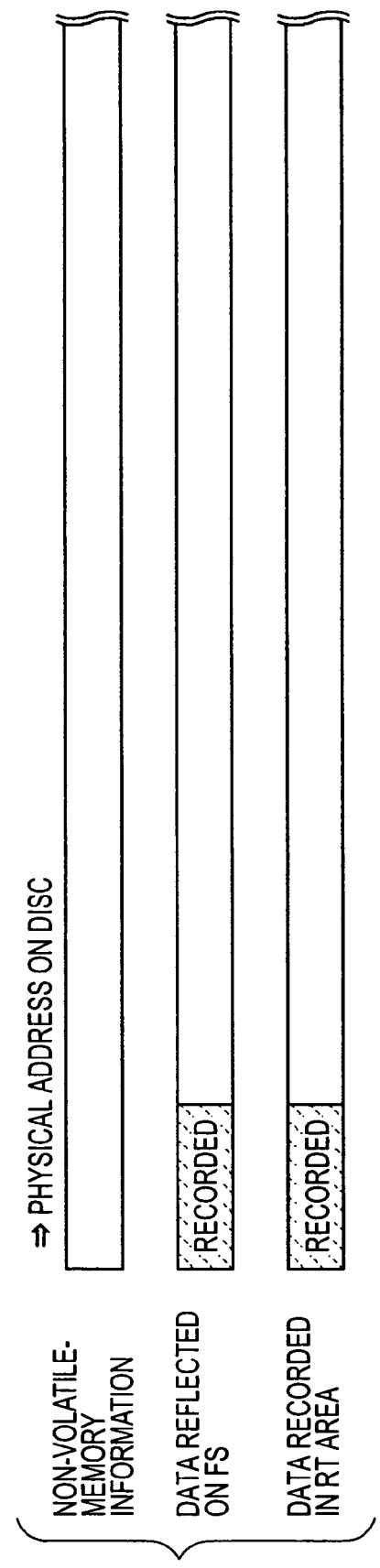
FIG. 12 is a diagram for specifically explaining the recording process.

FIG. 12 shows the state before the recording process is started. In this state, no information is stored in the non-volatile memory 122. Data that has already been recorded on the optical disc 111 exists, and the data has already been reflected on the file system.

Figure 13:
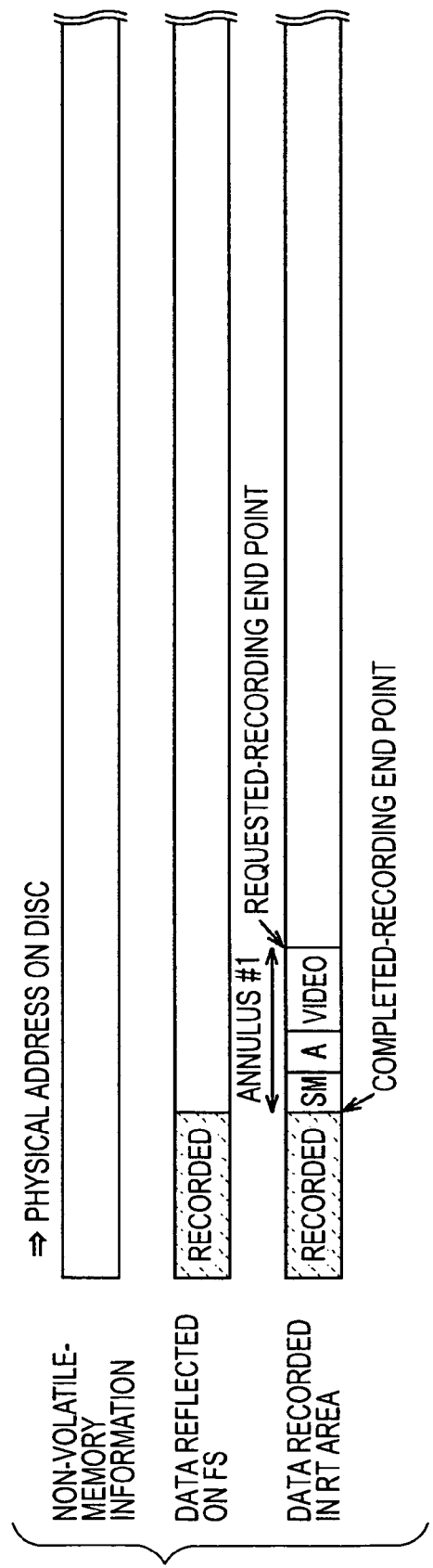
FIG. 13 is a diagram for specifically explaining the recording process.

FIG. 13 shows the state where the salvage marker SM#1 and the AV data #1 associated with the annulus #1 are going to be recorded on the optical disc 111.

Figure 14:
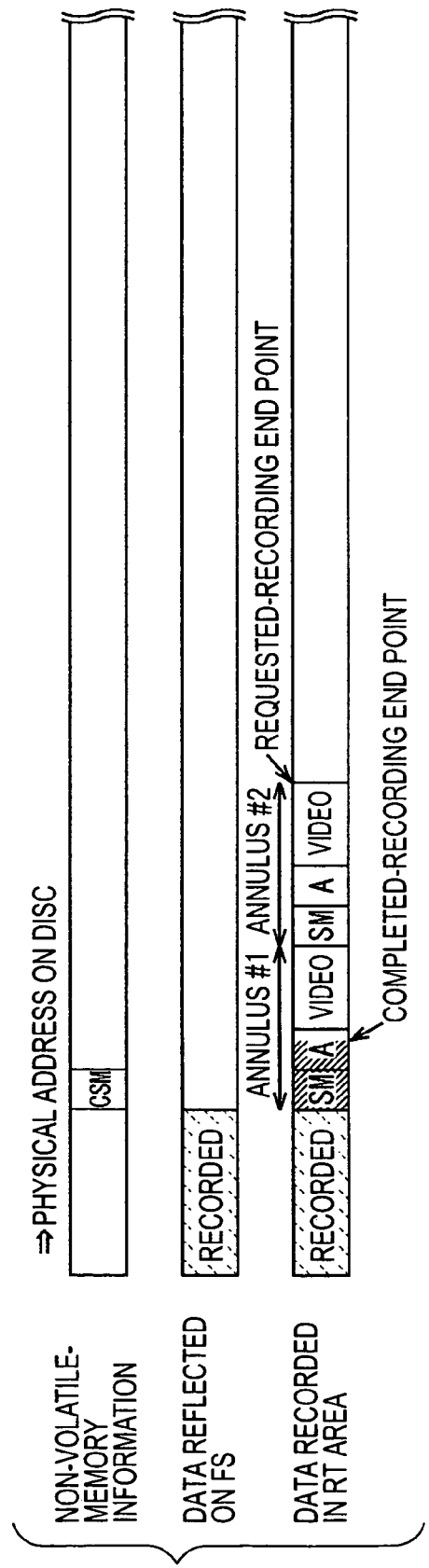
FIG. 14 is a diagram for specifically explaining the recording process.

FIG. 14 shows the state where the salvage marker SM#1 and part of the AV data #1 associated with the annulus #1 have been recorded on the optical disc 111 and the salvage marker SM#2 and the AV data #2 associated with the annulus #2 are going to be recorded on the optical disc 111. Immediately after the recording of the salvage marker SM#1 associated with the annulus #1, a current-salvage-marker pointer (hereinafter also denoted as CSM) representing the location information of the recorded salvage marker SM#1 is recorded in the non-volatile-memory information (this corresponds to step S6 shown in FIG. 10). That is, of salvage markers that have been recorded on the optical disc 111, a current-salvagemarker pointer (CSM) representing the position of the latest salvage marker is recorded in the non-volatile-memory information.

Figure 15:
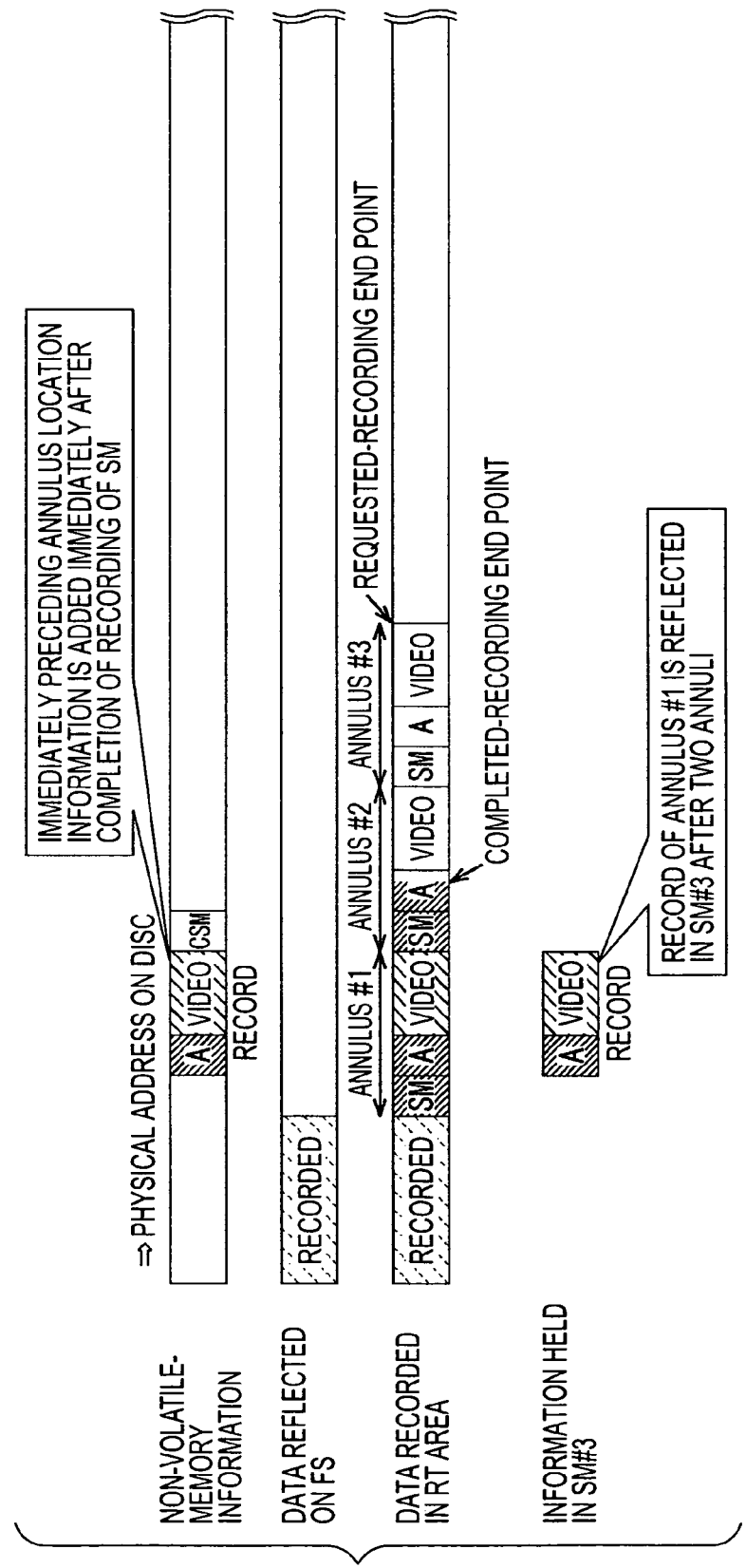
FIG. 15 is a diagram for specifically explaining the recording process.

FIG. 15 shows the state where the recording of the AV data #1 associated with the annuls #1 on the optical disc 111 has been completed, the salvage marker SM#2 and part of the AV data #2 associated with the annulus #2 have been recorded on the optical disc 111, and the salvage marker SM#3 and the AV data #3 associated with the annulus #3 are going to be recorded on the optical disc 111. The salvage marker SM#3, which has not yet been recorded, includes the location information (record) of the annulus #1 that is two annuli before. Since the salvage marker SM#3 including the location information (record) of the recorded annulus #1 has not yet been recorded, the location information (record) of the annulus #1 that is two annuli before is recorded in the non-volatile-memory information. Furthermore, the location information of the salvage marker SM#2 is recorded as a CSM in the non-volatile-memory information.

Figure 16:
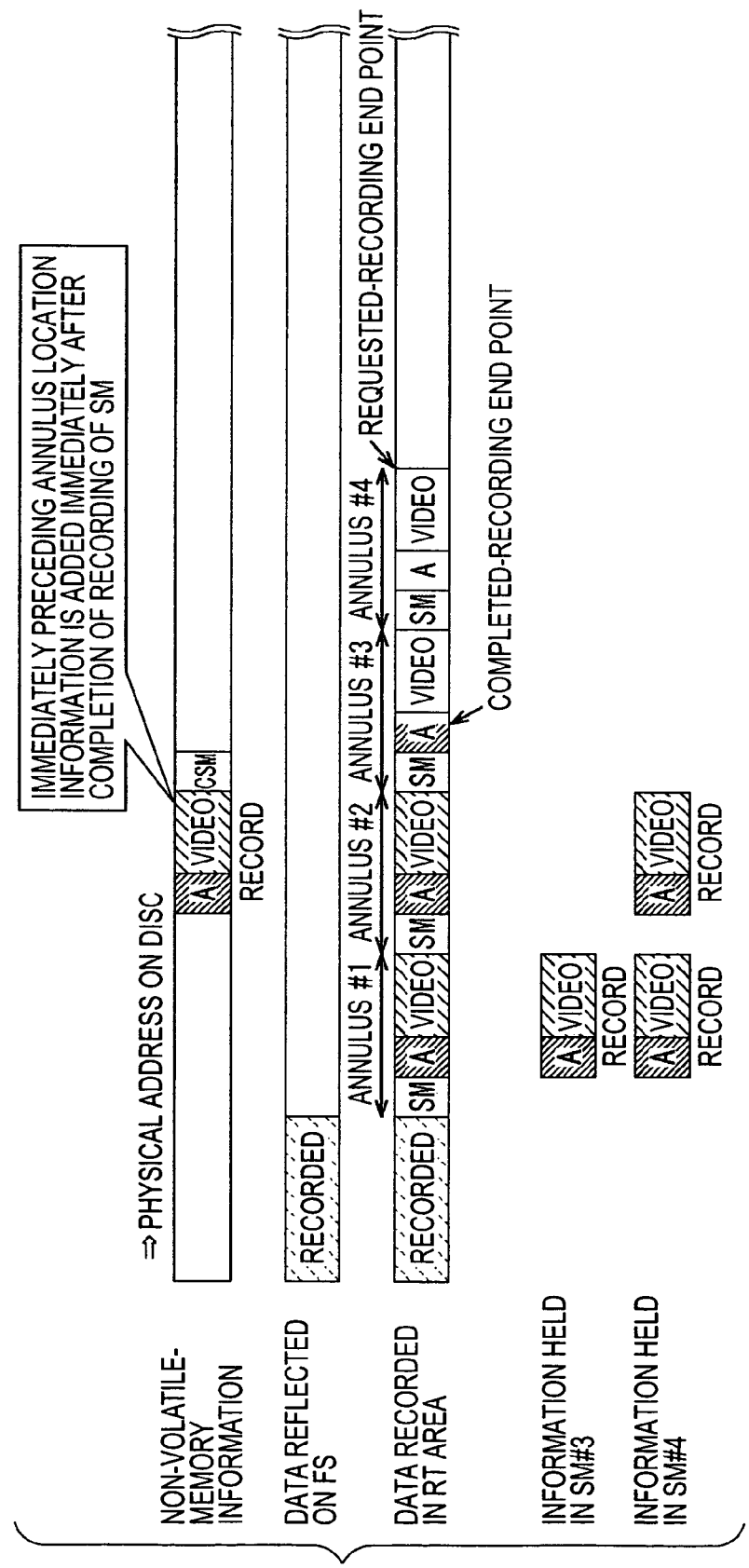
FIG. 16 is a diagram for specifically explaining the recording process.

FIG. 16 shows the state where the recording of the AV data #2 associated with the annulus #2 on the optical disc 111 has been finished, the salvage marker SM#3 and part of the AV data #3 associated with the annulus #3 have been recorded on the optical disc 111, and the salvage marker SM#4 and part of the AV data #4 associated with the annulus #4 are going to be recorded on the optical disc 111. The salvage marker SM#4, which has not yet been recorded, includes the location information (record) of the annulus #1 and the annulus #2, which are two or more annuli before. Since the data size has become close to the upper limit, the salvage marker SM#4 is specified as a key salvage marker. Since the salvage marker SM#4 including the location information (record) of the recorded annulus #2 has not yet been recorded, the location information (record) of the annulus #2 is recorded in the non-volatile-memory information. At this time, the location information (record) of the annulus #1, which has been recorded in the non-volatile-memory information as shown in FIG. 15, is deleted since the salvage marker SM#3 including its location information has been recorded (this applies similarly to the following description). Furthermore, the location information of the salvage marker SM#3 is recorded as a CSM in the non-volatile-memory information.

Figure 17:
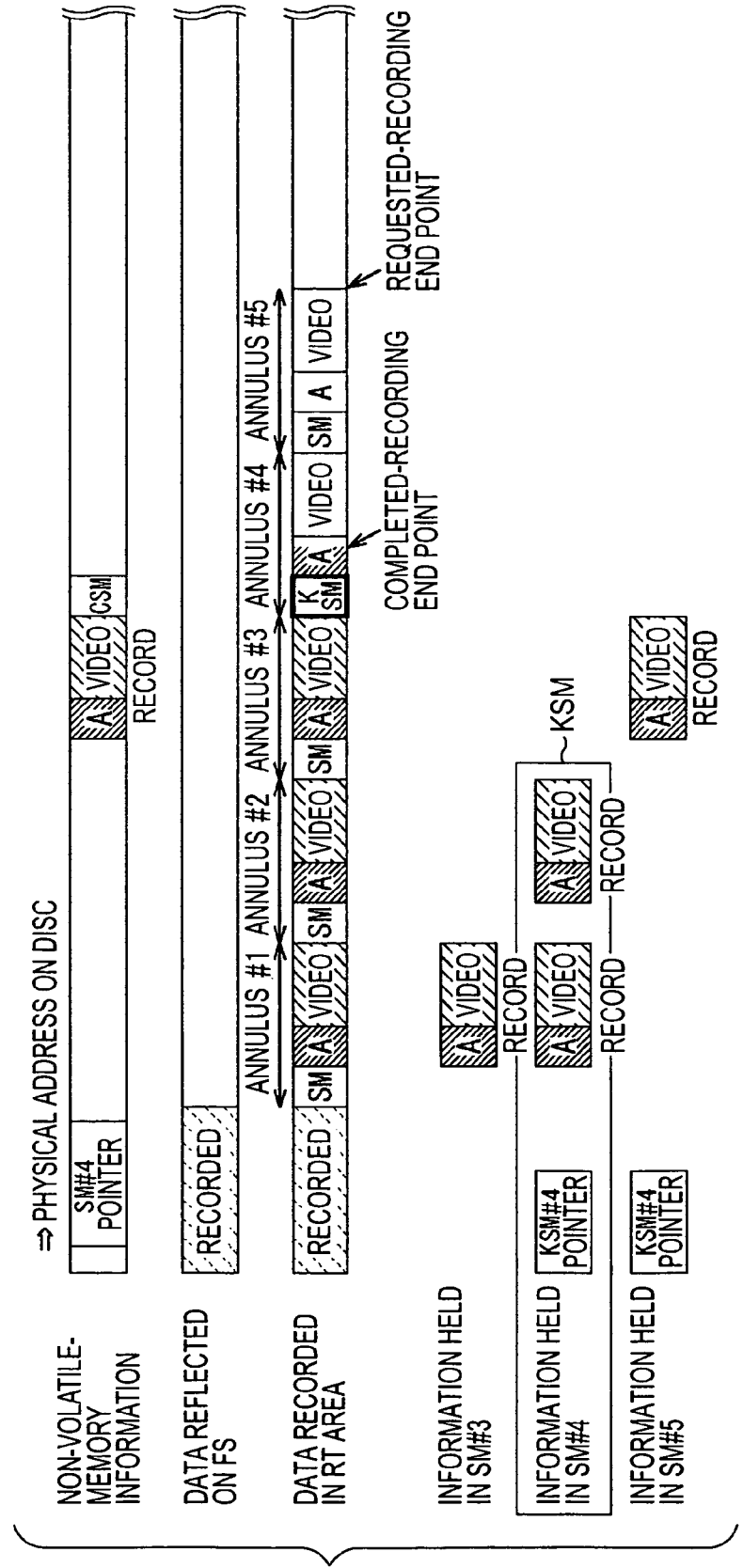
FIG. 17 is a diagram for specifically explaining the recording process.

FIG. 17 shows the state where the recording of the AV data #3 associated with the annulus #3 on the optical disc 111 has been finished, the salvage marker SM#4 and part of the AV data #4 associated with the annulus #4 have been recorded on the optical disc 111, and the salvage marker SM#5 and part of the AV data #5 associated with the annulus #5 are going to be recorded on the optical disc 111. Furthermore, it is assumed that the salvage marker SM#4 associated with the annulus #4 has been specified as a key salvage marker. In the recorded salvage marker SM#4 specified as a key salvage marker, a key-salvage-marker pointer representing the location information of the salvage marker SM#4 is recorded. Hereinafter, a key salvage marker will also be denoted as a KSM, and a salvage marker SM#n specified as a key salvage marker will also be denoted as KSM#n. Furthermore, a key-salvage-marker pointer KSM#n will also be referred to as a "KSM#n pointer". The salvage marker SM#5, which has not yet been recorded, includes the location information (record) of the annulus #3, which is two annuli before. Furthermore, in the salvage marker SM#5, the location information (record) of the salvage marker SM#4 associated with the annulus #4, i.e., KSM(SM#4), is recorded as a key-salvage-marker pointer. Since the salvage marker SM#5 including the location information (record) of the recorded annulus #3 has not yet been recorded, the location information (record) of the annulus #3 is recorded in the non-volatile-memory information. Furthermore, the location information (record) of the annulus #2 is deleted from the non-volatile-memory information (since the location information (record) of the annulus #2 has been recorded in the key salvage marker SM#4). Furthermore, the location information of the salvage marker SM#4 is recorded as a CSM in the non-volatile-memory information.

Figure 18:
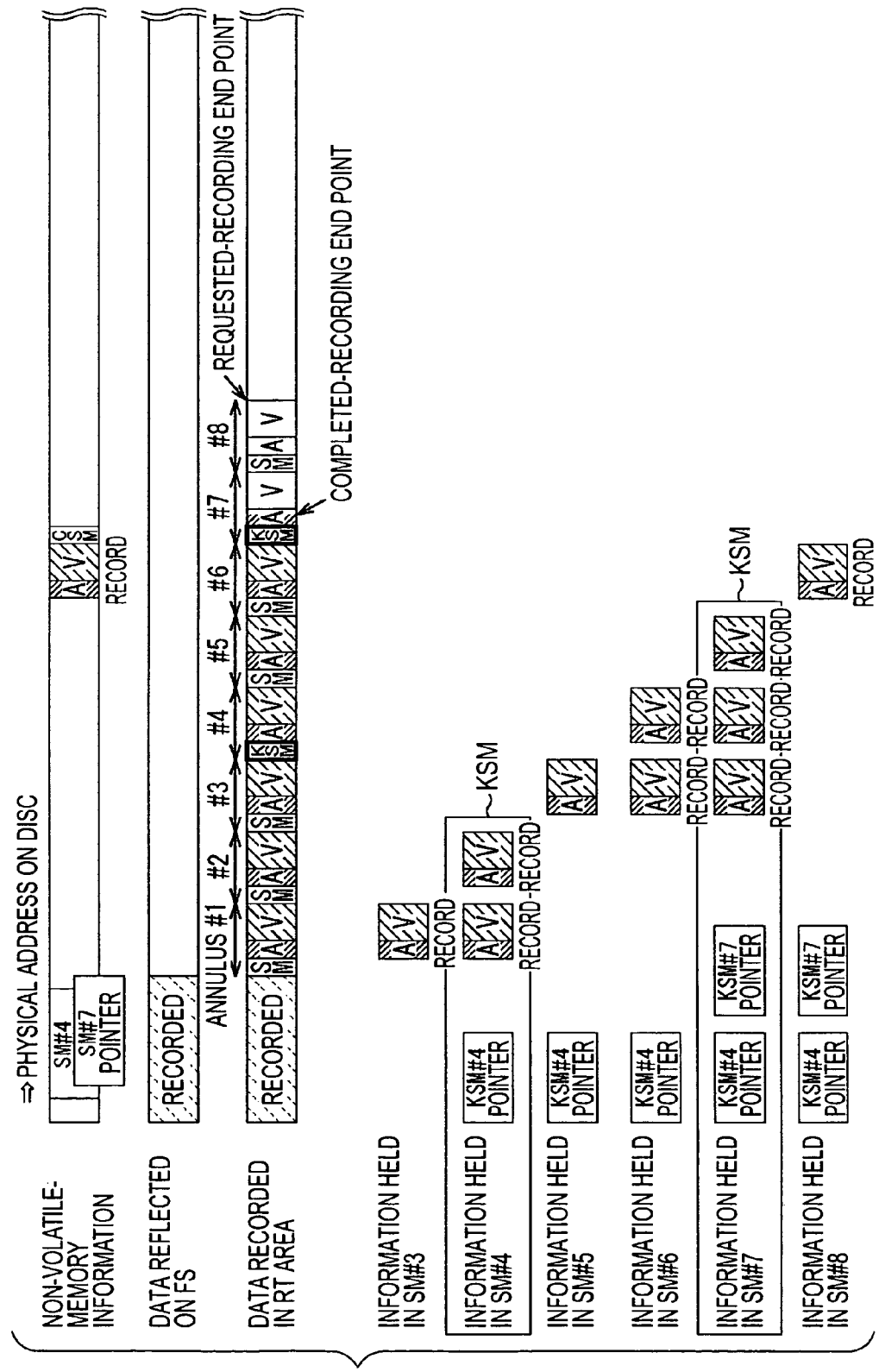
FIG. 18 is a diagram for specifically explaining the recording process.

FIG. 18 shows the state where the recording of data up to the AV data #6 associated with the annulus #6 on the optical disc 111 has been finished, the salvage marker SM#7 and part of the AV data #7 associated with the annulus #7 have been recorded on the optical disc 111, and the salvage marker SM#8 and part of the AV data #8 associated with the annulus #8 are going to be recorded on the optical disc 111. Furthermore, it is assumed that the salvage marker SM#7 associated with the annulus #7 has been specified as a key salvage marker. In the recorded salvage marker SM#7 specified as a key salvage marker, a KSM(SM#7) pointer is recorded. The salvage marker SM#8, which has not yet been recorded, includes the location information (record) of the annulus #6, which is two annuli before. Furthermore, in the salvage marker SM#8, the location information (record) of the salvage marker SM#7 associated with the annulus #7, i.e., KSM#7 pointer, is recorded as a key-salvage-marker pointer. Since the salvage marker SM#8 including the location information (record) of the recorded annulus #6 has not yet been recorded, the location information (record) of the annulus #6 is recorded in the non-volatile-memory information. Furthermore, the location information (record) of the annulus #5 is deleted from the non-volatile-memory information (since the location information (record) of the annulus #5 has been recorded in the key salvage marker SM#7). Furthermore, the location information of the salvage marker SM#7 is recorded as a CSM in the non-volatile-memory information.

Figure 19:
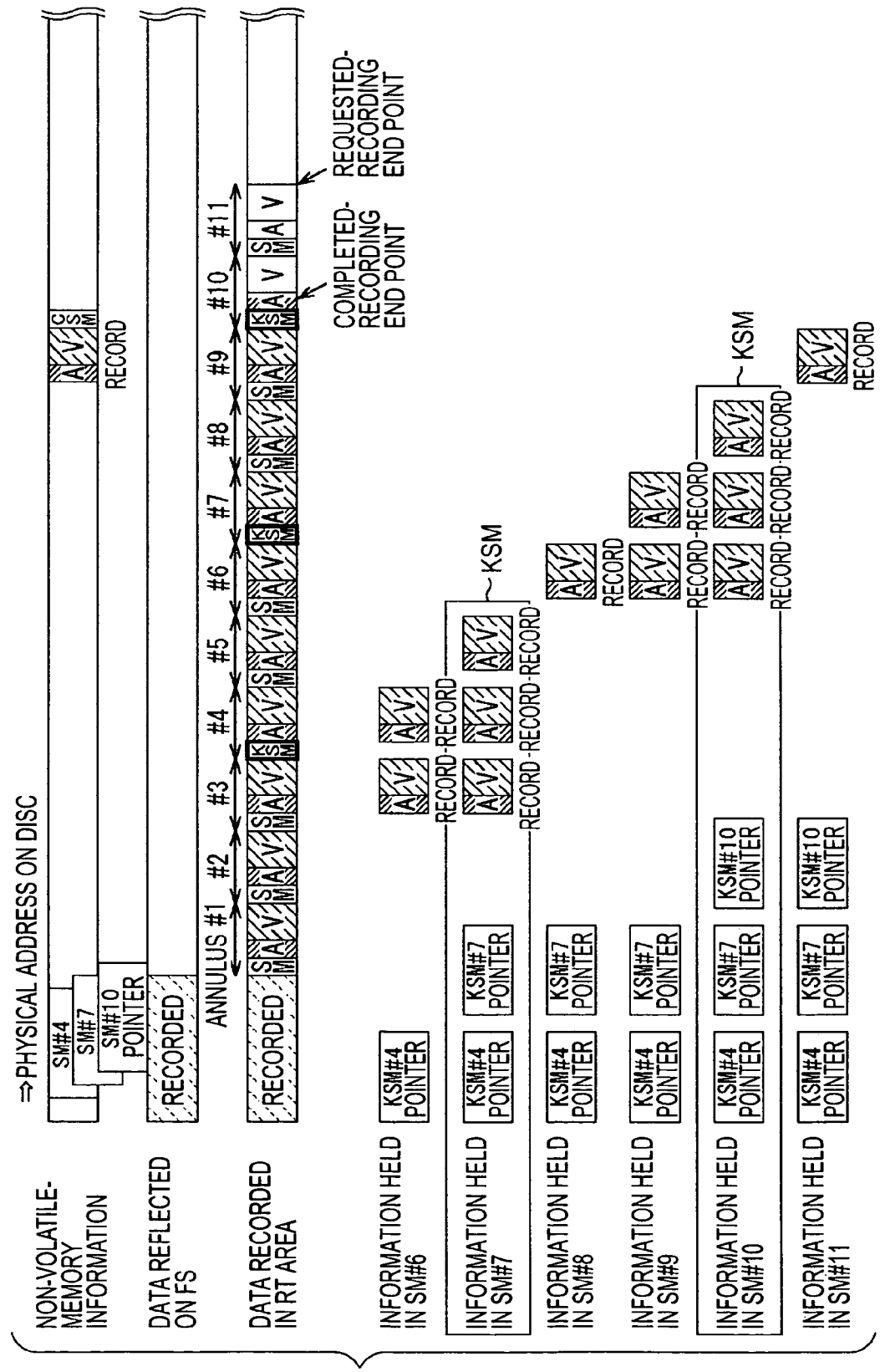
FIG. 19 is a diagram for specifically explaining the recording process.

FIG. 19 shows the state where the recording of data up to the AV data #9 associated with the annulus #9 on the optical disc 111 has been finished, the salvage marker SM#10 and part of the AV data #10 associated with the annulus #10 have been recorded on the optical disc 111, and the salvage marker SM#11 and part of the AV data #11 associated with the annulus #11 are going to be recorded on the optical disc 111. Furthermore, it is assumed that the salvage marker SM#10 associated with the annulus #10 has been specified as a key salvage marker. In the recorded salvage marker SM#10 specified as a key salvage marker, a KSM#10 pointer is recorded. The salvage marker SM#11, which has not yet been recorded, includes the location information (record) of the annulus #9, which is two annuli before. Furthermore, in the salvage marker SM#11, the location information (record) of the salvage marker SM#10 associated with the annulus #10, i.e., KSM#10 pointer, is recorded as a key-salvage-marker pointer. Since the salvage marker SM#11 including the location information (record) of the recorded annulus #9 has not yet been recorded, the location information (record) of the annulus #9 is recorded in the non-volatile-memory information. Furthermore, the location information (record) of the annulus #8 is deleted from the non-volatile-memory information (since the location information (record) of the annulus #8 has been recorded in the key salvage marker SM#10). Furthermore, the location information of the salvage marker SM#10 is recorded as a CSM in the non-volatile-memory information.

Figure 20:
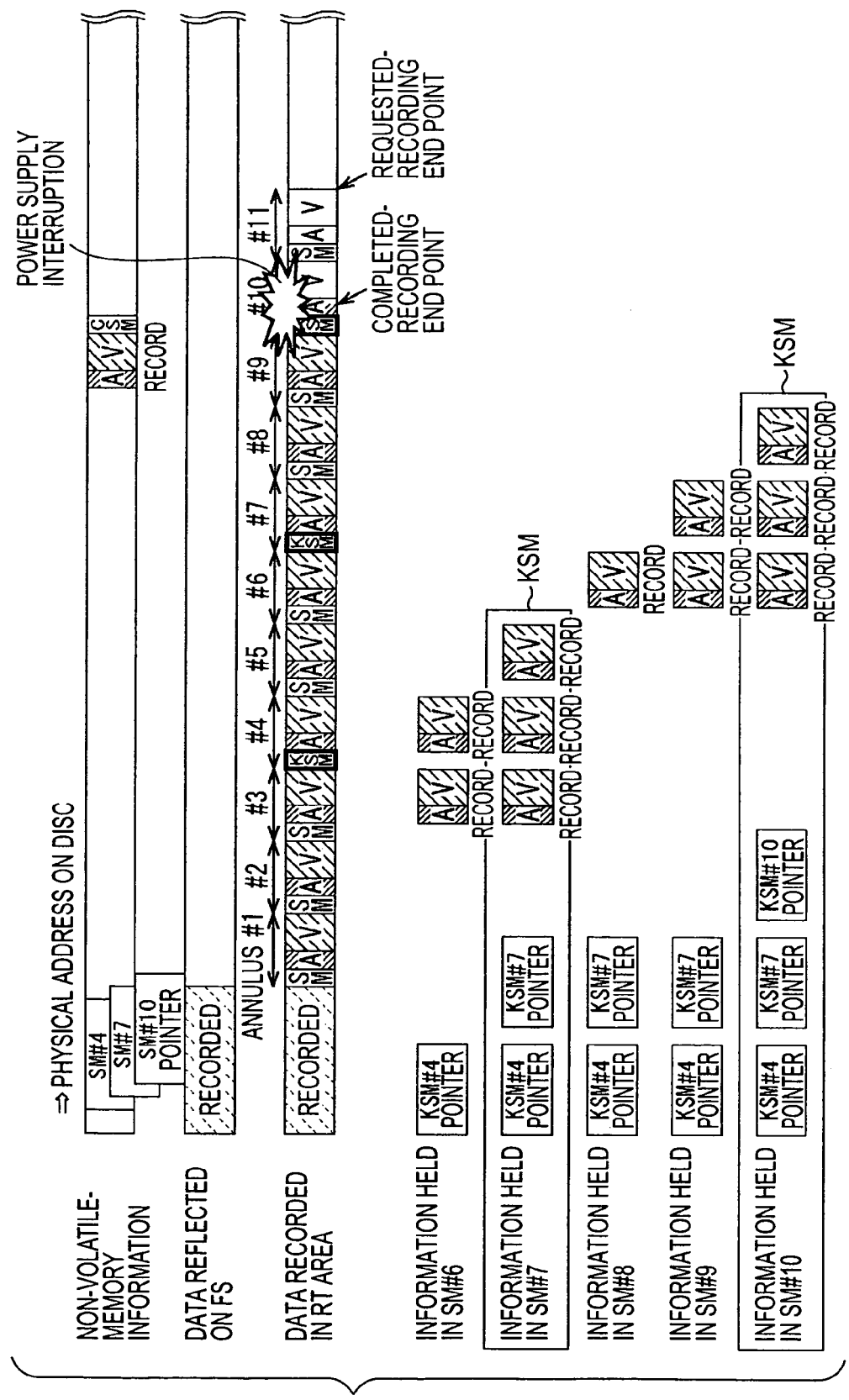
FIG. 20 is a diagram for specifically explaining the recording process.

When power supply is interrupted immediately after the state shown in FIG. 19, for example, due to detachment of the battery, data up to the AV data #9 associated with the annulus #9, and the salvage marker SM#10 and part of the AV data #10 associated with the annulus #10 are recorded on the optical disk 111, as shown in FIG. 20. In the non-volatile-memory information, the location information (record) of the annulus #9, a CSM representing the position of the salvage marker SM#10, and the location information (record) of the salvage markers SM#4, SM#7, and SM#10 respectively associated with the annuli #4, #7, and #10 as key-salvage-marker pointers are recorded.

In the state shown in FIG. 20, data from the salvage marker SM#1 associated with the annulus #1 to part of the AV data #10 associated with the annulus #10 has been recorded on the optical disc 111, but has not been reflected on the file system (management information). Accordingly, it is not possible to read the data under the current state. Thus, in order to allow reading of the data, a data restoring process described below is executed.

Next, a disc handling process including a data restoring process will be described with reference to a flowchart shown in FIG. 21. The disc handling process is started when power supply to the recording and playback apparatus 110 is started.

In step S101, the controller 120 waits until the optical disc 111 is loaded. When the optical disc 111 has been loaded, the process proceeds to step S102, in which the controller 120 mounts the file system (FS, i.e., management information). More specifically, the controller 120 reads the file system (management information) from the optical disc 111, and executes processing such as parsing.

In step S103, the controller 120 reads an XML (Extensible Markup Language) file. More specifically, the controller 120 reads an XML file obtained by the parsing in step S102.

In step S104, the controller 120 refers to the LVID of UDF. This can be determined by Res of the file system mounting. It is assumed herein that the file system (management information) is UDF. The LVID of UDF indicates whether the file system (management information) recorded on the optical disc 111 has been normally closed. Thus, by referring to the LVID of UDF, it is possible to determine whether the file system has been normally closed.

In step S105, the controller 120 determines whether a close flag has been set to the LVID of UDF. When a close flag has been set, it is indicated that the file system (management information) has been normally closed. When a close flag has not been set, e.g., when an open flag has been set, it is indicated that the file system (management information) has not been closed normally. For example, when data from the salvage marker SM#1 associated with the annulus #1 to part of the AV data #10 associated with the annulus #10 has been recorded on the optical disc 111 but has not been reflected on the file system (management information), as shown in FIG. 20, it is considered that the file system has not been closed normally. When it is determined in step S105 that a close flag has been set to the LVID of UDF, the file system has been normally closed. Thus, the process is exited.

When it is determined in step S105 that a close flag has not been set to the LVID of UDF, i.e., when the file system has not been closed normally, the process proceeds to step S106. When the file system has not been closed normally, it is indicated, for example, that a recorded process was previously interrupted on the optical disc and data should be restored (i.e., data recorded before the interruption of the recording process should be registered as a file in the file system.

In the file system, file names associated with data recorded on the optical disc 111, recording positions of the data on the optical disc 111, and other data are registered. When a recording process was interrupted, the recording position on the optical disc 111 of data that was being recorded, a file name associated with the data that was being recorded, and other information are not registered in the file system. Thus, the recording area where data was recorded up to when the recording process was interrupted is registered in the file system as an empty area where data has not been recorded.

Thus, in step S106, the controller 120 checks whether the non-volatile-memory information exists in the non-volatile memory 122. When it is determined that the non-volatile-memory information does not exist in the non-volatile memory 122, the process proceeds to step S110 described later. When it is determined that the non-volatile-memory information exists in the non-volatile memory 122, the process proceeds to step S107 described later.

In step S107, the controller 120 checks whether the non-volatile-memory information is valid. More specifically, the controller 120 compares an index ID recorded in the file system of the optical disc 111, which serves identification information of the optical disc 111, with an index ID (FIG. 9) read from the non-volatile-memory information in the non-volatile memory 122, thereby determining whether these index IDs match. When the recording process on the optical disc 111 was interrupted by another recording and playback apparatus that is different from the recording and playback apparatus 110, it is determined that these index IDs do not match. Then, the process proceeds to step S110 described later. When the recording process on the optical disc 111 was interrupted by the recording and playback apparatus 110, it is determined that these index IDs match. Then, the process proceeds to step S108.

In step S108, the controller 120 executes a quick salvage process. In the quick salvage process, the file system is updated based on the non-volatile-memory information recorded in the non-volatile memory 122 and salvage markers recorded on the optical disc 111. To simply describe an example of the quick salvage process, the controller 120 sequentially reads key salvage markers from the optical disc 111 based on key-salvage-marker pointers recorded in the non-volatile-memory information, and updates the file system based on the annulus location information (record) recorded in the key salvage markers and the annulus location information included in the non-volatile-memory information and not yet recorded in SM on disc (the location information (record) of the annulus #9 in the example shown in FIG. 20).

The quick salvage process in step S108 will be described in detail with reference to a flowchart shown in FIG. 23.

In step S141, the salvage processor 134 of the controller 120 sequentially reads key salvage markers from the optical disc 111 based on key-salvage-marker pointers recorded in the non-volatile-memory information.

Figure 24:
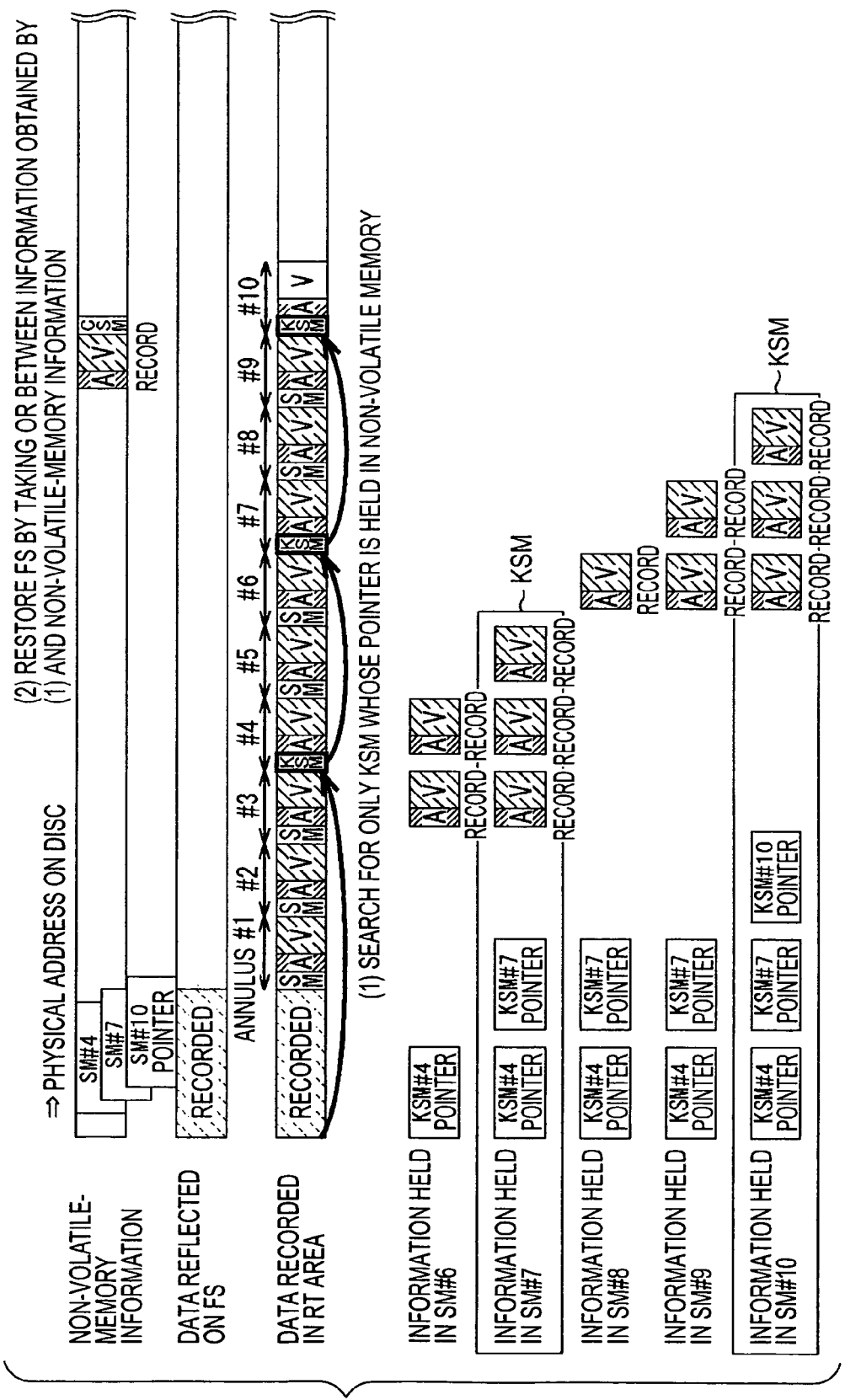
FIG. 24 is a diagram for specifically explaining the quick salvage process.

For example, when the quick salvage process is started from the state shown in FIG. 20, the salvage processor 134 of the controller 120 reads the key salvage markers KSM#4, KSM#7, and KSM#10 from the optical disc 111 based on the key-salvage-marker pointers (SM#4 pointer, SM#7 pointer, and SM#10 pointer) in the non-volatile-memory information, as shown in FIG. 24.

Since the key salvage markers (KSM) are located separately, the spindle motor 112 that rotates the optical disc 111 can employ CAV. In this case, all the key salvage markers can be read more quickly than in the case of CLV.

In step S142, the salvage processor 134 of the controller 120 stores the key salvage markers read in the volatile memory 121. In the example shown in FIG. 24, the key salvage markers KSM#4, KSM#7, and KSM#10 (i.e., the salvage markers SM#4, SM#7, and SM#10) are stored in the volatile memory 121.

In step S143, the salvage processor 134 obtains "annulus location information not yet recorded in SM on disc" recorded in the non-volatile-memory information. In the example shown in FIG. 24, the salvage processor 134 obtains the location information (record) of the annulus #9 from the non-volatile-memory information.

In step S144, the salvage processor 134 stores the "annulus location information not yet recorded in SM on disc" obtained in step S143 in the volatile memory 121. In the example shown in the location information (record) of the annulus #9 is stored in the volatile memory 121.

In step S145, the salvage processor 134 restores the file system based on the annulus location information included in the key salvage markers stored in the volatile memory 121 and the annulus location information not yet recorded in SM on disc.

In the case of the example shown in FIG. 24, the salvage processor 134 restores the file system based on the location information (record) of the annuli #1 and #2 included in the key salvage marker KSM#4 (i.e., the salvage marker SM#4 specified as a key salvage marker), the location information (record) of the annuli #3 to #5 included in the key salvage marker KSM#7, the location information (record) of the annuli #6 to #8 included in the key salvage marker KSM#10, and based on the location information (record) of the annuli #9 not yet recorded in SM on disc, stored in the volatile memory 121.

Although it is possible to read and restore the salvage marker #10 of the annulus #10, the salvage marker SM#10 is not particularly restored since it is generated for the restoration of the file system. However, the salvage marker SM#10 may also be restored.

In step S146, the salvage processor 134 generates a footer and a header. In step S147, the salvage processor 134 records the footer and the header as indicated in the RT area in FIG. 25.

Figure 25:
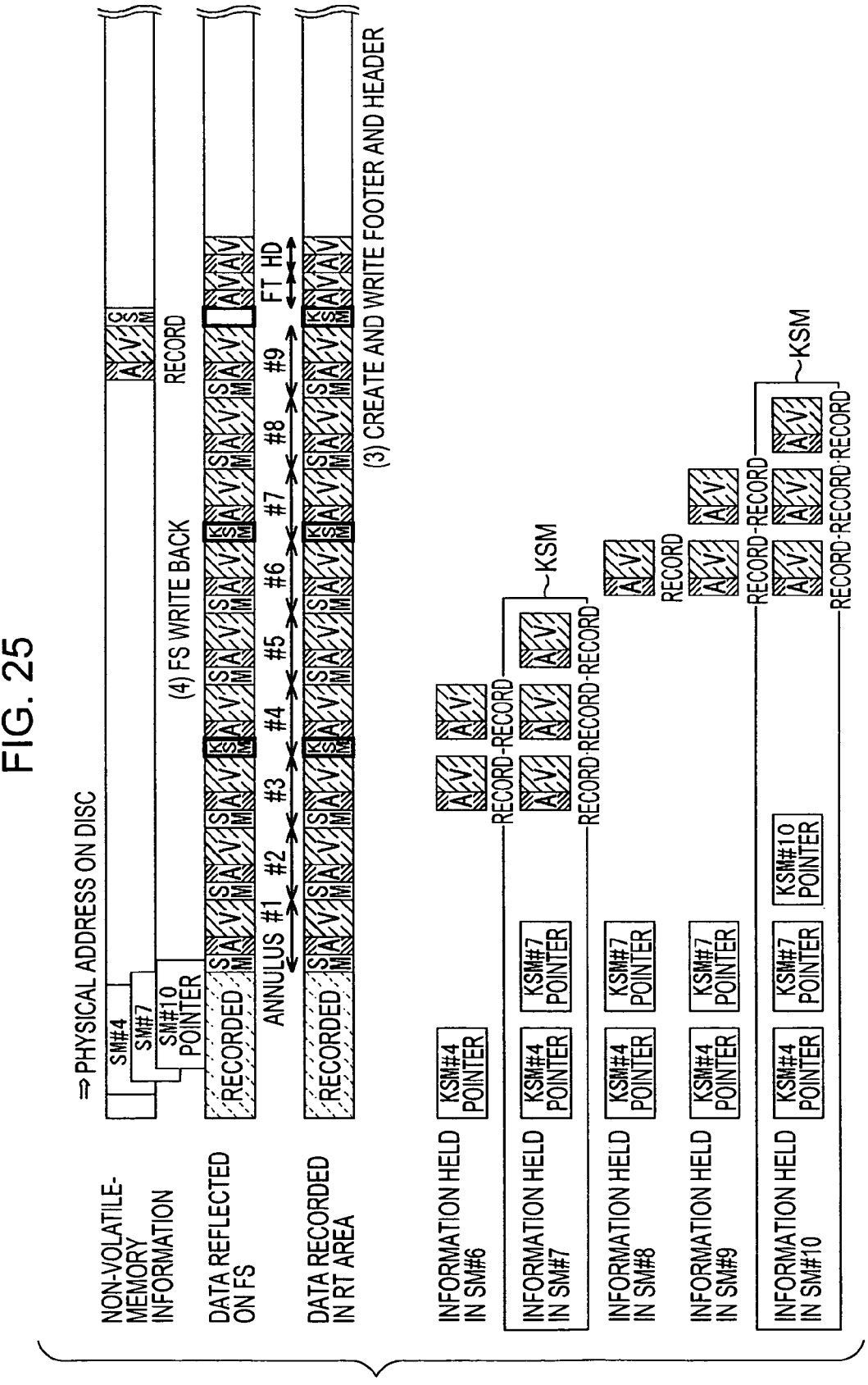
FIG. 25 is a diagram for specifically explaining the quick salvage process.

In step S148, the salvage processor 134 writes back the file system restored. Thus, the salvage markers and AV data of the annuli #1 to #9 are reflected on the file system, as shown in FIG. 25. At this time, a close flag is set in LVID of UDF, although not shown. That is, a flag indicating that the file system has been normally closed is set. The file system can be restored and updated in the manner described above. After step S145, the process is exited to return to step S108 shown in FIG. 21.

Figure 23:
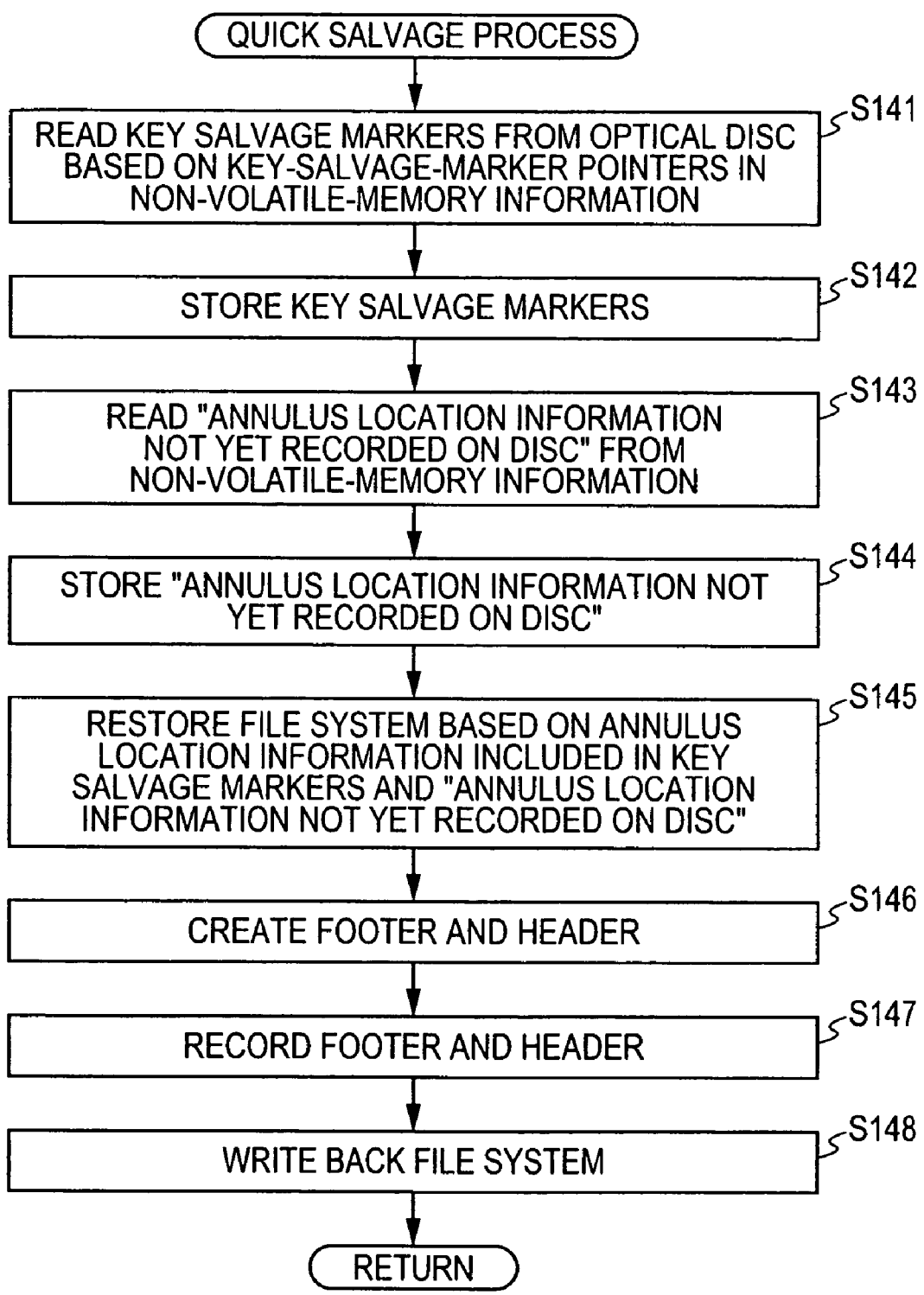
FIG. 23 is a flowchart of a quick salvage process.

Since the quick salvage process is executed based on the non-volatile-memory information in the non-volatile memory 122 as shown in FIG. 23, the file system can be restored and updated quickly. That is, it is possible to read data recorded on the optical disc 111.

Referring back to FIG. 21, after step S108, in step S109, the controller 120 notifies the application (APL) of the salvage OK status and the completion of mounting. That is, the controller 120 notifies the APL of the completion of the salvage process (i.e., the file system has been closed normally) and the completion of the mounting (the mounting in step S102). The process is then exited.

On the other hand, when it is determined in step S106 that the non-volatile-memory information does not exit, or when it is determined in step S107 that the non-volatile-memory information is not valid, it is not possible to execute the quick salvage process. Then, the process proceeds to step S110.

In step S110, the controller 120 notifies the APL of the salvage NEED status (the status indicating that a full salvage is to be executed) and the completion of the mounting (the mounting in step S102).

In step S111, the controller 120 causes a display (not shown) to display a message that prompts the user to determine whether or not to execute a data restoring process (a full salvage process). Then, in step S112, the controller 120 determines whether the user has performed an operation for instructing the execution of the data restoring process (full salvage process). When it is determined that the user has performed an operation for instructing the execution of the data restoring process (full salvage process), the process proceeds to step S113, in which the controller 120 receives a request for the full salvage process from the APL.

In step S114, the controller 120 (the salvage-marker detector 133 and the salvage processor 134) executes the full salvage process. In the full salvage process, the file system is restored based on only the information recorded on the optical disc 111 without using the non-volatile memory 122. The full salvage process is executed, for example, when it is not possible to execute the quick salvage process by the recording and playback apparatus 110 due to a failure of the recording and playback apparatus 110 and the file system is restored by another recording and playback apparatus. That is, the full salvage process is executed when a disc ID corresponding to the disc ID of the optical disc 111 is not recorded in the non-volatile-memory information in the non-volatile memory 122 and the file system of the optical disc 111 is to be restored.

To simply describe an example of the full salvage process, the controller 120 detects a last salvage marker that has been recorded last on the optical disc 111 from the optical disc 111, sequentially reads key salvage markers based on key-salvage-marker pointers recorded in the last salvage marker, and updates the file system based on the location information (record) of annuli recorded in the key salvage markers. The full salvage process will be described later in detail with reference to FIG. 26.

Figure 21:
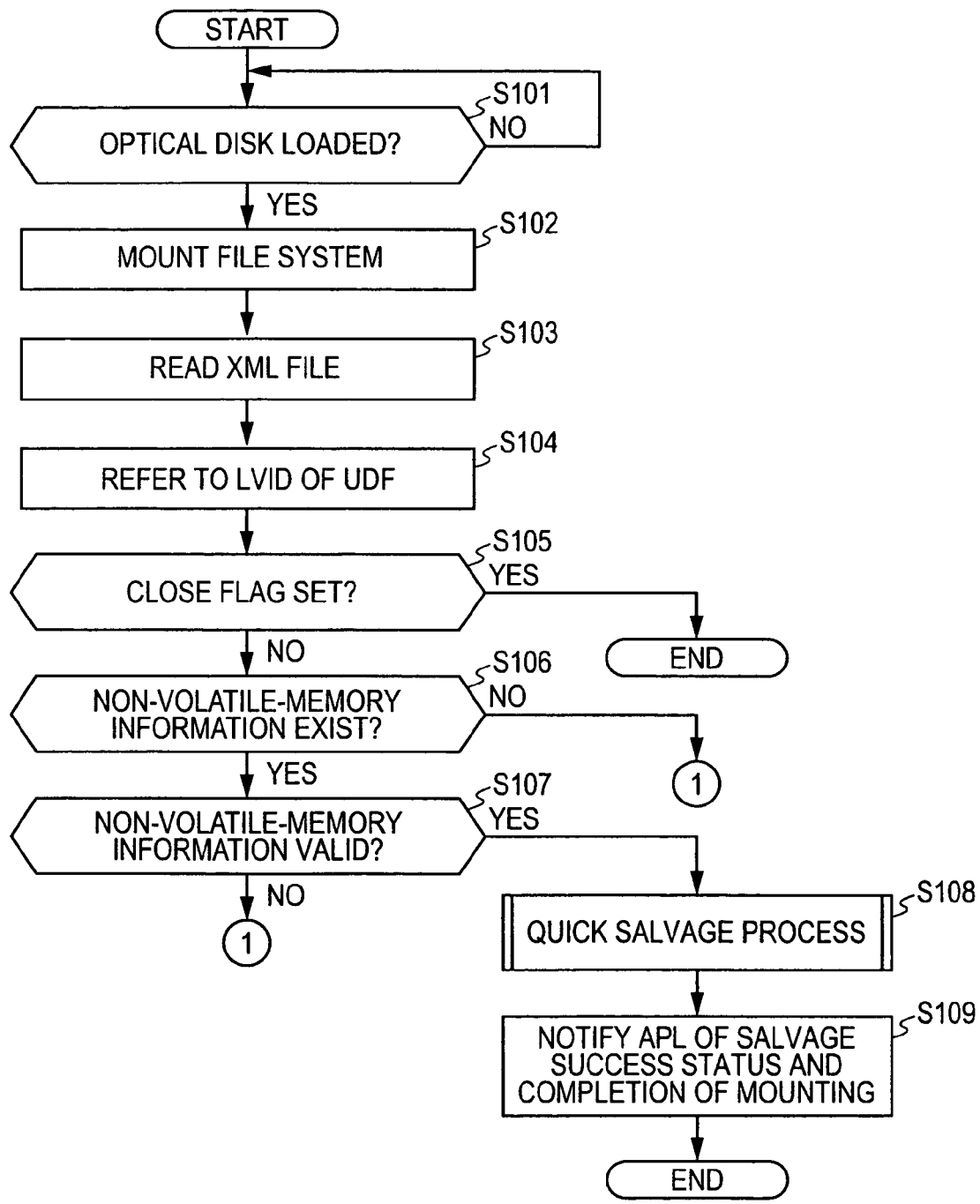
FIG. 21 is a flowchart of a disc handling process.
Figure 22:
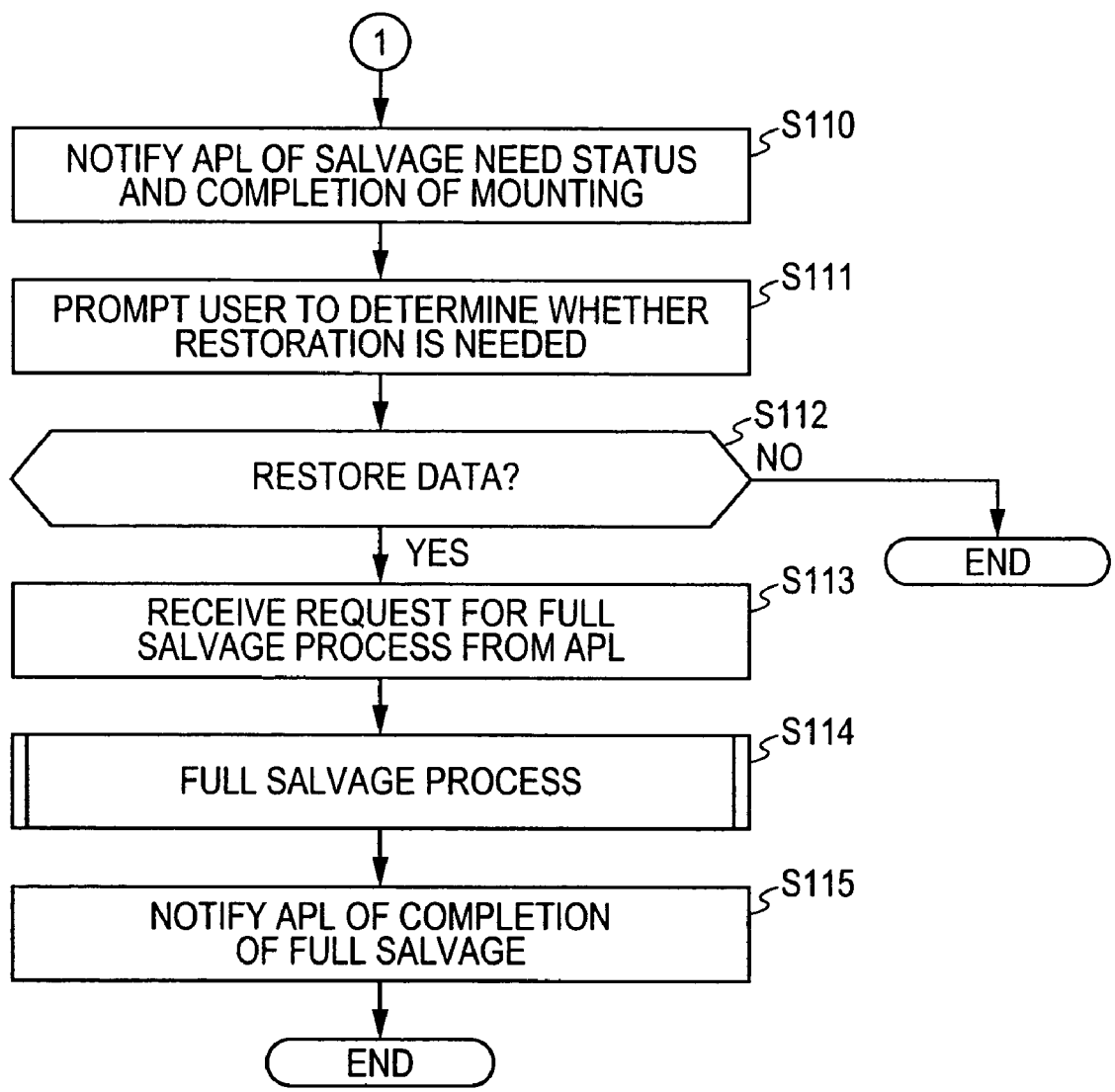
FIG. 22 is a flowchart of a disc handling process.

In the processes shown in FIGS. 21 and 22, the user is prompted to determine whether data is to be restored (step S111 and step S112) before the full salvage process in step S114. This is because the time taken for the full salvage process is longer compared with the quick salvage process in step S108 described earlier. Obviously, however, the user may be prompted to determine whether data is to be restored before the quick salvage process. Alternatively, after step S110, steps S111 and S112 may be omitted so that the process directly proceeds to step S113.

After step S114, the process proceeds to step S115, in which the controller 120 notifies the APL of the completion of the full salvage process. The process is then exited.

By the processes shown in FIGS. 21 and 22, it is possible to restore that was being recorded even when the recording was not completed normally.

In the salvage markers SM#1 to SM#9, file data of non-real-time data associated with annuli up to the annulus #10 is recorded. Using the data, the file data of non-real-time data associated with annuli up to the annulus #10 can be recorded in the non-real-time area 11 (FIG. 1), and the non-real-time file data recorded can be reflected on the file system.

When it is determined in step S112 that an operation for not restoring data has been performed so that the full salvage process in step S114 is not executed, and the recording process is executed after that, the data not restored (data that was not registered as files in the file system) is overwritten with new data. Thus, the data not restored is eventually deleted from the optical disc 111.

Next, the full salvage process in step S114 will be described in detail with reference to a flowchart shown in FIG. 26.

In step S181, the salvage-marker detector 133 of the controller 120 executes a last-salvage-marker detecting process. The last salvage marker is a salvage marker that has been recorded last on the optical disc 111 in a recording process among data that has been recorded on the optical disc 111 but has not been reflected on the file system. That is, the last salvage marker is the latest salvage markers among the salvage markers recorded on the optical disc 111, and corresponds to the salvage marker represented by the current-salvage-marker pointer. In other words, when recording was not completed normally, the salvage-marker detector 133 detects, as the last salvage marker, a salvage marker that was the current salvage marker at the time that the recording was interrupted. Since the non-volatile-memory information does not exist and the current-salvage-marker pointer is not held, the last salvage marker is detected without using the non-volatile-memory information.

An example of the last-salvage-marker detecting process in step S181 will be described in detail with reference to a flowchart shown in FIG. 27. In the example shown in FIG. 27, a last salvage marker is detected by binary search.

Now, binary search will be described. In a sorted data sequence, first, target data (X) is compared with an element (m) in the middle of the data sequence. When the target data (X) does not match the element (m), it is determined whether the target data (X) exists before or after the middle of the data sequence based on the magnitude relationship between the target data (X) and the element (m). For example, when the data sequence has been sorted in ascending order, the target data (X) exists before the middle if it is smaller than the element (m), while the target data (X) exits after the middle if it is larger than the element (m). Thus, the data sequence is divided in the middle, and the target data (X) is compared with a new middle element (m) in a segment where the target data (X) can exist. This operation is repeated until the target data (X) matches an element (m) or it is not possible to further divide the data sequence. When it is not possible to further divide the data sequence, it is determined that the target element was not found. When the target data (X) matches an element (m), it is determined that the target data (X) has been detected.

In step S201, the salvage-marker detector 133 refers to the file system to check an empty area.

In step S202, the salvage-marker detector 133 performs seeking in the negative direction by half the distance of the empty area. The negative direction refers to the direction toward the inner side of the optical disc 111, and the positive direction refers to the direction toward the outer side of the optical disc 111.

In step S203, the salvage-marker detector 133 reads one annulus from the position reached by the seeking. This is because salvage markers are recorded on an annulus-by-annulus basis, and even when a salvage marker is recorded in the annulus, it is not possible to detect the salvage marker without reading one annulus.

In step S204, the salvage-marker detector 133 determines whether a valid salvage marker has been detected. More specifically, the salvage-marker detector 133 determines whether a valid salvage marker has been detected by reading one annulus in step S203. For example, the salvage-marker detector 133 determines that a valid salvage marker has been detected when the number of times of circulating recording (refer to FIG. 8) recorded in the salvage marker detected is greater than the number of times of circulating recording recorded in the file system. Then, the process proceeds to step S206. On the other hand, the salvage-marker detector 133 determines that a valid salvage marker has been detected, for example, when the number of times of circulating recording recorded in the salvage marker detected is not greater than the number of times of circulating recording recorded in the file system or when no salvage marker has been detected. Then, the process proceeds to step S205.

Since it is determined whether the salvage marker detected is valid based on the number of times of circulating recording, for example, even if the date and time recorded on the optical disc 111 is incorrect due to a timer failure of the recording and playback apparatus 110 or the like, it is possible to determine whether the salvage marker detected is valid more accurately.

The validity of a salvage marker may be determined based on a factor other than the number of times of circulating recorded. For example, the validity of a salvage marker may be determined based on the simple number of times of recording (the number of times of recording on the optical disc 111 where circulating recording is not performed) or the recording date and time. When the validity of a salvage marker is determined based on the recording date and time, the salvage-marker detector 133 compares the recording date and time (refer to FIG. 8) included in the salvage marker detected with the update date and time of the file system, and determines that a valid salvage marker has been detected when the recording date and time (recording time information) included in the salvage marker is newer than the update date and time of the file system.

When it is determined in step S204 that a valid salvage marker has not been detected, in step S205, the salvage-marker detector 133 performs seeking in the negative direction from the current position by half the distance of the previous seeking.

On the other hand, when it is determined in step S204 that a valid salvage marker has been detected, in step S206, the salvage-marker detector 133 performs seeming in the positive direction from the current position by half the distance of the previous seeking.

After step S205 or step S206, the process proceeds to step S207, in which the salvage-marker detector 133 reads one annulus from the position reached by the seeking.

In step S208, the salvage-marker detector 133 determines whether a valid salvage marker has been detected. More specifically, similarly to step S204 described earlier, the salvage-marker detector 133 determines whether a valid salvage marker has been detected in the data read in step S207. When it is determined in step S208 that a valid salvage marker has not been detected, the process returns to step S205, and subsequent steps are repeated. That is, in the second iteration of step S205, the salvage-marker detector 133 again performs seeking in the negative direction from the current position by half the distance of the previous seeking, in step S207, reads one annulus from the position reached by the seeking, and determines in step S208 whether a valid salvage marker has been detected. In other words, the salvage-marker detector 133 repeats seeking in the negative direction by half the distance of the previous seeking until a valid salvage marker is detected.

When it is determined in step S208 that a valid salvage marker has been detected, the process proceeds to step S209, in which the salvage-marker detector 133 determines whether the valid salvage marker coincides with the previously detected salvage marker. For example, when it is determined in step S204 that a valid salvage marker has been detected and it is determined in step S209 that a valid salvage marker has been detected, the salvage-marker detector 133 determines whether the previously detected salvage marker (detected in step S204 in this case) and the currently detected salvage marker (detected in step S208 in this case) are the same salvage marker. More specifically, it is determined that the valid salvage marker coincides with the previously detected salvage marker when the annulus of the previously detected salvage marker coincides with the annulus of the currently detected salvage marker, i.e., when the increment numbers (refer to FIG. 8) of these two salvage markers coincide with each other. When no valid salvage marker has been previously detected, it is determined that the valid salvage marker does not coincide with the previously detected valid salvage marker.

When it is determined in step S209 that the valid salvage marker does not coincide with the previously detected valid salvage marker, the process returns to step S206, and subsequent steps are repeated. Since step S209 is executed after step S208 results in YES, i.e., after a valid salvage marker has been detected. Thus, in step S206, the salvage-marker detector 133 performs seeking in the positive direction from the current position by half the distance of the previous seeking. This is repeated until a valid salvage marker coincides with a previously detected valid salvage marker.

When it is determined in step S209 that the valid salvage marker coincides with the previously detected valid salvage marker, the process proceeds to step S210. In step S210, the salvage-marker detector 133 sets the coinciding valid salvage marker as a last salvage marker. The process is then exited to return to step S181 in FIG. 26.

By the process shown in FIG. 27, a last salvage marker can be detected. Furthermore, since binary search is used to detect a last salvage marker, a last salvage marker can be detected more efficiently.

Although binary search is used to detect a last salvage marker in the example shown in FIG. 27, other searching methods may be used. For example, n-ary search (n is a natural number greater than or equal to 2). Alternatively, for example, salvage markers may be sequentially detected by sequentially reading data from the beginning or the end of an empty area, checking whether each of the salvage markers is a last salvage marker.

Next, the last-salvage-marker detecting process shown in FIG. 27 will be described more specifically with reference to FIG. 28.

FIG. 28 shows data that is recorded on the optical disc 111 in a case where power supply was interrupted, for example, due to detachment of the battery, immediately after the sate shown in FIG. 19. This process is executed when the non-volatile-memory information is not recorded in the non-volatile memory 122 (i.e., a full salvage process), so that as opposed to the case shown in FIG. 20, the non-volatile-memory information is not held in this case (the non-volatile-memory information is not shown in FIG. 28). As shown in FIG. 28, on the optical disc 111, data up to the AV data #9 associated with the annulus "9 and the salvage marker #10 and part of AV data #10 associated with the annulus #10 are recorded. In FIG. 28, the first tier represents data recorded in the RT area, and the second tier represents a scaled down version of the RT area in the first tier.

In step S201, the salvage-marker detector 133 refers to the file system to recognize an area from a position P1 to a position P8 in FIG. 28 as an empty area. In step S202, the salvage-marker detector 133 performs seeking to a position P7, which is in the negative direction (leftward as viewed in FIG. 28) by half the distance from the position P1 to the position P8 forming the empty area. Then, in step S203, the salvage-marker detector 133 reads one annulus from the position P7 reached by the seeking. In step S204, the salvage-marker detector 133 determines whether a valid salvage marker has been detected. Since a valid salvage marker has not been detected at the position P7, the process proceeds to step S205.

In step S205, the salvage-marker detector 133 performs seeking to a position P6, which is in the negative direction (leftward in FIG. 28) from the current position P7 by half the distance of the previous seeking (i.e., the distance from the position P7 to the position P8). In step S207, the salvage-marker detector 133 reads one annulus from the position P6 reached by the seeking. In step S208, the salvage-marker detector 133 determines whether a valid salvage marker has been detected in the annulus read. Since a valid salvage marker has not been recorded at the position P6, the process returns to step S205.

In the second iteration of step S205, the salvage-marker detector 133 performs seeking to a position P2, which is in the negative direction (leftward in FIG. 28) from the current position P6 by half the distance of the previous seeking (i.e., the distance from the position P6 to the position P7). In step S207, the salvage-marker detector 133 reads one annulus from the position P2 reached by the seeking. In step S208, the salvage-marker detector 133 determines whether a valid salvage marker has been detected in the annulus read. Since a valid salvage marker has been recorded at the position P2, the process proceeds to step S209.

In step S209, the salvage-marker detector 133 determines whether the valid salvage marker detected at the position P2 (the salvage marker determined as valid in step S208) coincides with the previously detected valid salvage marker. In this case, no valid salvage marker has been previously detected, so that step S209 results in NO. The process then returns to step S206.

Then, in step S206, the salvage-marker detector 133 performs seeking to the position P3, which is in the positive direction (rightward in FIG. 28) from the current position P2 by half the distance of the previous seeking (i.e., the distance from the position P2 to the position P6). In step S207, the salvage-marker detector 133 reads one annulus from the position P3 reached by the seeking. In step S208, the salvage-marker detector 133 determines whether a valid salvage marker has been detected. Since a valid salvage marker (SM#10) has been recorded at the position P3, the process proceeds to step S209.

In step S209, the salvage-marker detector 133 determines whether the valid salvage marker detected at the position P3 (i.e., the salvage marker determined as valid in step S208) coincides with the previously detected valid salvage marker (i.e., the valid salvage marker detected at the position P2). In this case, as shown in FIG. 28, the valid salvage marker detected at the position P3 (SM#10) does not coincide with the valid salvage marker detected at the position P2, so that step S209 results in NO. Then, the process returns to step S206.

Then, in step S206, the salvage-marker detector 133 performs seeking to a position P5, which is in the positive direction (rightward in FIG. 28) from the current position P3 by half the distance of the previous seeking (i.e., the distance from the position P2 to the position P3). In step S207, the salvage-marker detector 133 reads one annulus from the position P5 reached by the seeking. In step S208, the salvage-marker detector 133 determines whether a valid salvage marker has been detected in the annulus read. Since a valid salvage marker has not been recorded at the position P5, the process returns to step S205.

Then, in step S205, the salvage-marker detector 133 performs seeking to a position P4, which is in the negative direction (leftward in FIG. 28) from the current position P3 by half the distance of the previous seeking (i.e., the distance from the position P3 to the position P5). In step S207, the salvage-marker detector 133 reads one annulus from the position P4 reached by the seeking. In step S208, the salvage-marker detector 133 determines whether a valid salvage marker has been detected in the annulus read. Since a valid salvage marker (SM#10) has been recorded at the position P4, the process proceeds to step S209.

In step S209, the salvage-marker detector 133 determines whether the valid salvage marker detected at the position P4 (SM#10) coincides with the previously detected valid salvage marker (the valid salvage marker SM#10 detected at the position P3). In this case, as shown in FIG. 28, the valid salvage marker detected at the position P4 (SM#10) coincides with the valid salvage marker detected at the position P3 (SM#10), so that step S209 results in YES. Then, the process proceeds to step S210.

Then, in step S210, the salvage-marker detector 133 sets the valid salvage marker determined as coinciding in immediately preceding step S209 as a last salvage marker. That is, the salvage-marker detector 133 detects the salvage marker SM#10 represented by "Last_SM" in FIG. 28 as a last salvage marker. In this way, a last salvage marker can be detected by the process shown in FIG. 27.

After the last-salvage-marker detecting process shown in FIG. 27, the process proceeds to step S182 shown in FIG. 26. In step S182, the salvage processor 134 reads the last salvage marker detected by the salvage-marker detector 133 in step S181. For example, in the salvage marker SM#10 shown in FIG. 28, the KSM#4 pointer, the KSM#7 pointer, the KSM#10 pointer, and the location information (record) of the annuli #6 to #9 are recorded. Thus, the salvage processor 134 reads the salvage marker SM#10 including these pieces of data from the optical disc 111.

In step S183, the salvage processor 134 stores the last salvage marker read in the volatile memory 121. For example, in the volatile memory 121, the data included in the last salvage marker is stored, as shown on the first tier in FIG. 29. The last salvage marker includes key-salvage-marker pointers and the location information (record) of annuli up to two annuli before. In the example shown in FIG. 29, information of the salvage marker SM#10 (i.e., the KSM#4 pointer, the KSM#7 pointer, the KSM#10 pointer, and the location information of the annuli #6 to #9) is stored in the volatile memory 121.

In step S184, the salvage processor 134 sequentially reads key salvage markers from the optical disc 111 based on the key-salvage-marker pointers stored in the volatile memory 121. In the example shown in FIG. 29, the salvage processor 134 reads the key salvage markers KSM#4, KSM#7, and KSM#10 from the optical disc 111 based on the SM#4 pointer, the SM#7 pointer, and the SM#10 pointer, which are key-salvage-marker pointers stored in the volatile memory 121.

At this time, since the key salvage markers (KSM) are disposed separately, the non-volatile memory 122 for rotating the optical disc 111 may employ CAV. In this case, all the key salvage markers can be read more quickly than in the case of CLV.

In step S185, the salvage processor 134 stores the key salvage markers read in the volatile memory 121. In the case of the example shown in FIG. 29, the salvage processor 134 stores the key salvage markers KSM#4, KSM#7, and KSM#10 (i.e., the salvage markers SM#4, SM#7, and SM#10) in the volatile memory 121.

Through the process described above, the key salvage markers are stored in the volatile memory 121 under the control of the salvage processor 134. In the example shown in FIG. 29, the location information (record) of the annuli #1 and #2 is included in the key salvage marker KSM#4, the location information (record) of the annuli #3 to #5 is included in the key salvage marker KSM#7, the location information (record) of the annuli #6 to #8 is included in the key salvage marker KSM#10, and the location information (record) of the annuli #6 to #8 in the last salvage marker SM#10, so that the location information (record) of the annuli #1 to #9 is stored in the volatile memory 121. In the case of this example, the last salvage marker SM#10 itself coincides with the key salvage marker KSM#10. In the case of non-coincidence, the location information of annuli that is stored in the last salvage marker but is not included in the key salvage marker is used (as will be described later in detail).

In step S186, the salvage processor 134 restores the file system based on the annulus location information included in the key salvage markers stored in the volatile memory 121 and the annulus location information included in the last salvage marker. In the case of the example shown in FIG. 29, the salvage processor 134 restores the file system based on the location information (record) of the annuli #1 and #2 included in the key salvage marker KSM#4, the location information (record) of the annuli #3 to #5 included in the key salvage marker KSM#7, and the location information (record) of the annuli #6 to #8 included in the key salvage marker KSM#10.

In step S187, the salvage processor 134 creates a footer and a header. In step S188, the salvage processor 134 records the footer and header generated, for example, as indicated in the RT area shown in FIG. 30.

Figure 30:
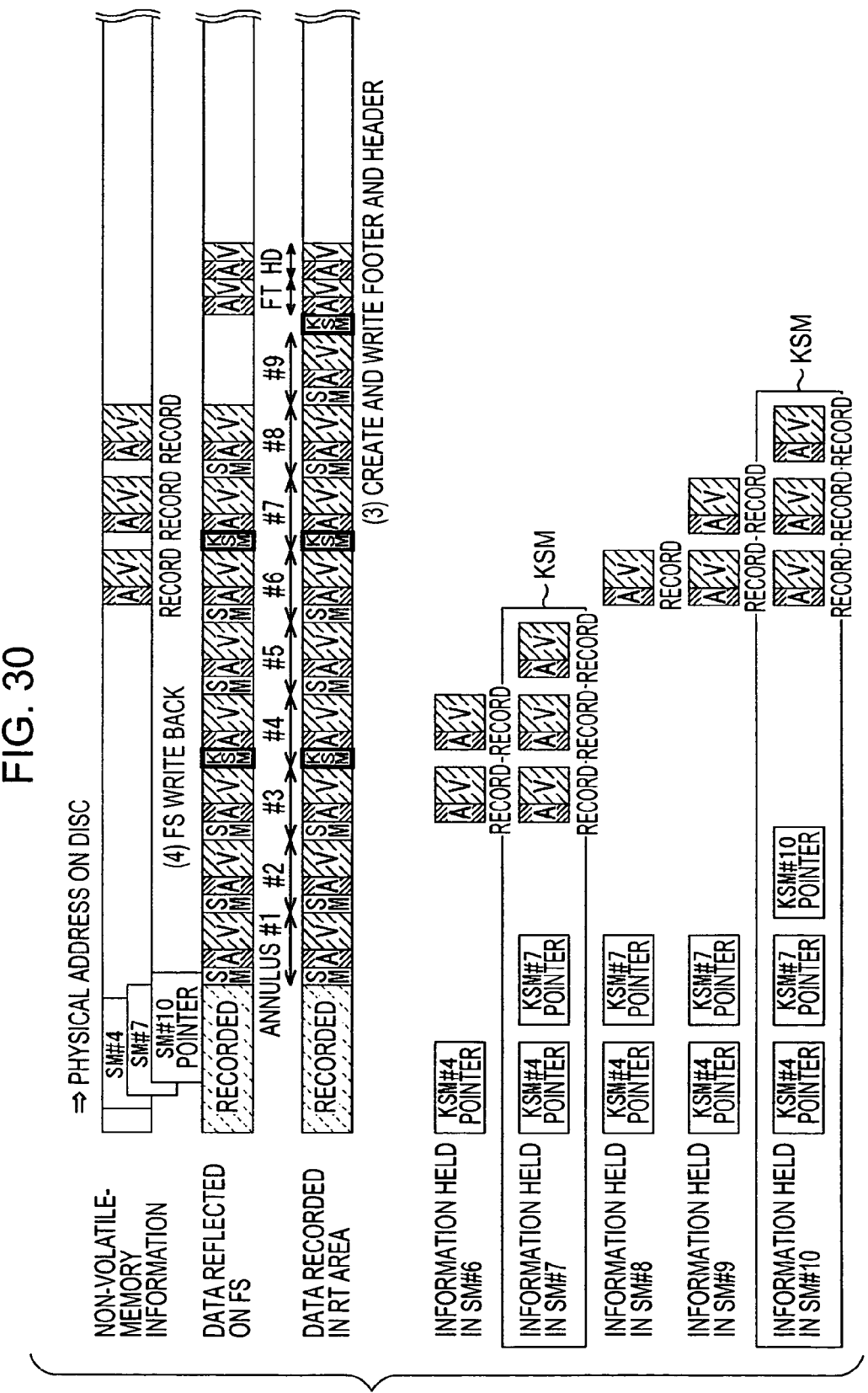
FIG. 30 is a diagram for specifically explaining the full salvage process.

In step S189, the salvage processor 134 writes back the restored file system. Thus, the salvage markers and AV data of the annuli #1 to #8 are reflected on the file system, as shown in FIG. 30. At this time, a close flag is set to the LVID (not shown) of UDF. That is, a flag indicating that the file system has been normally closed is set. The file system can be restored and updated in the manner described above. After step S189, the process is exited to return to step S114 shown in FIG. 22.

By the process shown in FIG. 26, it is possible to detect a last salvage marker and to update the file system based on information recorded in the last salvage marker. That is, it becomes possible to read data recorded on the optical disc 111.

For example, when the salvage markers recorded on the optical disc 111 (e.g., the salvage markers recorded in an area recognized as an empty area in the file system) are detected and sequentially read and stored and then the file system is updated based on the location information (record) of the annuli recorded in the respective salvage markers, all the salvage markers are read, so that it is difficult to employ CAV for the spindle motor 112. Thus, compared with the case where only key salvage markers are read in step S184 shown in FIG. 26 or in step S141 shown in FIG. 23 described earlier, it takes more time for reading. However, as described earlier in relation to step S141 shown in FIG. 23 and step S184 shown in FIG. 26, since only key salvage markers are read from the optical disc 111, it takes less time compared with the case where all the salvage markers are read, so that the salvage process can be executed quickly.

Furthermore, even when the non-volatile-memory information is not recorded in the non-volatile memory 122 (i.e., when the quick salvage process is not allowed), a last salvage marker can be detected, so that it is not needed to read all the salvage markers and it is possible to update the file system quickly. More specifically, by detecting a last salvage marker including key-salvage-marker pointers and location information of annulus data recorded on the optical disc 111 (the location information of annuli from annuli whose location information is included in the immediately preceding key salvage marker to two annuli before), the salvage processor 134 is allowed to sequentially read key salvage markers based on key-salvage-marker pointers. Furthermore, the salvage processor 134 is allowed to update the file system based on the location information of annulus data recorded on the optical disc 111, included in key salvage markers, and the location information of annulus data recorded on the optical disc 111, included in the last salvage markers. Thus, it is not needed to read all the salvage markers, and it is possible to update the file system quickly.

The full salvage process shown in FIG. 26 takes a longer time compared with the quick salvage process shown in FIG. 23 by an amount corresponding to the time for detecting a last salvage marker. However, compared with the case where all the salvage markers are detected, the file system can be updated more quickly. That is, even when effective non-volatile-memory information is not recorded, the file system can be updated more quickly than in the case where all the salvage markers are detected. Furthermore, it is possible to quickly allow reading data from the optical disc 111.

In the example shown in FIGS. 20 to 30, the last salvage marker at the time of interruption of power supply (i.e., the salvage marker that was the current salvage marker at the time of interruption of power supply) is a key salvage marker (KSM#10). Now, a case where the last salvage marker at the time of interruption of power supply is not a key salvage marker will be described with reference to FIGS. 31 to 36.

Figure 31:
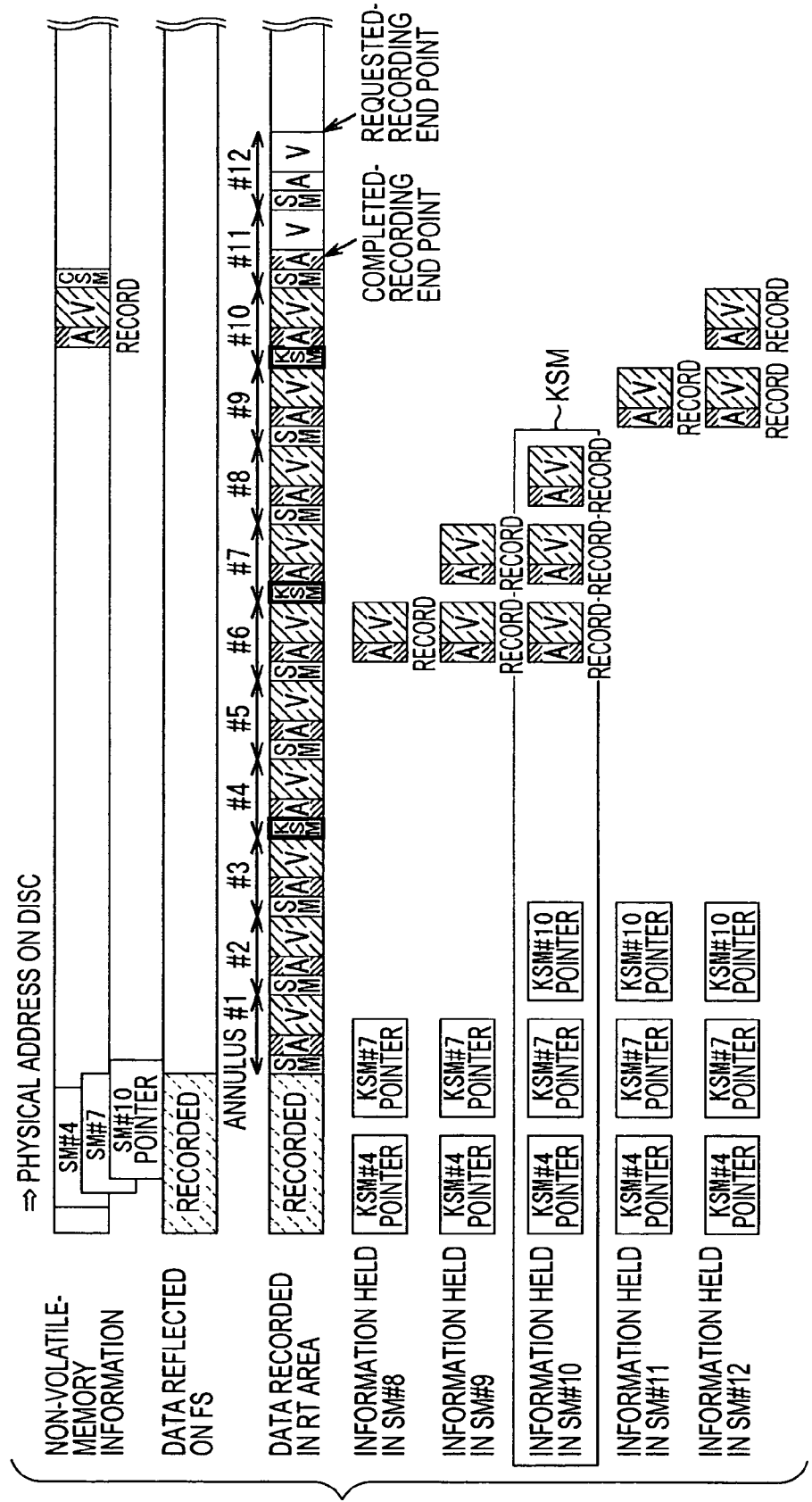
FIG. 31 is a diagram for specifically explaining the recording process.

FIG. 31 shows the state where the recording of data up to the AV data #10 associated with the annulus #10 on the optical disc 111 has been completed, the salvage marker 11 and part of the AV data #11 associated with the annulus #11 have been recorded on the optical disc 111, and the salvage marker SM#12 and the AV data #11 are going to be recorded on the optical disc 111. In the salvage marker SM#12, which has not yet been recorded, the location information (record) of the annulus #10, which is two annuli before, and the location information (record) of the salvage marker SM#10 associated with the annulus #10 as a key-salvage-marker pointer, i.e., the KSM#10 pointer, are recorded. Since the salvage marker SM#12 including the location information (record) of the recorded annulus #10 has not yet been recorded, the location information (record) of the annulus #10 is recorded in the non-volatile-memory information. Furthermore, the location information (record) of the annulus #9 is deleted from the non-volatile-memory information. Furthermore, the location information of the salvage marker SM#11 is recorded as a CSM in the non-volatile-memory information.

Figure 32:
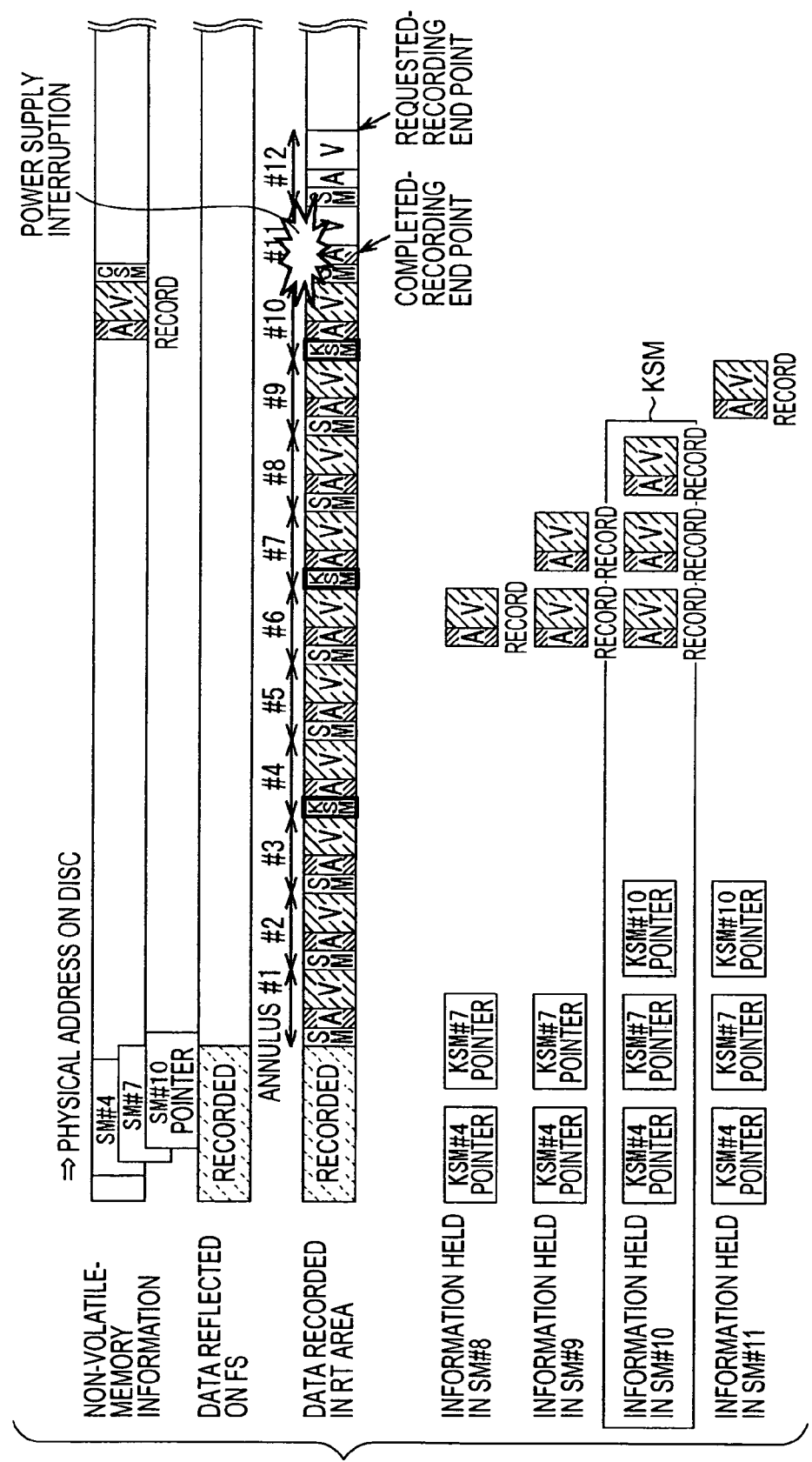
FIG. 32 is a diagram for specifically explaining the recording process.

When power supply is interrupted, for example, due to detachment of the battery, immediately after the state shown in FIG. 31, data up to the AV data #10 associated with the annulus #10, and the salvage marker SM#11 and part of the AV data #11 are recorded on the optical disc 111, and the location information (record) of the annulus #10, the CSM representing the position of the salvage marker SM#11, and the location information (record) of the salvage markers SM#4, SM#7, and SM#10 as key-salvage-marker pointers are recorded in the non-volatile-memory information, as shown in FIG. 32.

In the state shown in FIG. 32, data from the salvage marker SM#1 associated with the annulus #1 to the part of the AV data #11 associated with the annulus #11 has been recorded on the optical disc 111 but has not been reflected on the file system (management information). Thus, it is not currently possible to read this data. In order to allow reading of this data, the disc handling process described earlier with reference to FIG. 21 is executed. The description will be given in a simplified manner by omitting steps that need not be particularly described.

Figure 33:
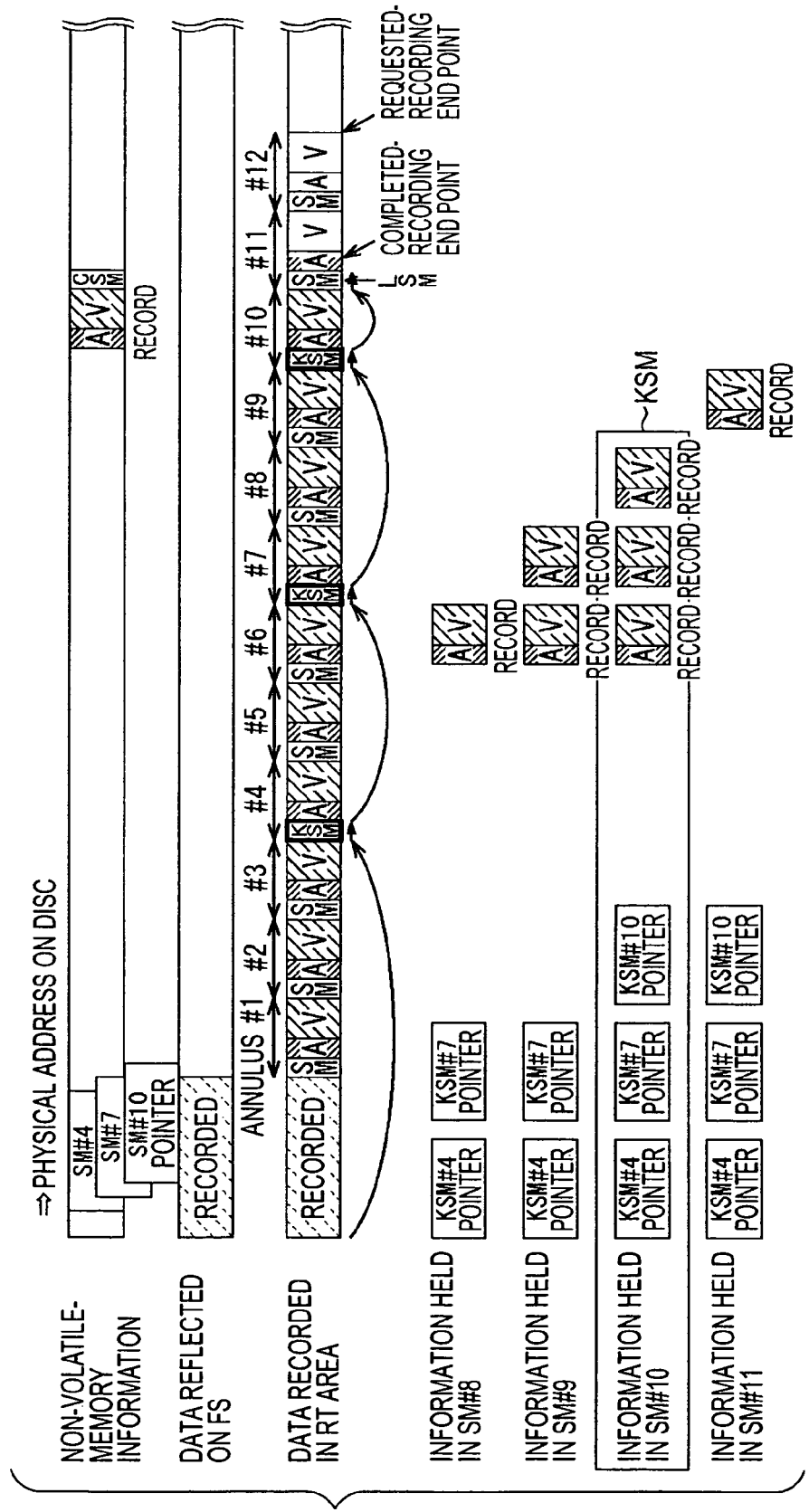
FIG. 33 is a diagram for specifically explaining the quick salvage process.
Figure 34:
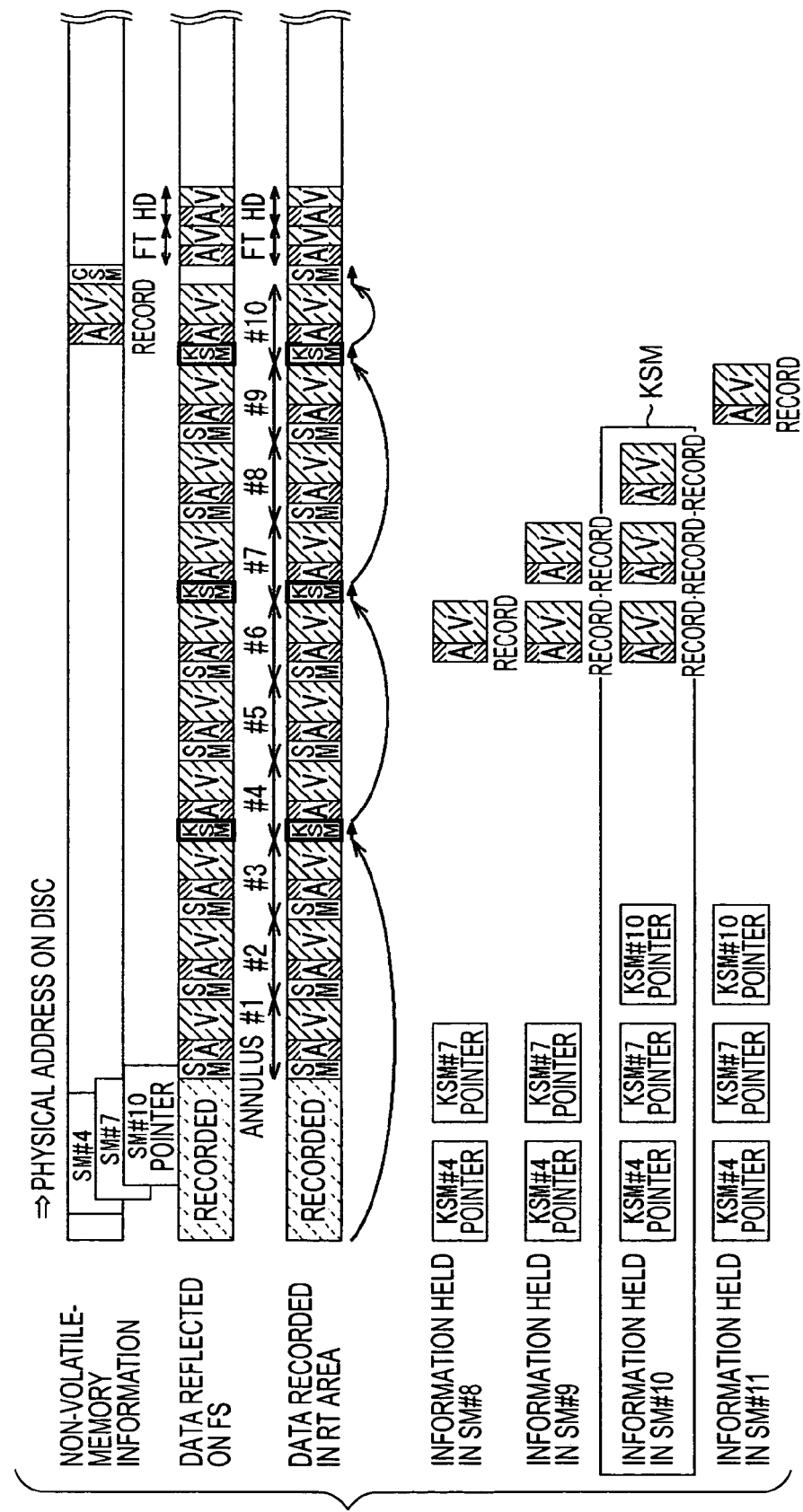
FIG. 34 is a diagram for specifically explaining the quick salvage process.
Figure 35:
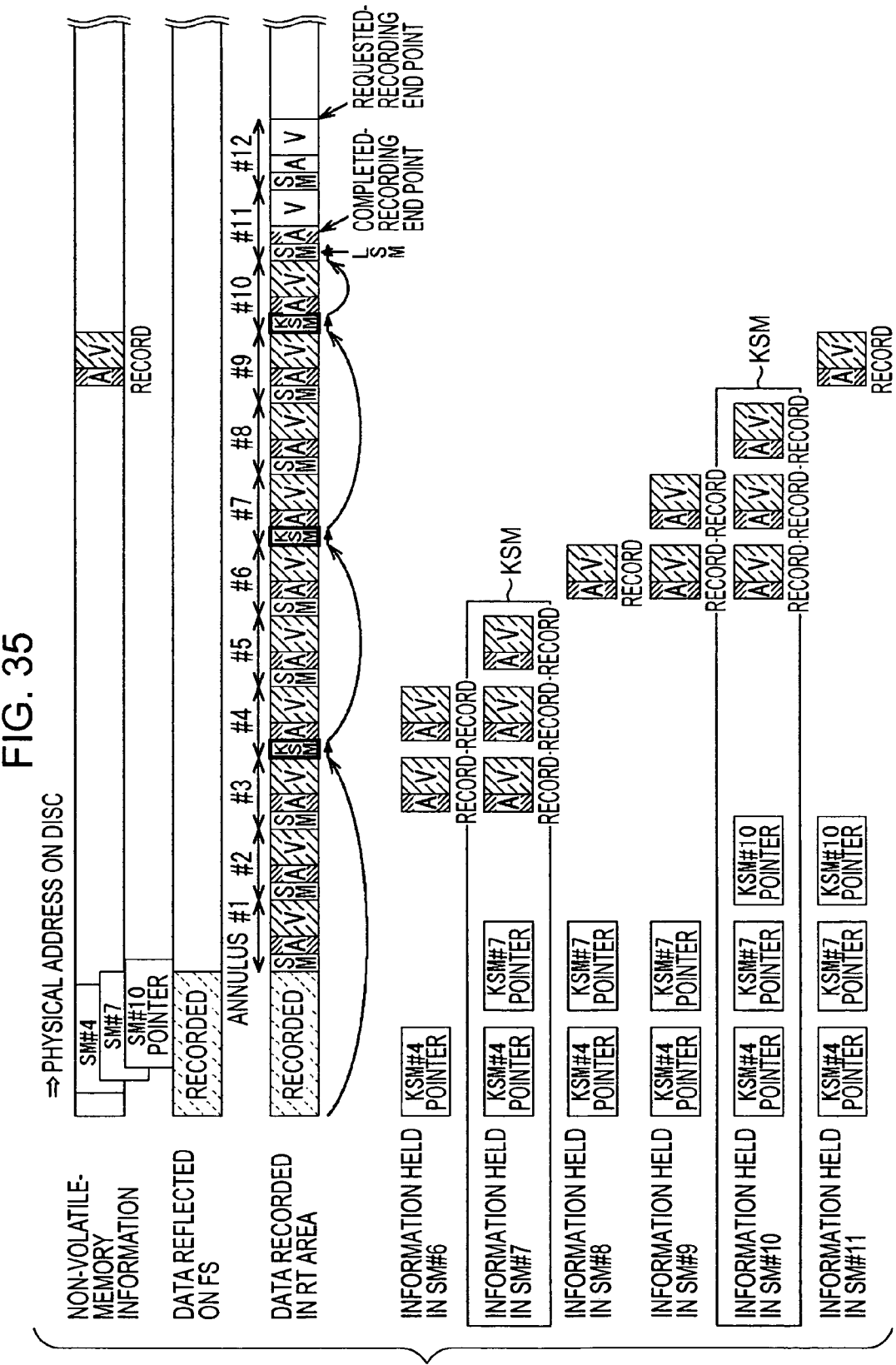
FIG. 35 is a diagram for specifically explaining the full salvage process.

When it is determined in step S107 shown in FIG. 21 that the non-volatile-memory information is valid, the process proceeds to step S108, in which the salvage processor 134 executes the quick salvage process shown in FIG. 23. In step S141 shown in FIG. 23, key salvage markers are read based on key-salvage-marker pointers recorded in the non-volatile-memory information (KSM#4, KSM#7, and KSM#10) as shown in FIG. 33, and the file system is restored and written back based on the key salvage markers read and the location information (record) of the annulus #10, i.e., "annulus location information not yet recorded in SM on disc), as shown in FIG. 34. Thus, it becomes possible to read AV data of the annuli #1 to #10, recorded on the optical disc 111.

On the other hand, in the example shown in FIG. 32, data up to the AV data associated with the annulus #10, and the salvage marker SM#11 and part of the AV data #11 associated with the annulus #11 are recorded on the optical disc 111, the location information (record) of the annulus #10, a CSM representing the position of the salvage marker SM#11, and the location information (record) of the salvage markers SM#4, SM#7, and SM#10 as key-salvage-marker pointers respectively associated with the annuli #4, #7, and #10 are recorded in the non-volatile-memory information, and the non-volatile-memory information is not valid.

In this case, i.e., when it is determined in step S107 shown in FIG. 21 that the non-volatile-memory information is not valid and the user has requested restoration (i.e., when step S112 results in YES), the process proceeds to step S114, in which the salvage-marker detector 133 and the salvage processor 134 execute the full salvage process described with reference to FIG. 26. The last salvage marker detected in step S181 shown in FIG. 26 (i.e., the process shown in FIG. 27) is the salvage marker SM#11 (coinciding with the salvage marker that was the current salvage marker (CSM) at the time of interruption of power supply in FIG. 32). In step S182, the last salvage marker is read and stored. More specifically, the salvage marker SM#11 as the last salvage marker includes the KSM#4 pointer, the KSM#7 pointer, the KSM#10 pointer, and the location information (record) of the annulus #9, i.e., annulus information not yet recorded in SM on disc. Thus, as indicated by "volatile memory 121" in FIG. 35, the SM#4 pointer, the SM#7 pointer, the SM#10 pointer as key-salvage-marker pointers, and the location information (record) of the annulus #9 as annulus location information not yet recorded in SM on disc are stored.

Figure 36:
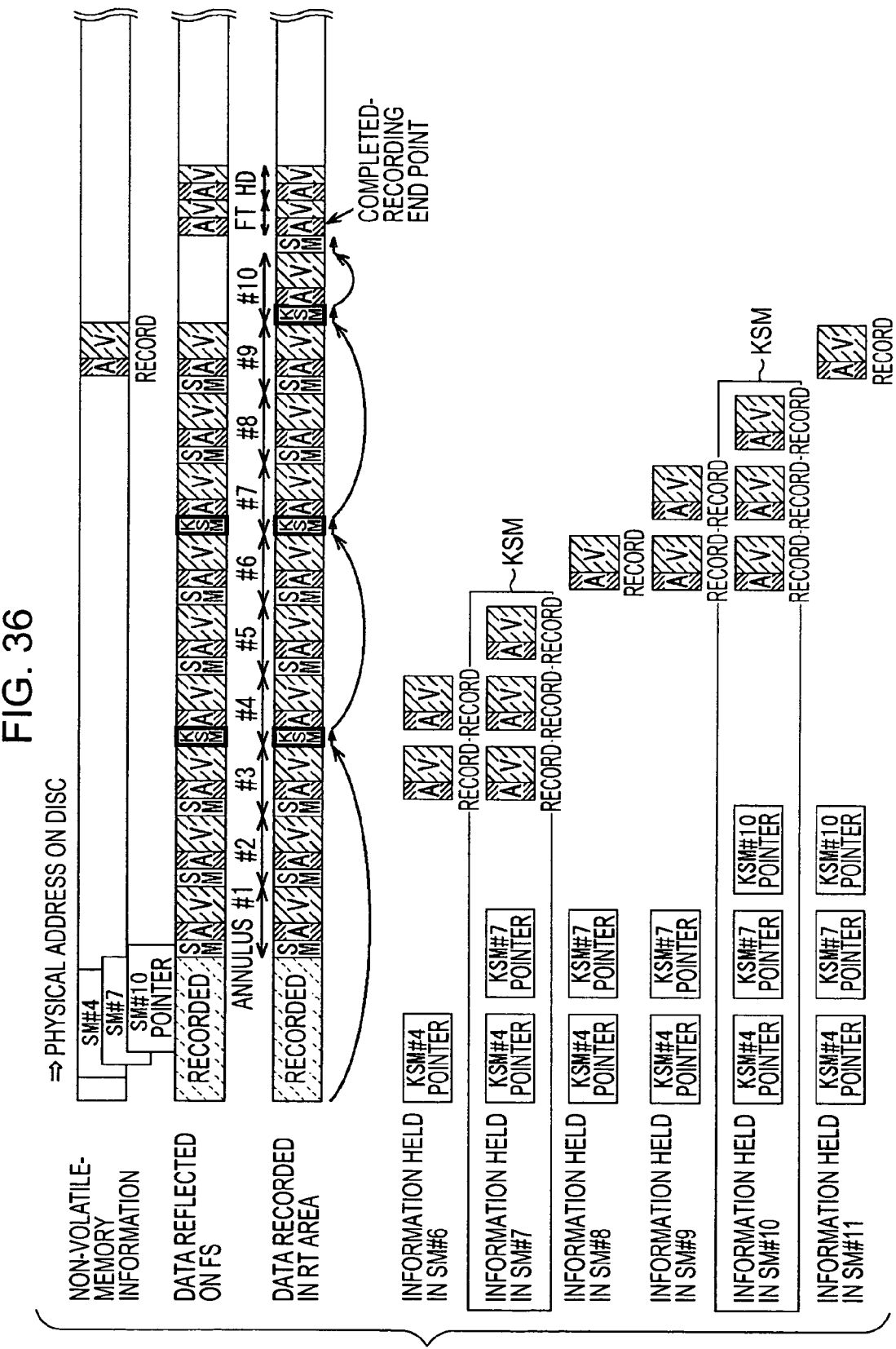
FIG. 36 is a diagram for specifically explaining the full salvage process.

Then, in step S184, based on the key-salvage-marker pointers stored, the key salvage markers KSM#4, KSM#7, and KSM#10 are read. In step S185, these key salvage markers are stored. Then, based on the location information included in the key salvage markers KSM#4, KSM#7, and KSM#10 (the location information of the annuli #1 to #8) and the location information included in the last salvage marker SM#11 (the location information of the annulus #9), the salvage processor 134 restores the file system in step S186, and writes back the file system in step S189, as shown in FIG. 36. Thus, the file system can be updated as shown in FIG. 36, so that it becomes possible to read the AV data of the annuli #1 to #9, recorded on the optical disc 111.

As described above, when the last salvage marker is a key salvage marker (FIG. 29) and the non-volatile-memory information is not valid (when the full salvage process is executed), the key salvage marker recorded last coincides with the last salvage marker, so that the file system can be restored based only on key salvage markers. In contrast, when the last salvage marker is not a key salvage marker (FIG. 35) and the non-volatile-memory information is not valid (when the full salvage process is executed), the file system can be restored using "annulus location information (record) not yet recorded in SM on disc" recorded in the last salvage marker in addition to the key salvage marker recorded last.

As described above, according to the embodiment of the present invention, it is possible to restore that was being recorded even when the recording was not completed normally.

The processes described above can be summarized as follows.

On the optical disc 111, a file system representing association between identification information for identifying files and recording positions of the file on the optical disc 111, data of a plurality of annuli (segment data) constituting the files, and salvage markers for the respective pieces of the plurality of segment data constituting each of the files, the salvage markers at least including location information of annulus data recorded on the optical disc 111. When the data size of a salvage marker has reached a predetermined upper limit, the salvage marker is specified as a key salvage marker. In salvage markers recorded after the salvage marker specified as the key salvage marker, location information of the key salvage marker on the optical disc 111 (i.e., a key-salvage-marker pointer) is further included.

The salvage-marker detector 133 detects a last salvage marker, i.e., the salvage marker recorded last during a recording process in a recording area in which data has been recorded on the optical disc 111 but has not been reflected on the file system (an empty area of the file system), and stores key-salvage-marker pointers included in the last salvage marker and segment-data location information recorded on the optical disc 111 in the volatile memory 121. Based on the key-salvage-marker pointers stored in the volatile memory 121 and the segment-data location information recorded on the optical disc 111, the salvage processor 134 executes a salvage process on the basis of each piece of annulus data constituting files so that annulus data that has been recorded on the optical disc 111 but has not been reflected on the file system is reflected on the file system.

Thus, even when recording was not completed normally, it is possible to restore data that was being recorded. Furthermore, by detecting a last salvage marker, the data can be restore more quickly than in the case where all the salvage markers are detected.

The above description has been given in the context of an example where the recording process, the restoration decision process, and the data restoration process are executed by the single recording and playback apparatus 110. Alternatively, for example, a recording apparatus that executes the recording process, a salvage apparatus that executes the restoration decision process and the data restoration process, and a playback apparatus for playing back data from an optical disc may be provided separately.

That is, the recording process may be executed by a recording apparatus not having a function for executing the restoration decision process and the data restoration process or a function for playing back data from an optical disc, and the restoration decision process and the data restoration process may be executed by a salvage apparatus not having a function for recording data on or playing back data from an optical disc.

The present invention can be applied to disc-shaped recording media other than optical discs, or other recording media that allow random access (e.g., semiconductor memories). Furthermore, the present invention can be applied to recording of data on any type of recording medium as long as data is managed in the form of files.

Furthermore, although the above description has been given in the context of an example where content data such as audio data and video data and the file system (management data for managing the content data) are recorded on the same recording medium, the present invention can be applied to cases where content data and the file system (management data) are not recorded on the same recording medium. For example, in a package medium including a disc medium (or a tape medium) and a semiconductor memory are included in a single cartridge, content data may be recorded on the disc medium (or the tape medium) while recording the file system in the semiconductor memory. As another example, of two apparatuses connected via a network, content data may be held in one of the two apparatuses while holding the file system in the other apparatus. Obviously, the present invention can be applied to other cases where content data and the file system (management data) are not recorded on the same recording medium.

The series of processes described above can be implemented either in hardware or in software. When the series of processes is implemented in software, programs constituting the software are installed on a computer, and the programs are executed by the computer, whereby the functions of the recording and playback apparatus 110 described above are achieved.

The steps of the programs provided by the recording medium (program storage medium) need not necessarily be executed in the orders described herein, and may be executed in parallel or individually.

It should be understood by those skilled in the art that various modifications, combinations, sub-combinations and alterations may occur depending on design requirements and other factors insofar as they are within the scope of the appended claims or the equivalents thereof.

What is claimed is:

1. A playback apparatus for playing back data from a recording medium having recorded thereon a file system representing association between identification information for identifying a file and a position where the file is recorded, a plurality of pieces of segment data constituting the file, and markers for the respective pieces of segment data, each marker that is recorded after a key marker specified in certain cases including location information of the key marker, the playback apparatus comprising:

detecting means for detecting a last marker in a recording area where data has been recorded on the recording medium but has not been reflected on the file system, the last marker being a marker that is recorded at an end of the recording medium in a recording process; and restoration processing means for executing, for each of the pieces of segment data constituting the file, a restoration process of reflecting on the file system segment data that has been recorded on the recording medium but has not been reflected on the file system, based on the location information of the key marker and the location information of segment data, these pieces of location information being included in the last marker detected by the detecting means.

2. The playback apparatus according to claim 1, wherein the key marker is specified when the size of a marker has reached a predetermined upper limit.

3. The playback apparatus according to claim 1, wherein the restoration processing means reads a marker specified as the key marker from the recording medium based on the location information of the key marker on the recording medium, and executes the restoration process based on the location information of the segment data, included in the marker read, and based on the location information of the segment data, included in the last marker.

4. The playback apparatus according to claim 1,
wherein the detecting means detects the last marker by executing binary search in the recording area where data has been recorded on the recording medium but has not been reflected on the file system.

5. The playback apparatus according to claim 1,
wherein each of the markers includes a first number of times representing the number of times of rewriting in a recording area where the marker is recorded on the recording medium, and
wherein when a marker is detected in the recording area where data has been recorded on the recording medium but has not been reflected on the file system, the detecting means determines whether the marker is the last marker based on the first number of times included in the marker and a second number of times representing the number of times of rewriting in the recording area where the marker is recorded on the recording medium, the second number of times having been reflected on the file system.

6. The playback apparatus according to claim 1,
wherein each of the markers includes first date and time information corresponding to a date and time of recording of the marker on the recording medium, and
wherein when a marker is detected in the recording area where data has been recorded on the recording medium but has not been reflected on the file system, the detecting means determines whether the marker is the last marker based on the first date and time information included in the marker and second date and time information corresponding to a date and time of updating of the file system.

7. The playback apparatus according to claim 1,
wherein each of the markers includes location information of the associated segment data recorded on the recording medium.

8. A playback method for playing back data from a recording medium having recorded thereon a file system representing association between identification information for identifying a file and a position where the file is recorded, a plurality of pieces of segment data constituting the file, and markers for the respective pieces of segment data, each marker that is recorded after a key marker specified in certain cases including location information of the key marker, the playback method comprising the steps of:
  detecting a last marker in a recording area where data has been recorded on the recording medium but has not been reflected on the file system, the last marker being a marker that is recorded at an end of the recording medium in a recording process; and
  executing, for each of the pieces of segment data constituting the file, a restoration process of reflecting on the file system segment data that has been recorded on the recording medium but has not been reflected on the file system, based on the location information of the key marker and the location information of segment data, these pieces of location information being included in the last marker detected.

9. A computer readable medium encoded with computer executable instructions for allowing a computer to execute a process of playing back data from a recording medium having recorded thereon a file system representing association between identification information for identifying a file and a position where the file is recorded, a plurality of pieces of segment data constituting the file, and markers for the respective pieces of segment data, each marker that is recorded after a key marker specified in certain cases including location information of the key marker, the process comprising the steps of:
  detecting a last marker in a recording area where data has been recorded on the recording medium but has not been reflected on the file system, the last marker being a marker that is recorded at an end of the recording medium in a recording process; and
  executing, for each of the pieces of segment data constituting the file, a restoration process of reflecting on the file system segment data that has been recorded on the recording medium but has not been reflected on the file system, based on the location information of the key marker and the location information of segment data, these pieces of location information being included in the last marker detected.

10. A playback apparatus for playing back data from a recording medium having recorded thereon a file system representing association between identification information for identifying a file and a recording position of the file on the recording medium, a plurality of pieces of segment data constituting the file, and markers for the respective pieces of segment data, each of the markers at least including location information of the associated segment data recorded on the recording medium, each of the markers being specified as a key marker when the size of the marker has reached a predetermined upper limit, and each marker that is recorded after the marker specified as the key marker further including location information of the key marker on the recording medium, the playback apparatus comprising:
  detecting means for detecting a last marker in a recording area where data has been recorded on the recording medium but has not been reflected on the file system, the last marker being a marker recorded last on the recording medium in a recording process;
  storage means for storing the location information of the key marker on the recording medium and the location information of segment data recorded on the recording medium, these pieces of location information being included in the last marker detected by the detecting means; and
  salvage means for executing, for each of the pieces of segment data constituting the file, a salvage process of reflecting on the file system segment data that has been recorded on the recording medium but has not been reflected on the file system, based on the location information of the key marker on the recording medium and the location information of the segment data recorded on the recording medium, these pieces of location information having been stored in the storage means.

11. A playback apparatus for playing back data from a recording medium having recorded thereon a file system representing association between identification information for identifying a file and a position where the file is recorded, a plurality of pieces of segment data constituting the file, and markers for the respective pieces of segment data, each marker that is recorded after a key marker specified in certain cases including location information of the key marker, the playback apparatus comprising:
  a detector configured to detect a last marker in a recording area where data has been recorded on the recording medium but has not been reflected on the file system, the last marker being a marker that is recorded at an end of the recording medium in a recording process; and a restoration processor configured to execute, for each of the pieces of segment data constituting the file, a restoration process of reflecting on the file system segment data that has been recorded on the recording medium but has not been reflected on the file system, based on the location information of the key marker and the location information of segment data, these pieces of location information being included in the last marker detected by the detector.

12. A playback apparatus for playing back data from a recording medium having recorded thereon a file system representing association between identification information for identifying a file and a recording position of the file on the recording medium, a plurality of pieces of segment data constituting the file, and markers for the respective pieces of segment data, each of the markers at least including location information of the associated segment data recorded on the recording medium, each of the markers being specified as a key marker when the size of the marker has reached a predetermined upper limit, and each marker that is recorded after the marker specified as the key marker further including location information of the key marker on the recording medium, the playback apparatus comprising:

a detector configured to detect a last marker in a recording area where data has been recorded on the recording medium but has not been reflected on the file system, the last marker being a marker recorded last on the recording medium in a recording process;

a storage unit configured to store the location information of the key marker on the recording medium and the location information of segment data recorded on the recording medium, these pieces of location information being included in the last marker detected by the detector; and a salvage unit configured to execute, for each of the pieces of segment data constituting the file, a salvage process of reflecting on the file system segment data that has been recorded on the recording medium but has not been reflected on the file system, based on the location information of the key marker on the recording medium and the location information of the segment data recorded on the recording medium, these pieces of location information having been stored in the storage unit.

\* \* \* \* \*